March 30, 1954  O. GIERWIATOWSKI  2,673,739
AUTOMATIC PHONOGRAPH

Filed April 15, 1947  32 Sheets-Sheet 1

Inventor:
Olgierd Gierwiatowski
By Hinkle, Horton, Akeberg, Hausmann & Bupper
Attorneys.

March 30, 1954  O. GIERWIATOWSKI  2,673,739
AUTOMATIC PHONOGRAPH

Filed April 15, 1947  32 Sheets-Sheet 3

Fig. 3.

Inventor:
Olgierd Gierwiatowski
By Hickey, Horton, Akelrey, Hausmann & Kuyper
Attorneys.

March 30, 1954 — O. GIERWIATOWSKI — 2,673,739
AUTOMATIC PHONOGRAPH
Filed April 15, 1947 — 32 Sheets-Sheet 6

March 30, 1954 — O. GIERWIATOWSKI — 2,673,739
AUTOMATIC PHONOGRAPH
Filed April 15, 1947 — 32 Sheets-Sheet 7

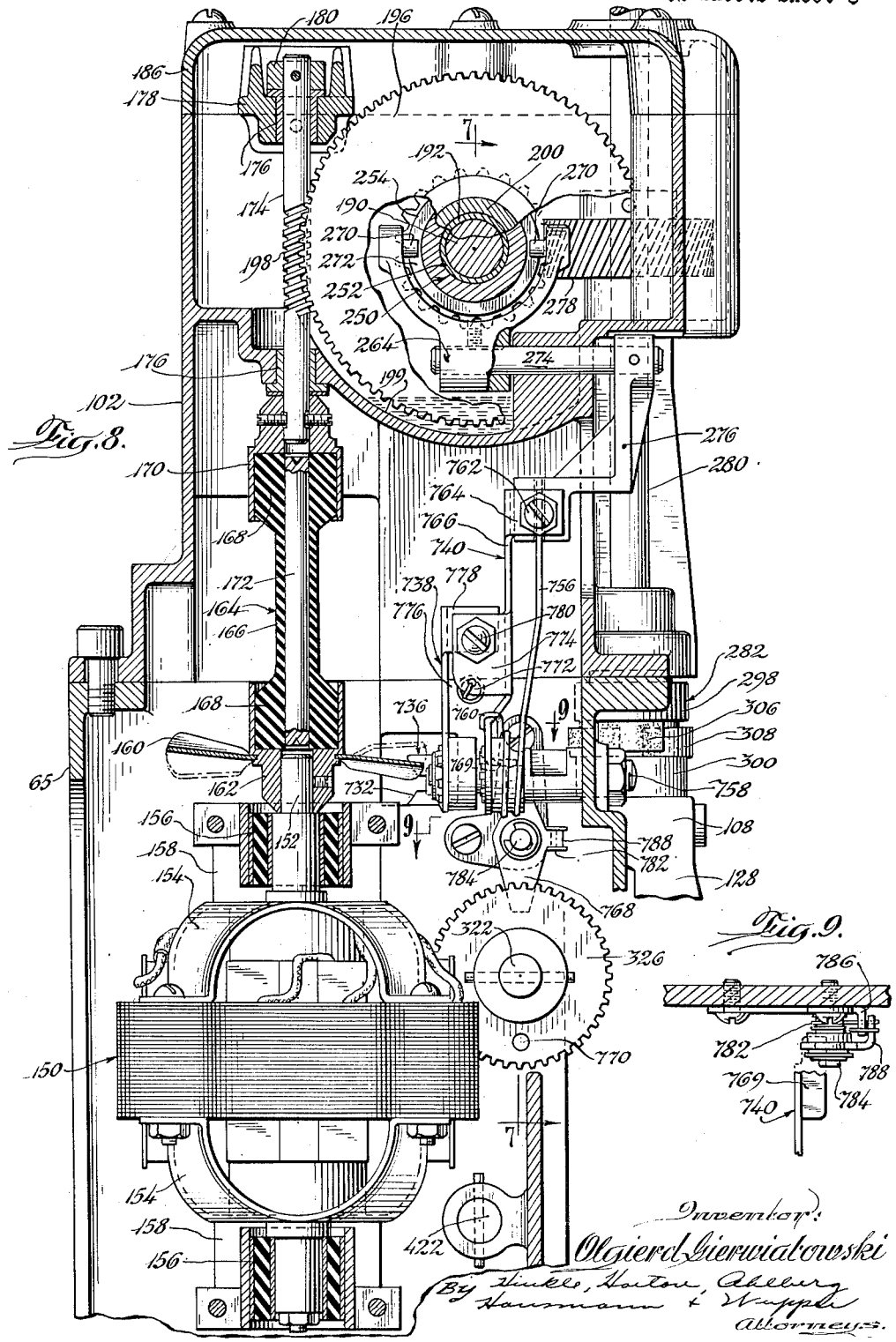

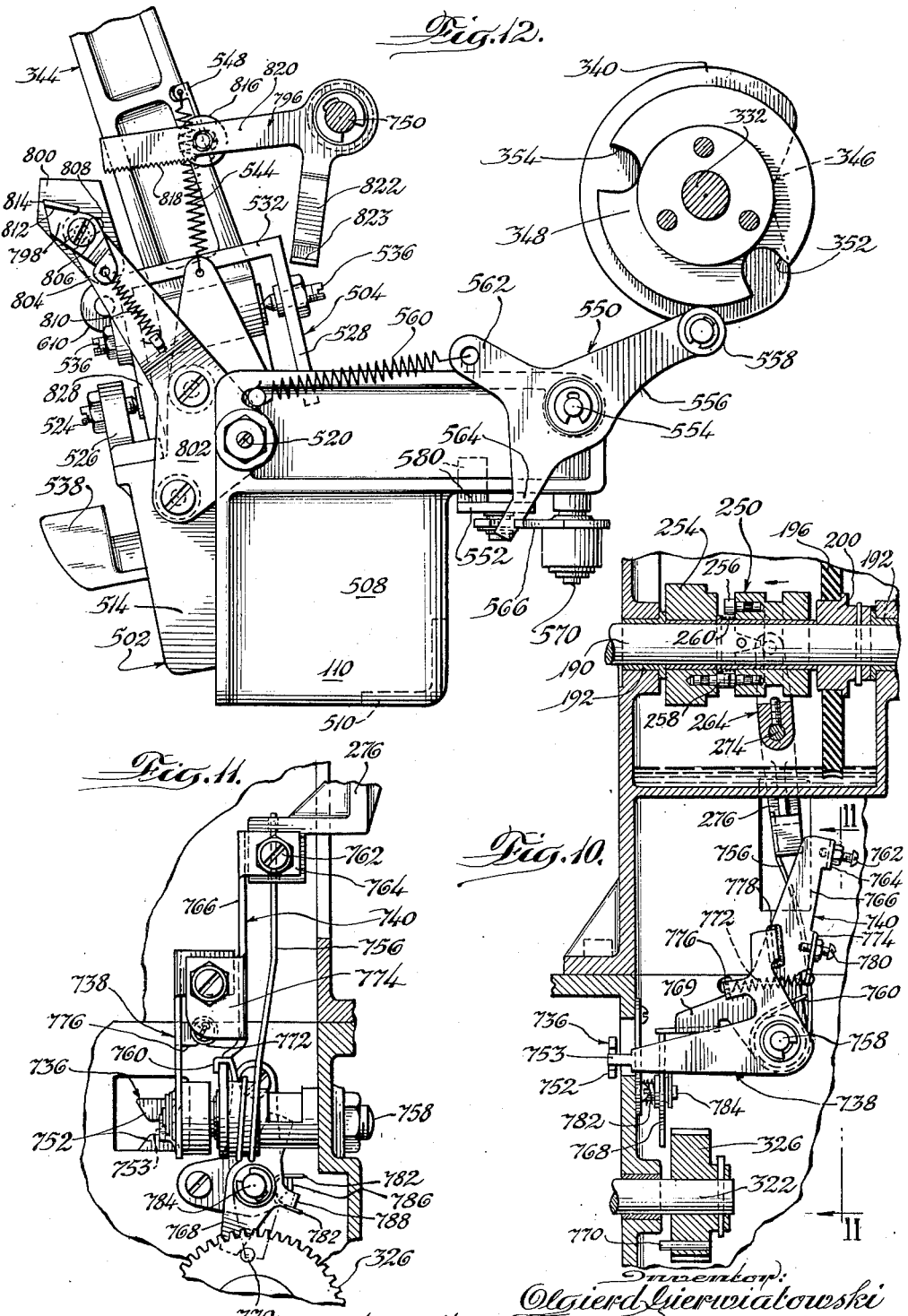

March 30, 1954  O. GIERWIATOWSKI  2,673,739
AUTOMATIC PHONOGRAPH
Filed April 15, 1947  32 Sheets-Sheet 10
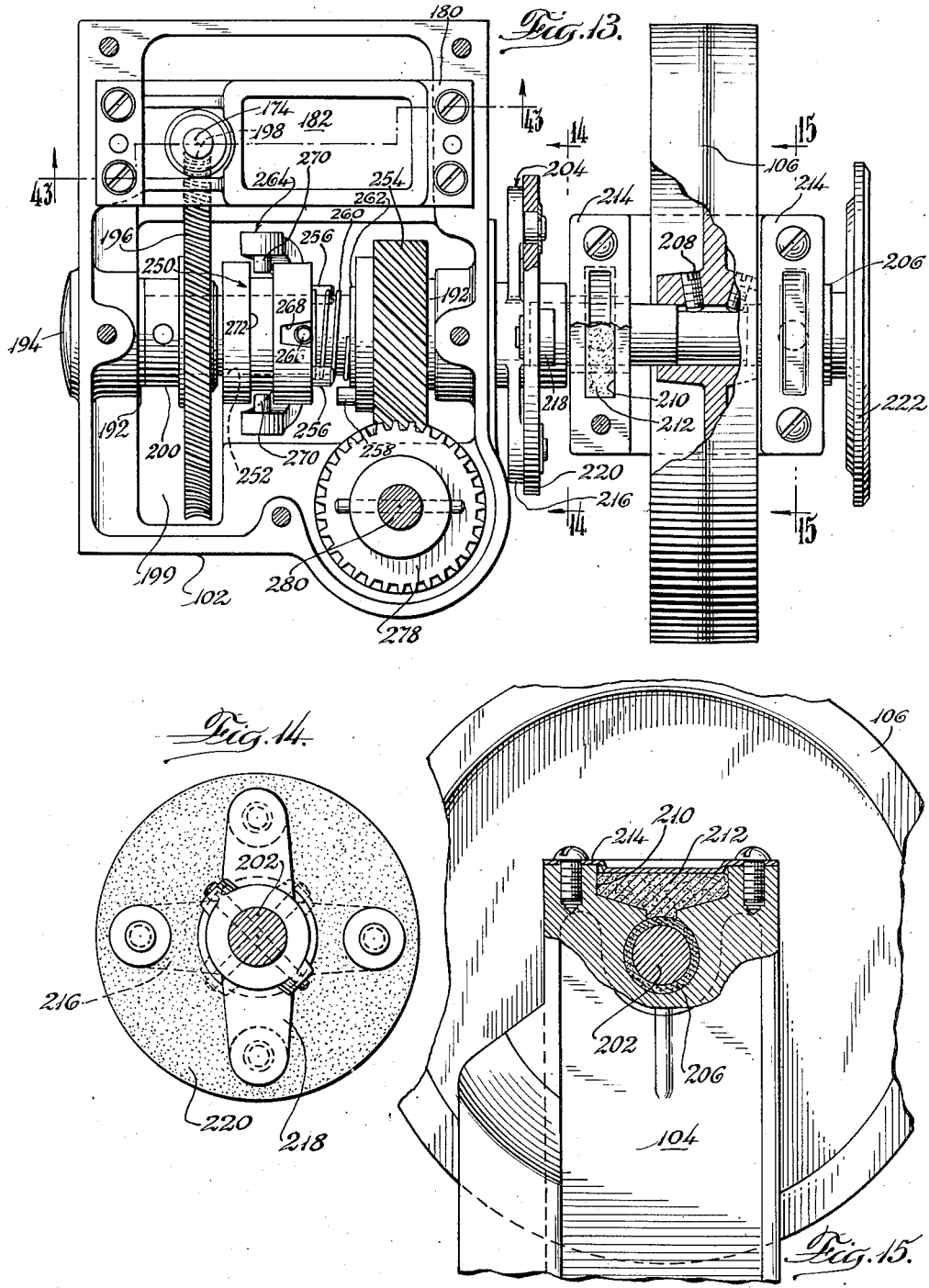

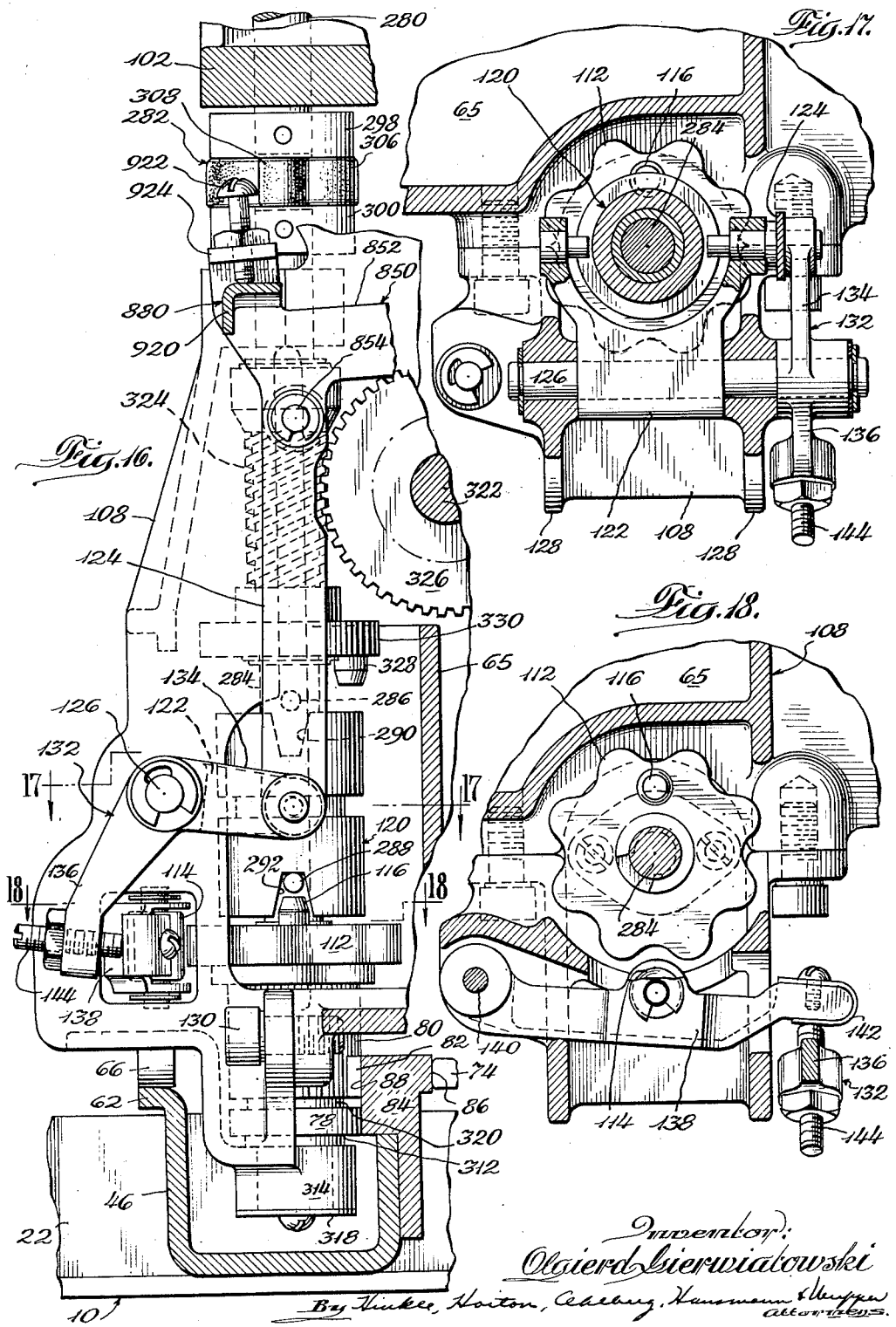

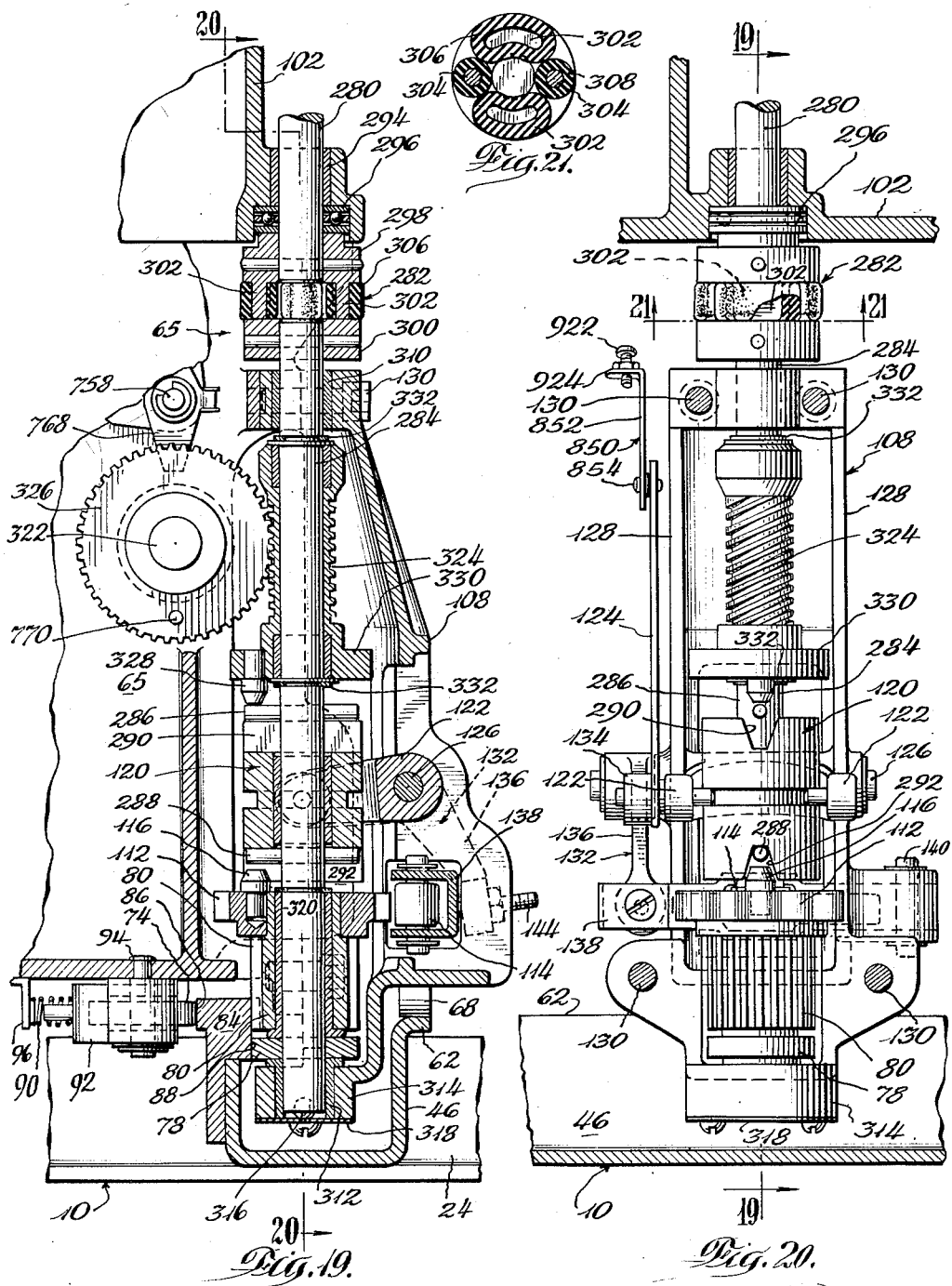

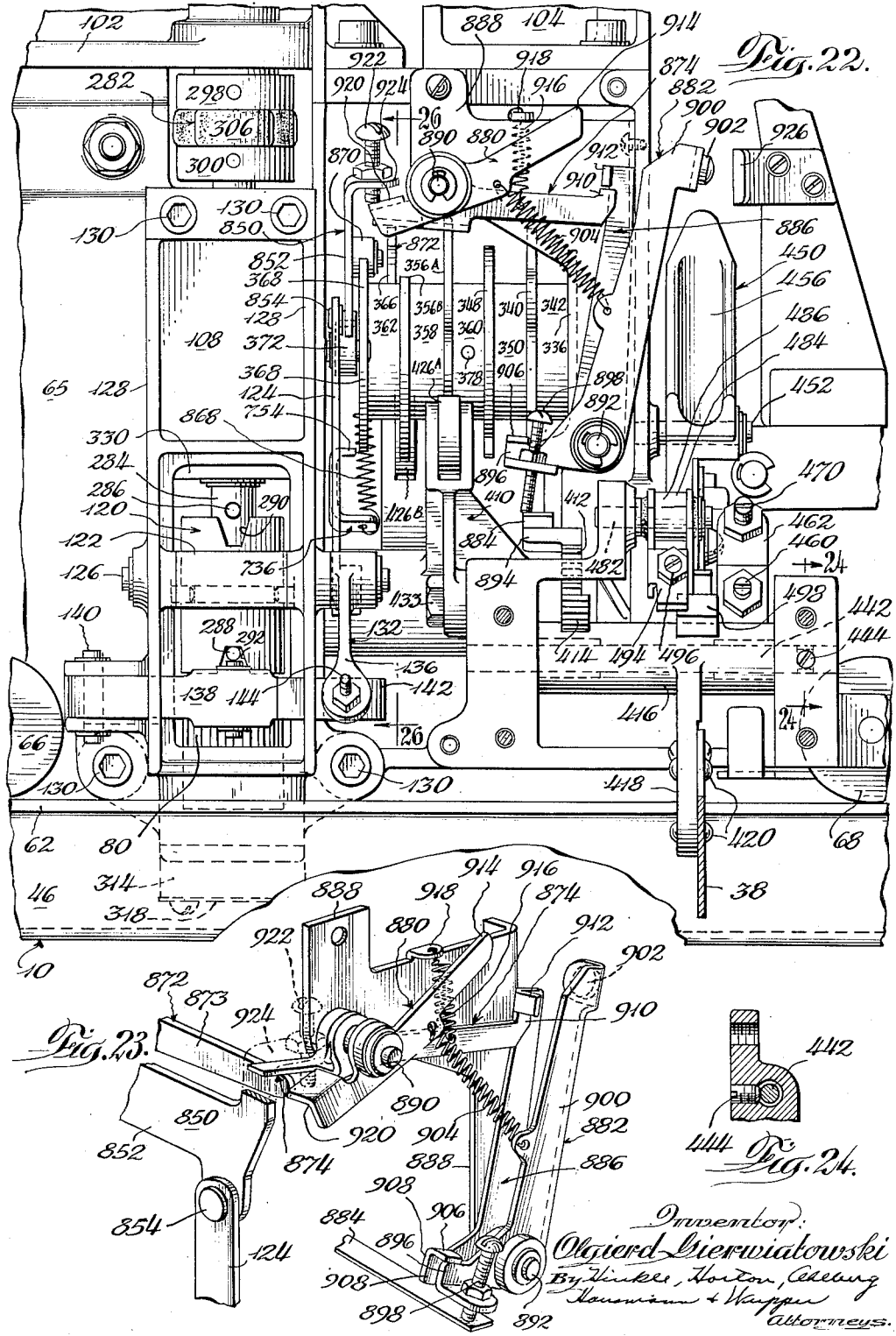

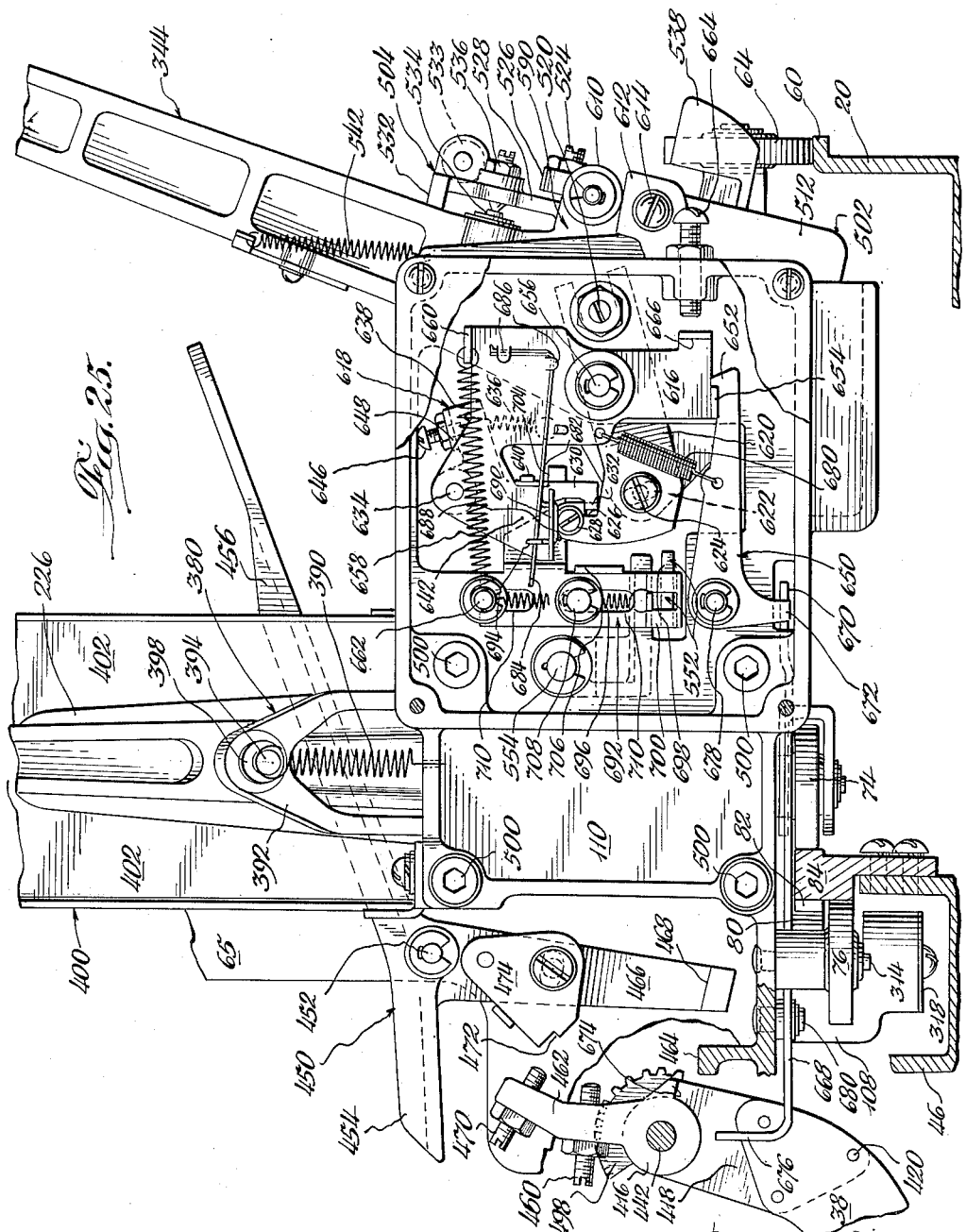

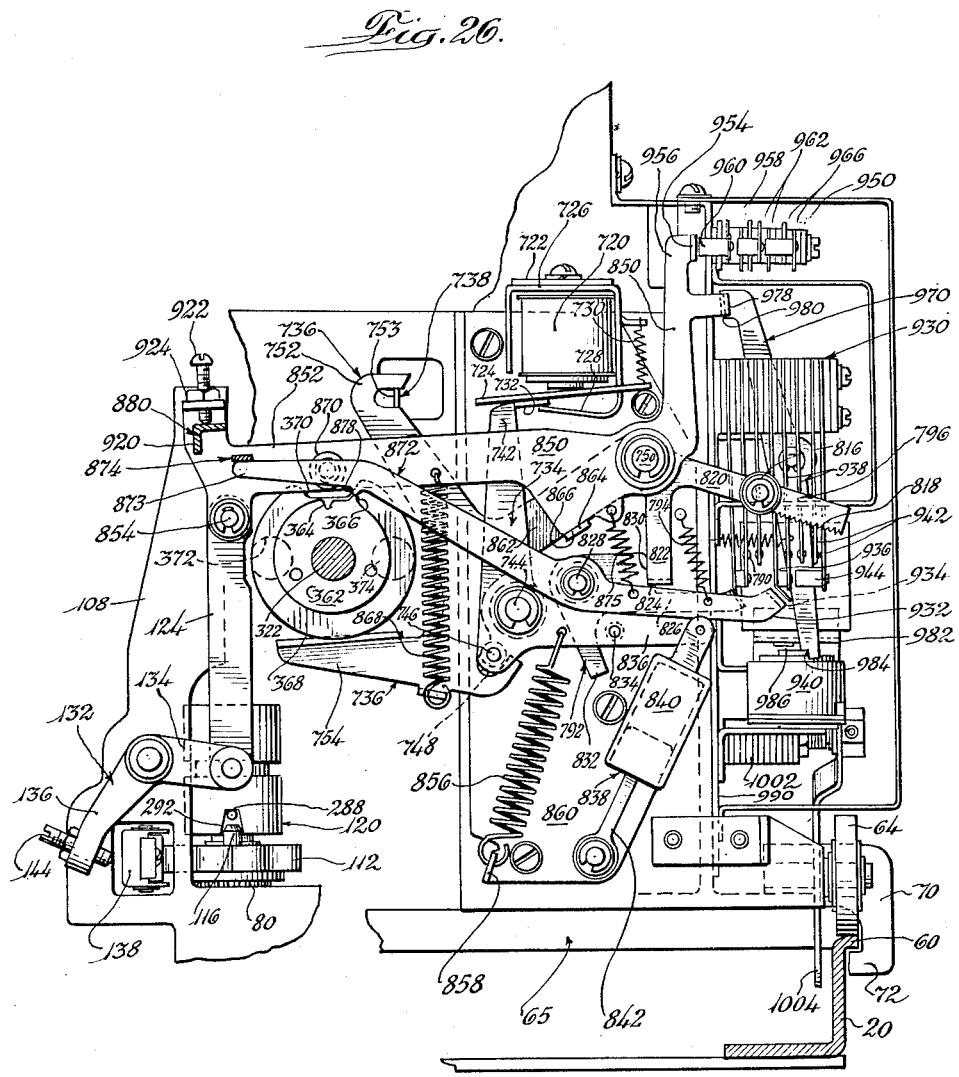

March 30, 1954   O. GIERWIATOWSKI   2,673,739
AUTOMATIC PHONOGRAPH
Filed April 15, 1947   32 Sheets-Sheet 16
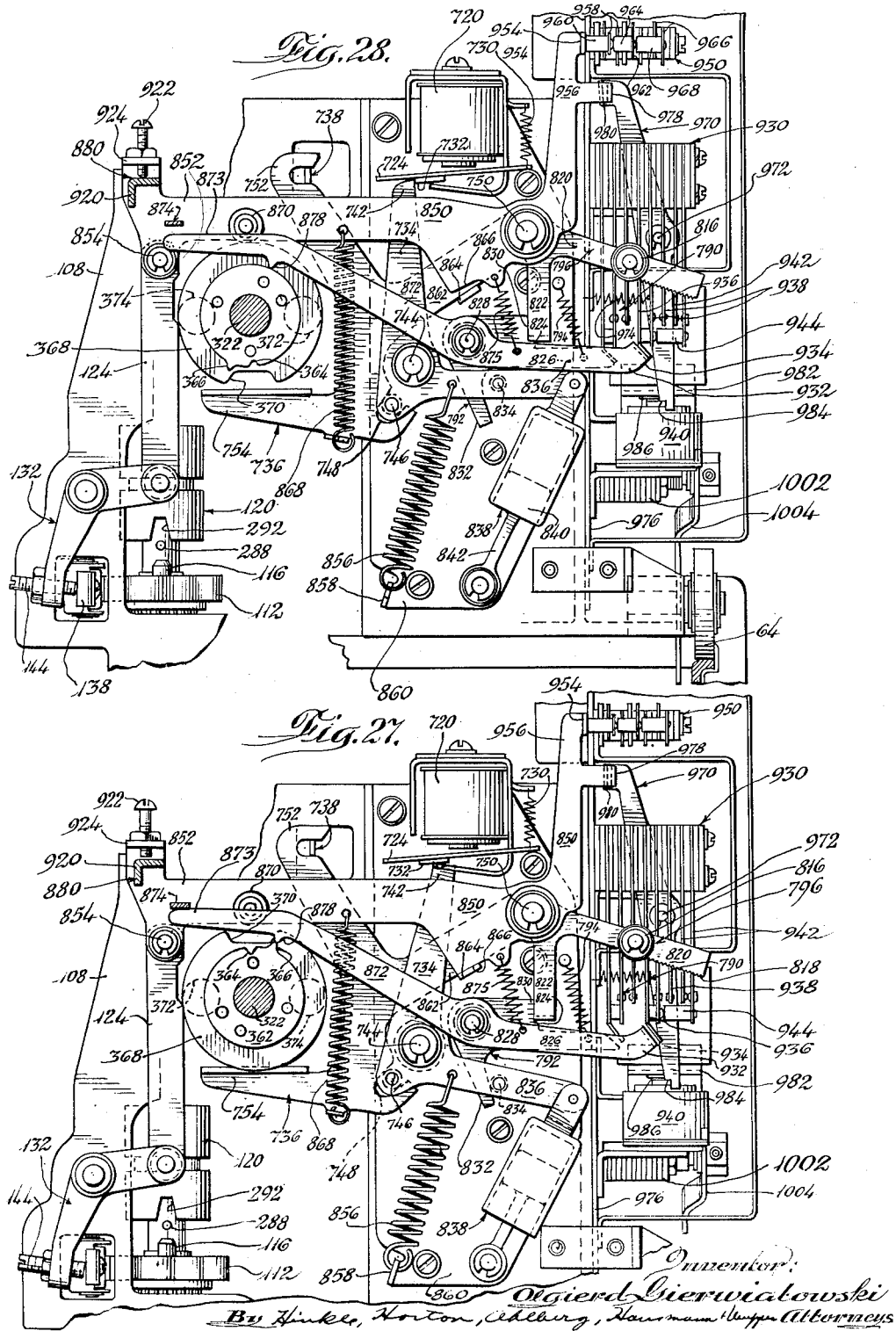

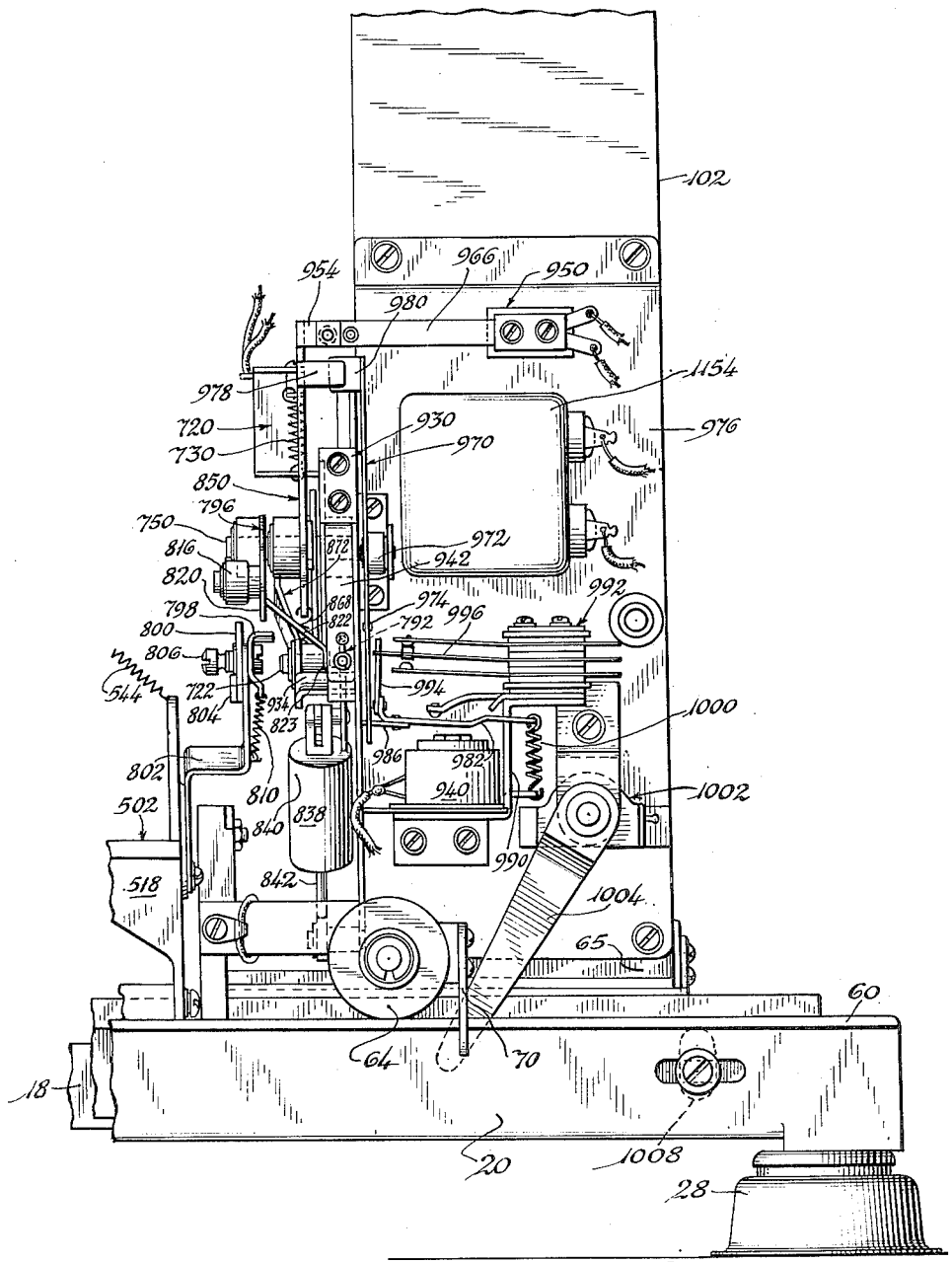

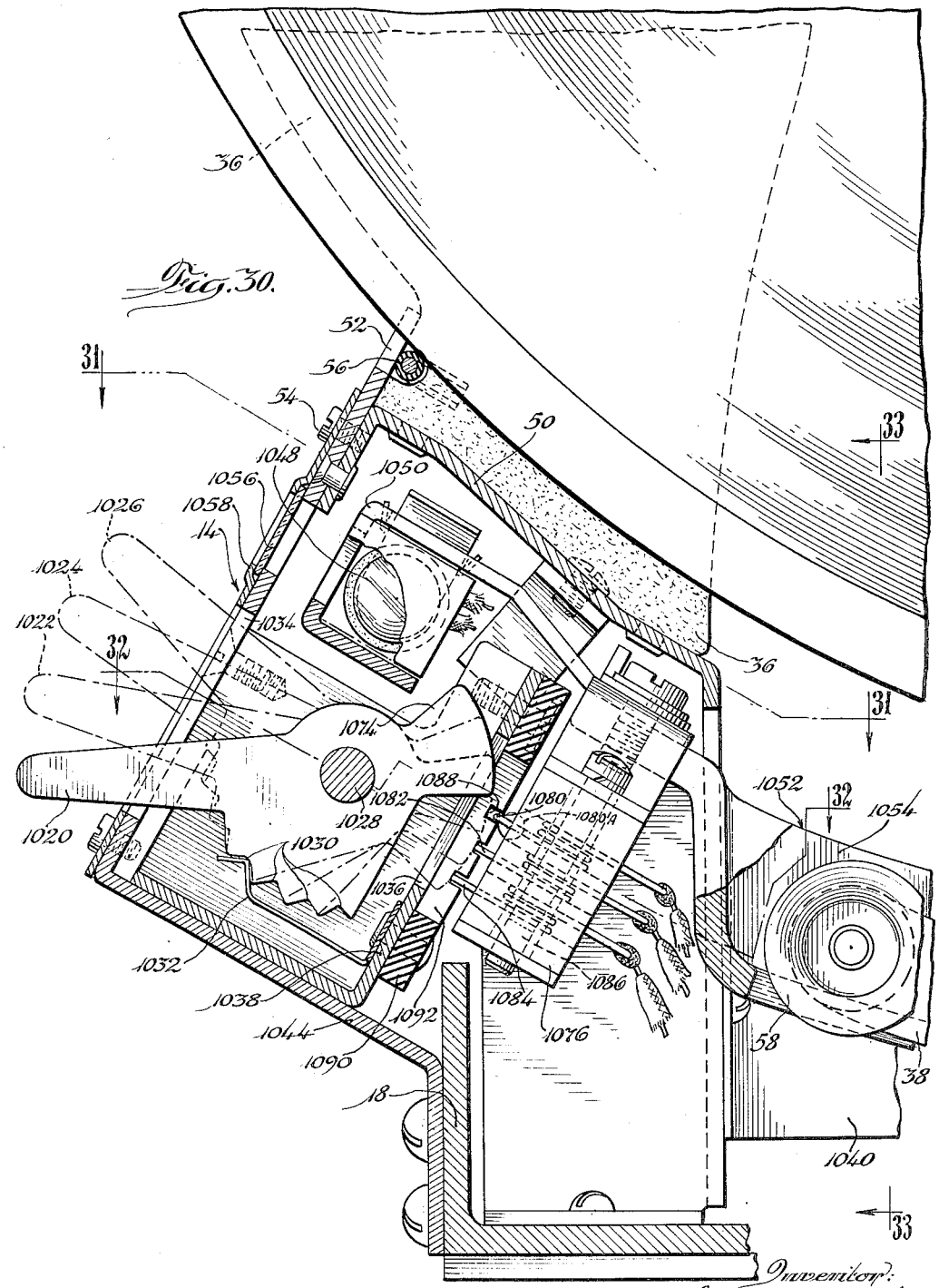

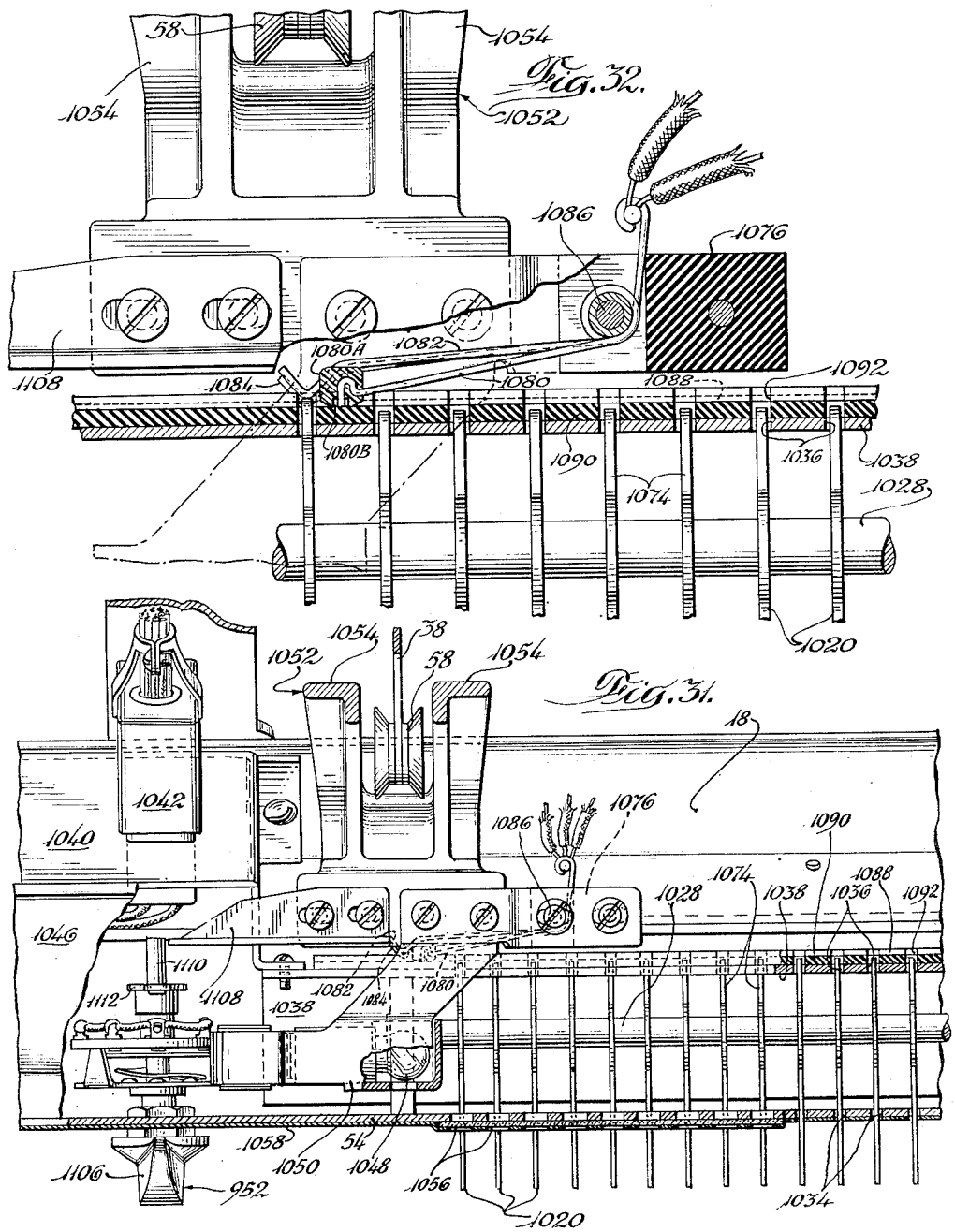

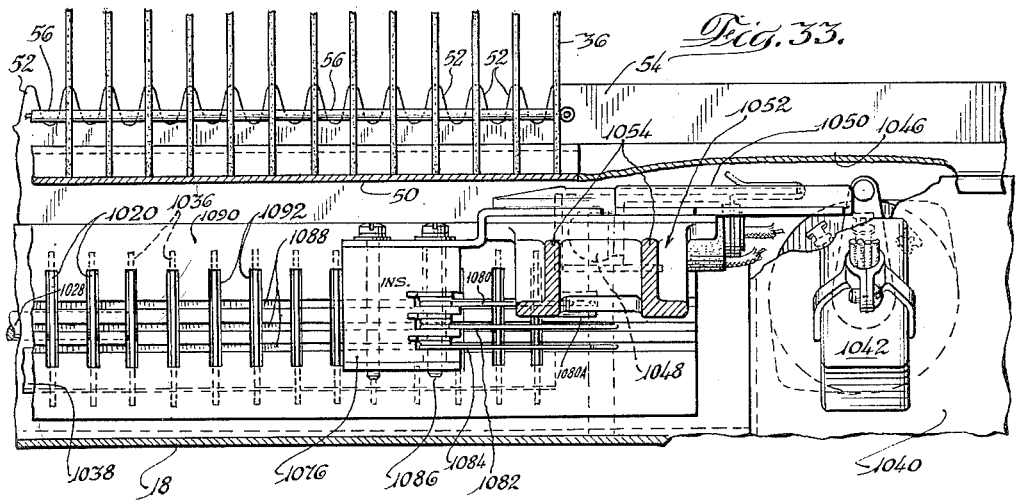
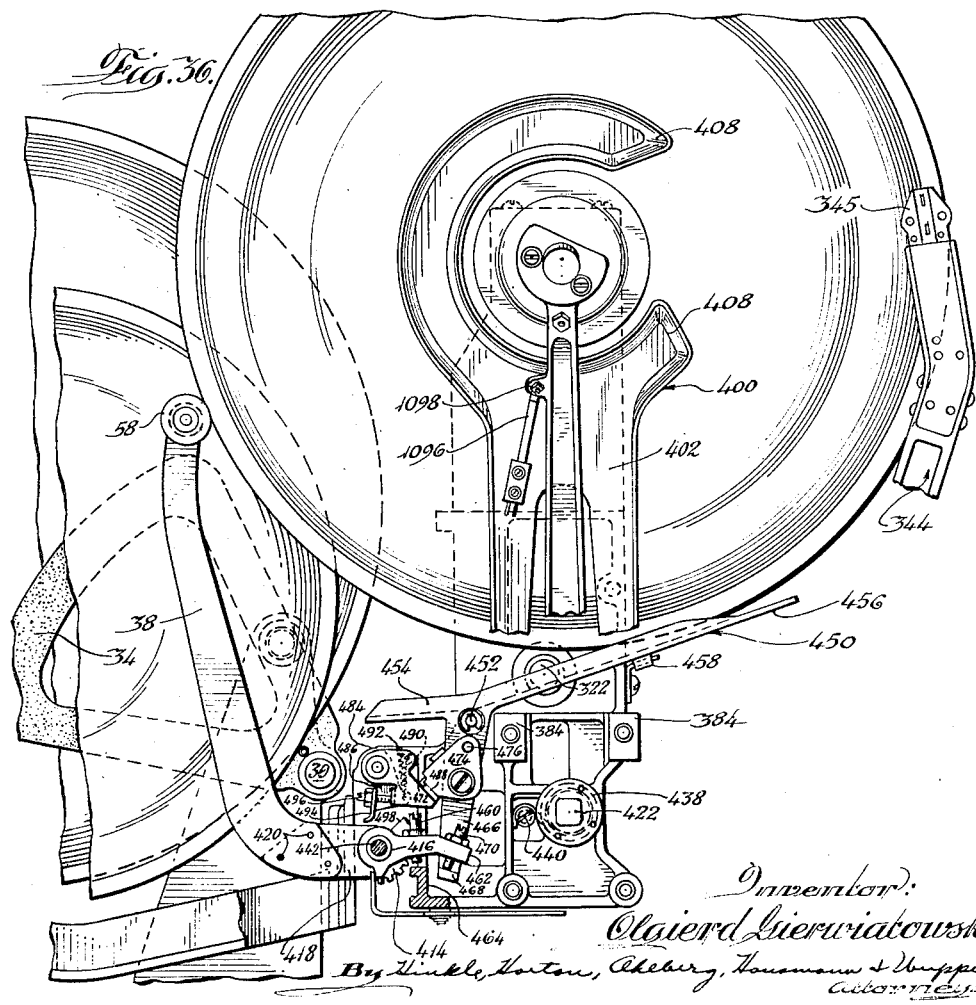

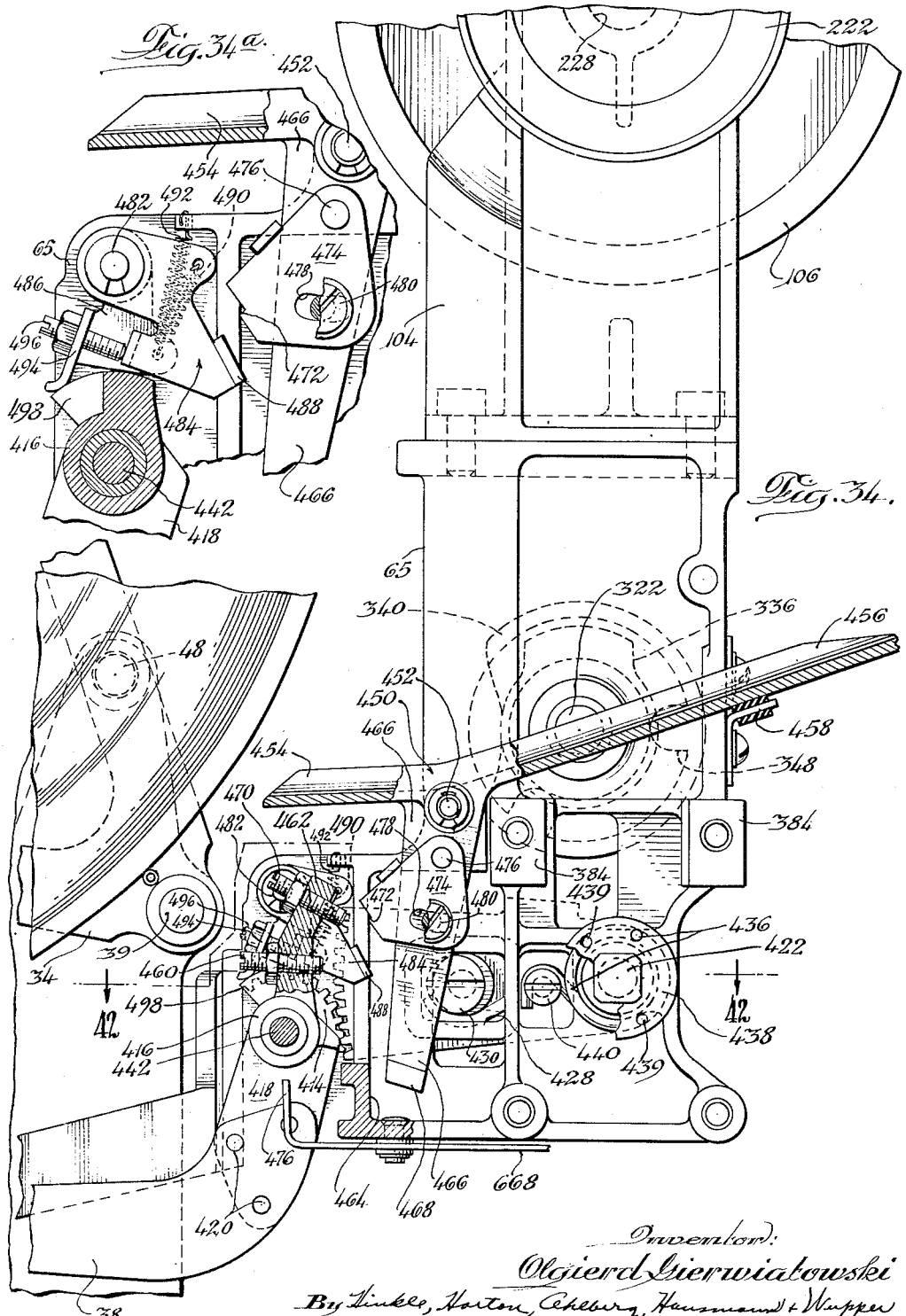

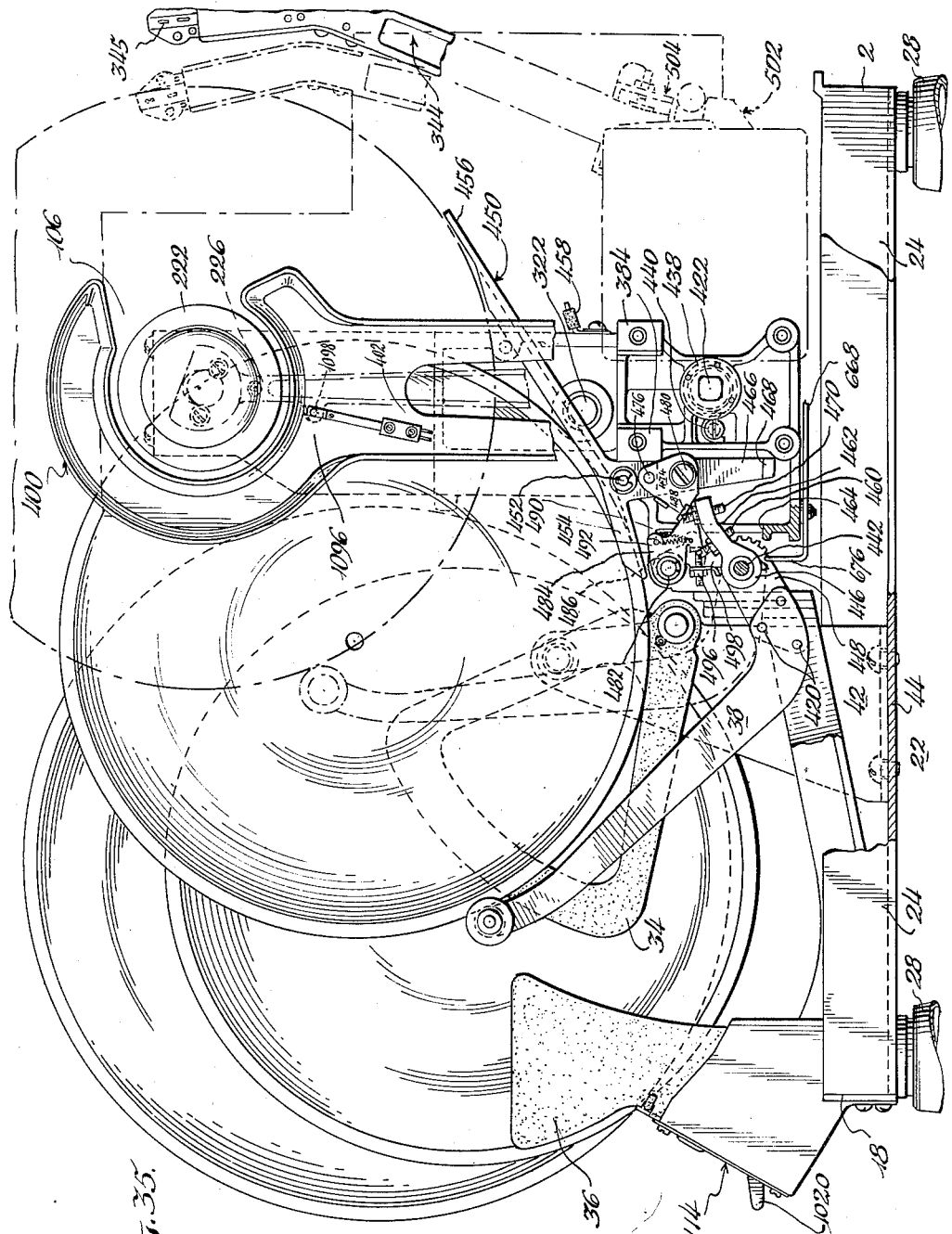

March 30, 1954 O. GIERWIATOWSKI 2,673,739
AUTOMATIC PHONOGRAPH
Filed April 15, 1947 32 Sheets-Sheet 23
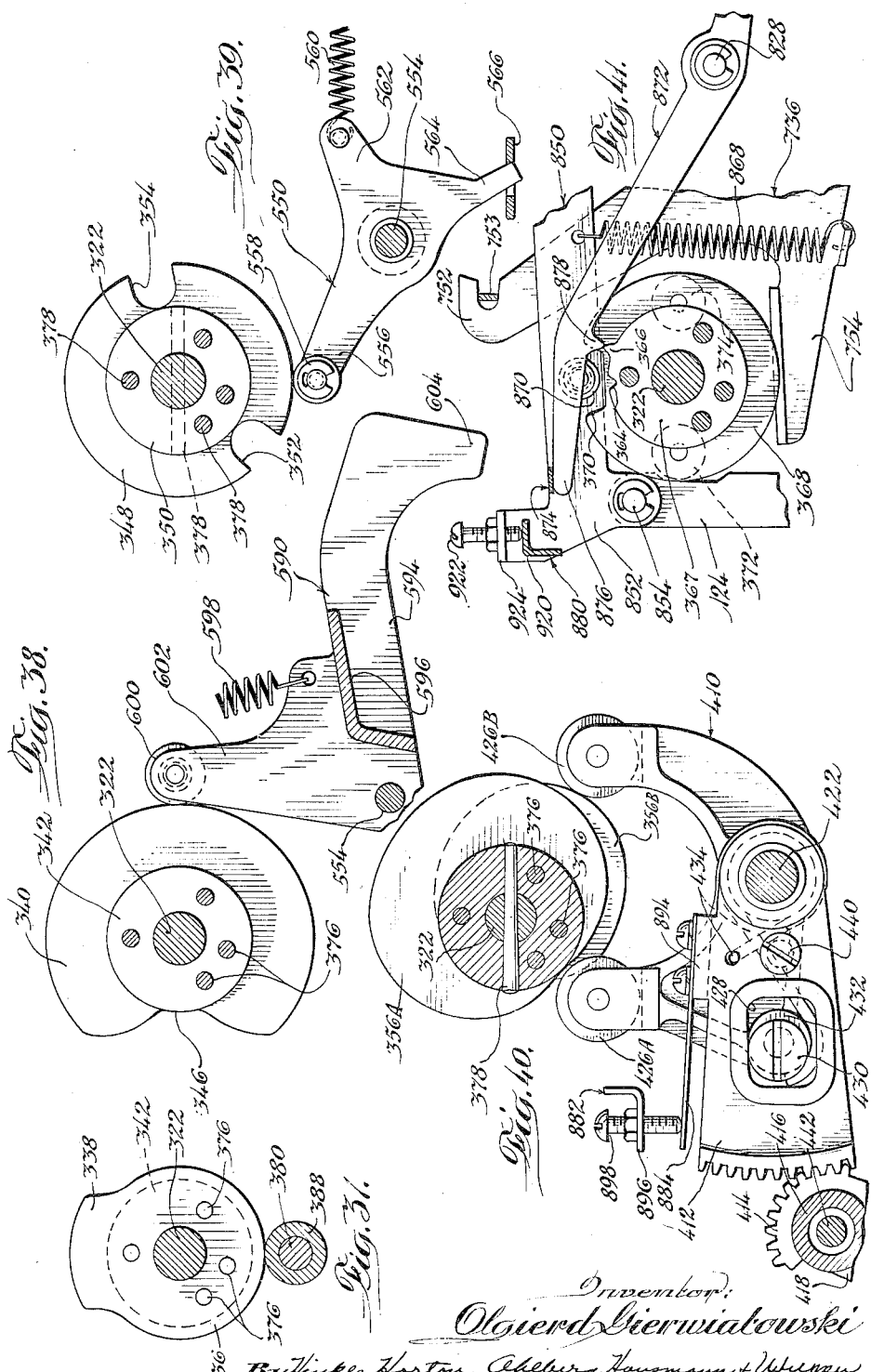

March 30, 1954   O. GIERWIATOWSKI   2,673,739
AUTOMATIC PHONOGRAPH
Filed April 15, 1947   32 Sheets-Sheet 24
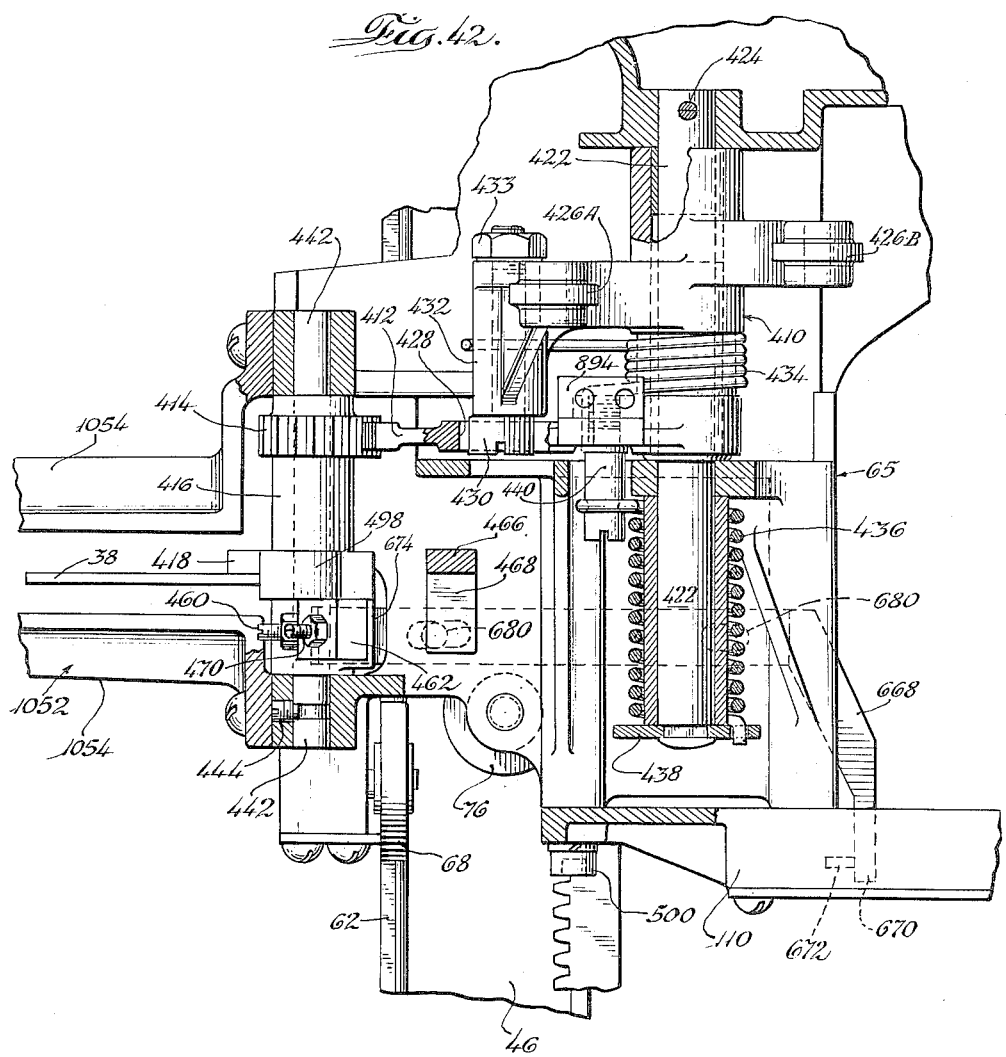
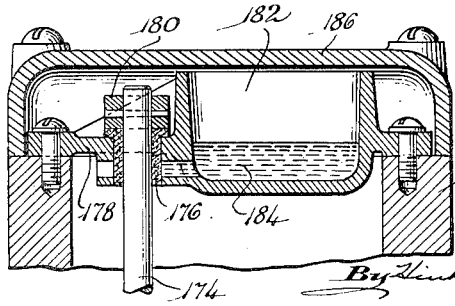
Inventor:
Olgierd Gierwiatowski
By Tinker, Horton, Ahlberg, Hammann & Weppe
Attorneys

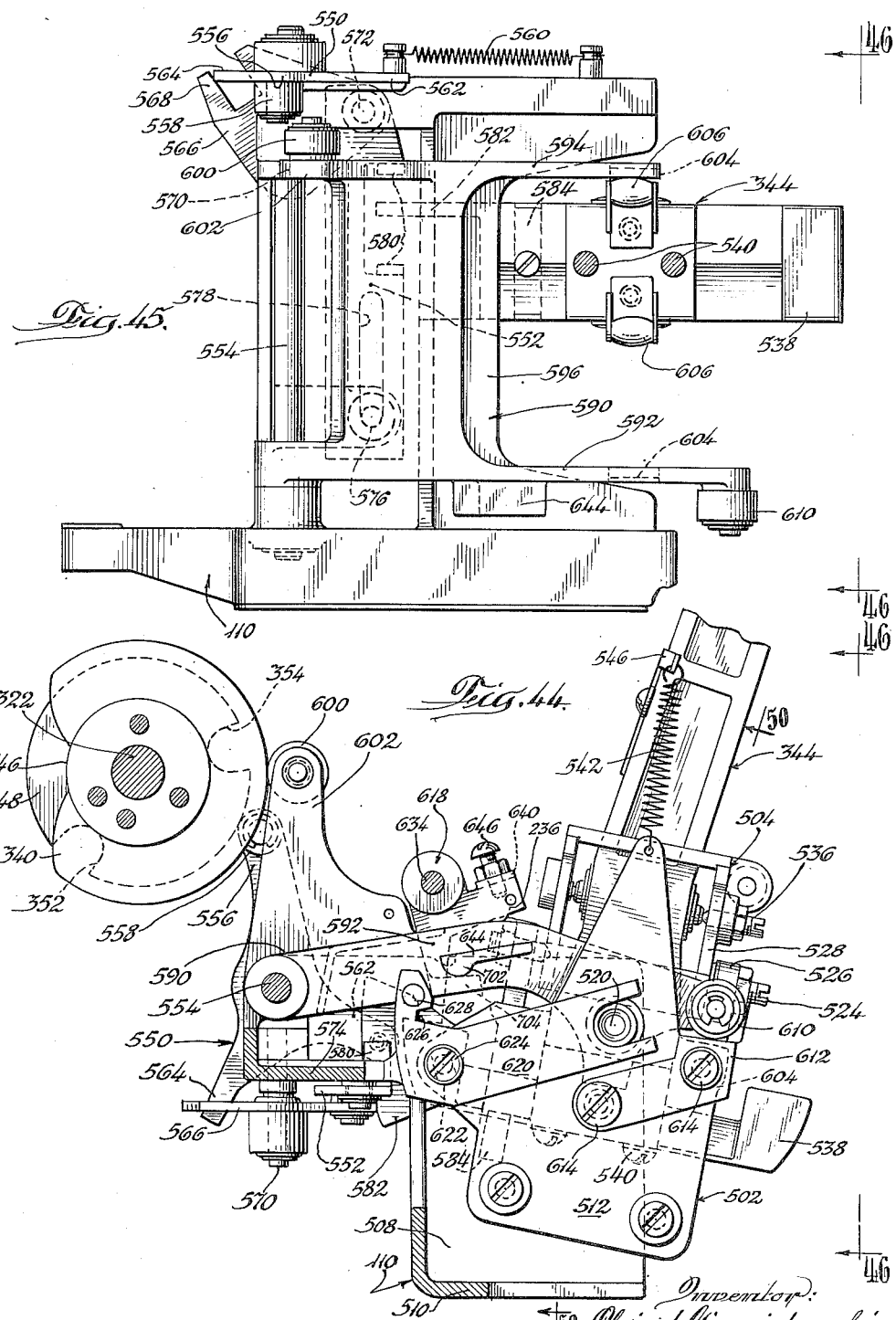

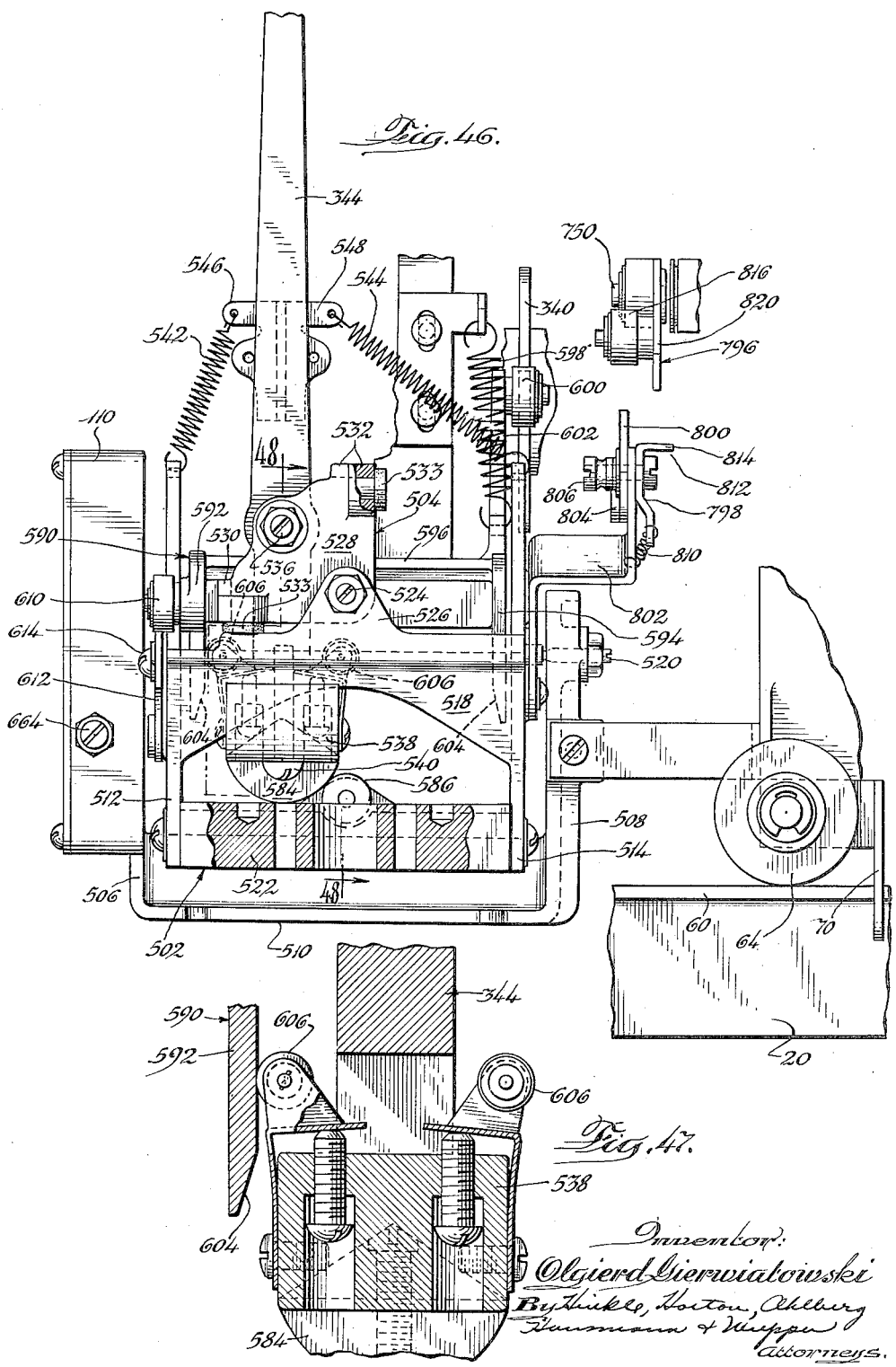

March 30, 1954     O. GIERWIATOWSKI     2,673,739
AUTOMATIC PHONOGRAPH
Filed April 15, 1947     32 Sheets-Sheet 27
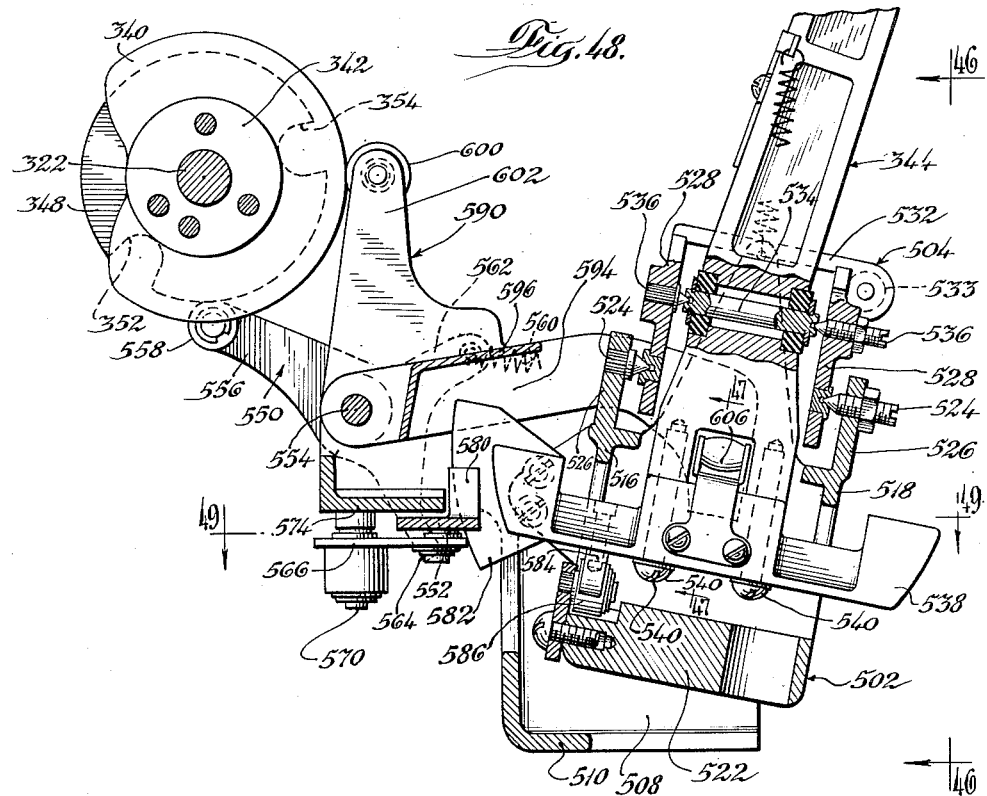
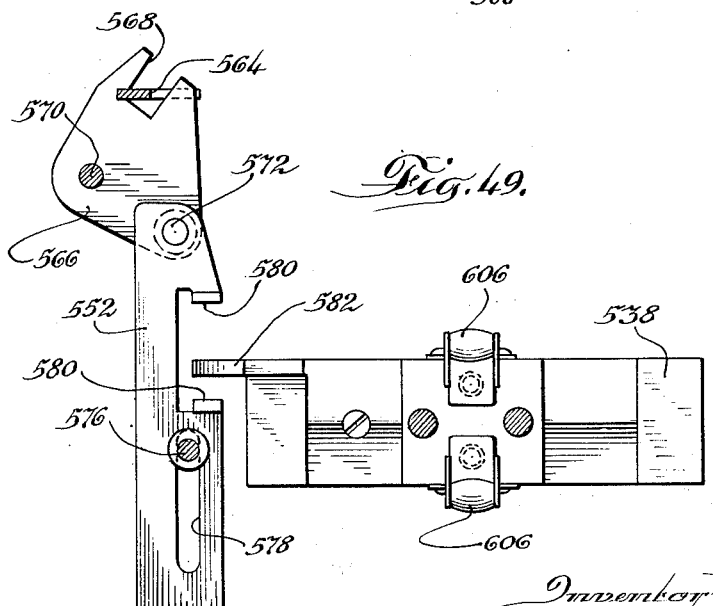

March 30, 1954 O. GIERWIATOWSKI 2,673,739
AUTOMATIC PHONOGRAPH
Filed April 15, 1947 32 Sheets-Sheet 28

Inventor:
Olgierd Gierwiatowski
By Hinkle, Horton, Ohlberg, Housman & Hippe
Attorneys.

March 30, 1954 O. GIERWIATOWSKI 2,673,739
AUTOMATIC PHONOGRAPH
Filed April 15, 1947 32 Sheets-Sheet 30

Inventor:
Olgierd Gierwiatowski
By Hinkle, Horton, Aheberg, Hausmann & Wippe
Attorneys

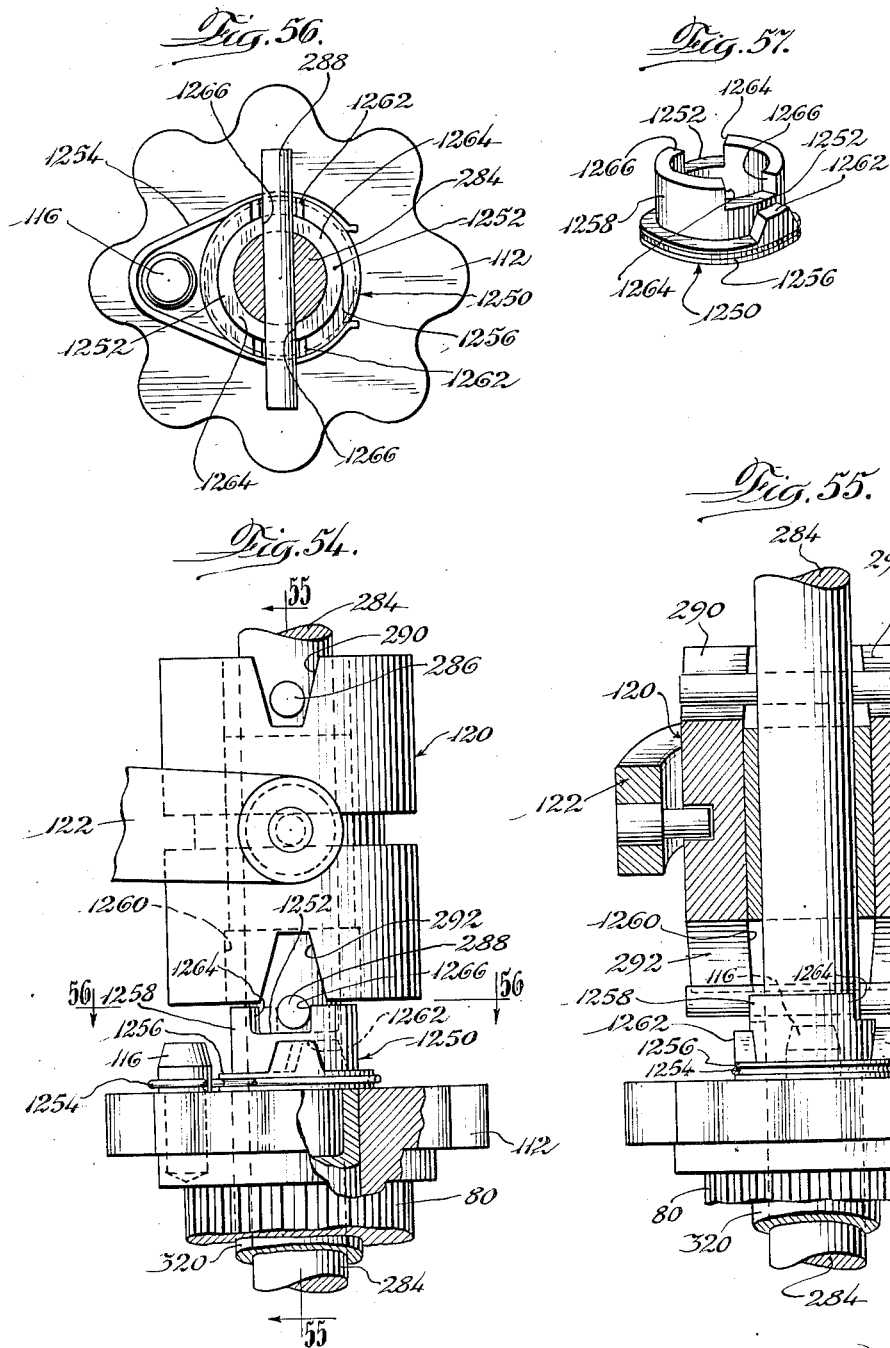

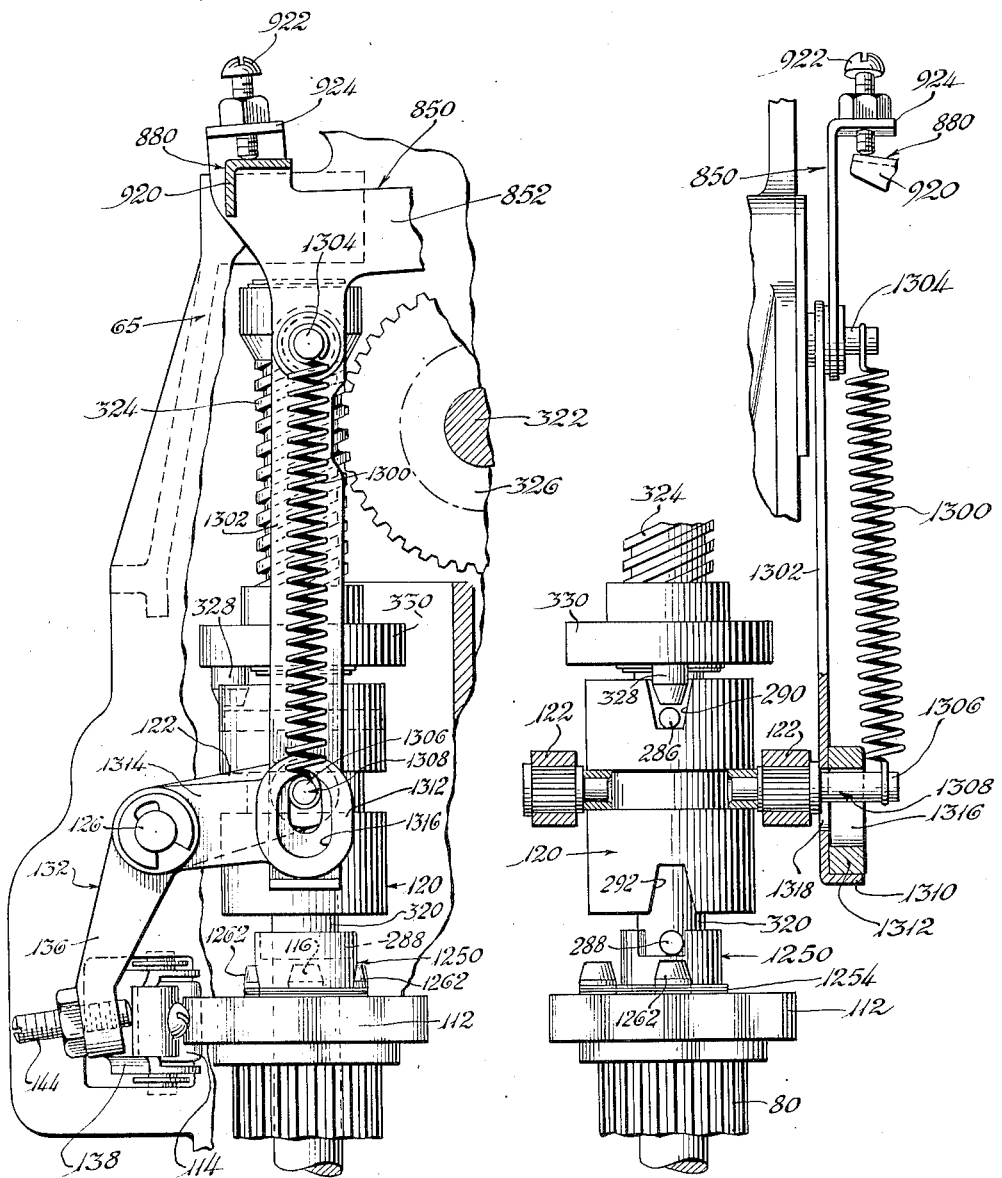

Patented Mar. 30, 1954

2,673,739

UNITED STATES PATENT OFFICE 2,673,739

AUTOMATIC PHONOGRAPH

Olgierd Gierwiatowski, Oak Park, Ill., assignor, by mesne assignments, to J. P. Seeburg Corporation, Chicago, Ill., a corporation of Illinois Application April 15, 1947, Serial No. 741,595

12 Claims. (Cl. 274—10)

The present invention relates to automatic phonographs and more particularly to phonographs of the same general type as that described and claimed in the co-pending application of Edward F. Andrews, Serial No. 441,625, filed May 4, 1942, now U. S. Patent No. 2,458,496.

This type of phonograph is particularly adapted for playing any desired number of records, and very few and simple additional parts are required for playing a very large number of records.

In the phonograph of the present invention a stationary record magazine is adapted to support different sized double faced disc records vertically in spaced apart relation. A carriage is mounted for bodily translatory movement alongside the magazine. This carriage has mounted on it a record transfer mechanism, means for supporting and rotating a transferred record in a playing position (which may be called a turntable), preferably a vertical one, and pickup means for playing either side of a record in the playing position. A construction of this general nature comprising a stationary magazine and movable carriage is decidedly advantageous when a large number of records is to be played because the overall length of the machine is determined by the length of the magazine alongside which the carriage moves.

A phonograph of the type to which the present invention pertains includes three main elements. The first of these is the stationary magazine, the second is the movable carriage which supports most of the operating and control mechanisms of the phonograph, and the third is a selector mechanism for selecting the record or records or sides of records to be played. All three of the foregoing elements are preferably supported upon a suitable chassis or base. The movable carriage supports, first of all, power means, preferably a reversible electric motor supplying motive power to drive the carriage in opposite directions on the base and to operate various operating and control mechanisms. A record rotating and supporting means or turntable defining a record playing position, and rotatable in opposite directions by the motor, a record transfer mechanism, and a portion of the selector mechanism are also mounted upon and move with the carriage. The carriage also supports pickup means having a needle means projecting in opposite directions therefrom and shiftable under the control of the selector mechanism, and more particularly in response to the direction of rotation of the reversible electric motor, for cooperation with one side of the playing position or the other, whereby both of the selected sides of records may be played selectively as the carriage moves, preferably in one of its two directions, which one direction will be hereinafter referred to as the playing direction. The other direction will hereinafter be referred to as the return direction. Mechanical and electrical controls for effecting operation of the various control and operating mechanisms for playing the record selections are also mounted upon the movable carriage.

The primary object of the present invention is to provide a new and improved automatic phonograph.

Another object of the present invention is to provide a new and improved guiding means for insuring straight line movement of the movable carriage upon its supporting member, and more specifically, to provide a new and improved guiding means for reducing angular movement of the carriage around a driving pinion mounted upon the carriage and engaging a stationary rack gear.

A further object of the present invention is to provide a new and improved phonograph having a novel positioning mechanism whereby the carriage and record transfer means are properly positioned relative to a selected record.

A further object of the present invention is to provide a new and improved record transfer mechanism including a movable record track or trough located between the magazine and turntable characterized particularly by the fact that the trough is raised by both sizes of records and is latched in raised position for the transfer of the smaller (10 inch) records and by the fact that the trough is raised and lowered back to its initial position in the transfer of larger size (12 inch) records.

A further object of the present invention is to provide a new and improved means for properly positioning the pickup means at an initial playing position for both small and large sized records. This novel means is characterized by a pickup means positioning member which is latched to the pickup means for positioning the pickup means and which is released from the pickup means in order to enable the latter to follow the record grooves after the needle means is brought into contact with the record.

A further object of the present invention is to provide a new and improved biasing arrangement for biasing the pickup means toward the initial record grooves more strongly on one side of the record than on the other, which means may comprise selectively operable means for rendering effective a single biasing spring when playing one side of a record and two biasing springs when playing the other side, that side where the pickup means is tended to be moved outwardly or away from the record grooves by the direction of rotation of the record.

A further object of the present invention is to provide a new and improved phonograph having improved selectively operable clutch means for driving either the carriage driving means or the various controls and operating mechanisms.

A further object of the present invention is to provide an automatic phonograph with new and improved control mechanisms, characterized especially by the utilization of a single electrically controlled device, and more specifically including preferably an electromagnetic relay, controlling clutch means in response to a record selector control impulse and also in response to a control impulse produced at the end of the playing of a record.

A further object of the present invention is to provide an automatic phonograph with a new and improved control mechanism for effecting the movement of clutch means into carriage driving position.

A further object of the present invention is to provide an automatic phonograph with a new and improved mechanical control means for preventing the reversible motor from driving the carriage in an undesired direction (the return direction) after the playing of a record requiring the motor to be rotated in a direction which would drive the carriage in the undesired direction. A preferred embodiment of this control mechanism is constructed and arranged so that the carriage is not driven until the motor has actually reversed to drive the carriage in the proper direction, and irrespective of the time required to reverse the motor.

Still a further object of the present invention is to provide an automatic phonograph with a new and improved means for controlling the pickup means comprising means movable transversely of the record playing position for controlling the pickup means and effecting cooperation thereof with opposite sides of records in the playing position, and more specifically, comprising rotatable means and means movable transversely of said playing position by said rotatable means and controlling the pickup means.

A further object of the present invention is to provide an automatic phonograph with a new and improved safety trip mechanism for controlling movement of clutch means, which mechanism comprises means responsive to the record position and cam controlled means cooperatively associated with said record position responsive means so that the clutch means is not moved in the event a record has not moved to a predetermined position and until the cam means has moved to a predetermined position.

Another object of the present invention is to provide a new and improved record magazine and a magazine particularly adapted to be utilized in connection with a movable record transfer member having a widened record edge engaging end.

The drawings:

Other objects and advantages of the present invention will become apparent from the ensuing description thereof, in the course of which reference is had to the accompanying drawings, in which:

Fig. 3 is a fragmentary rear elevational view of the phonograph;

Figure 1:
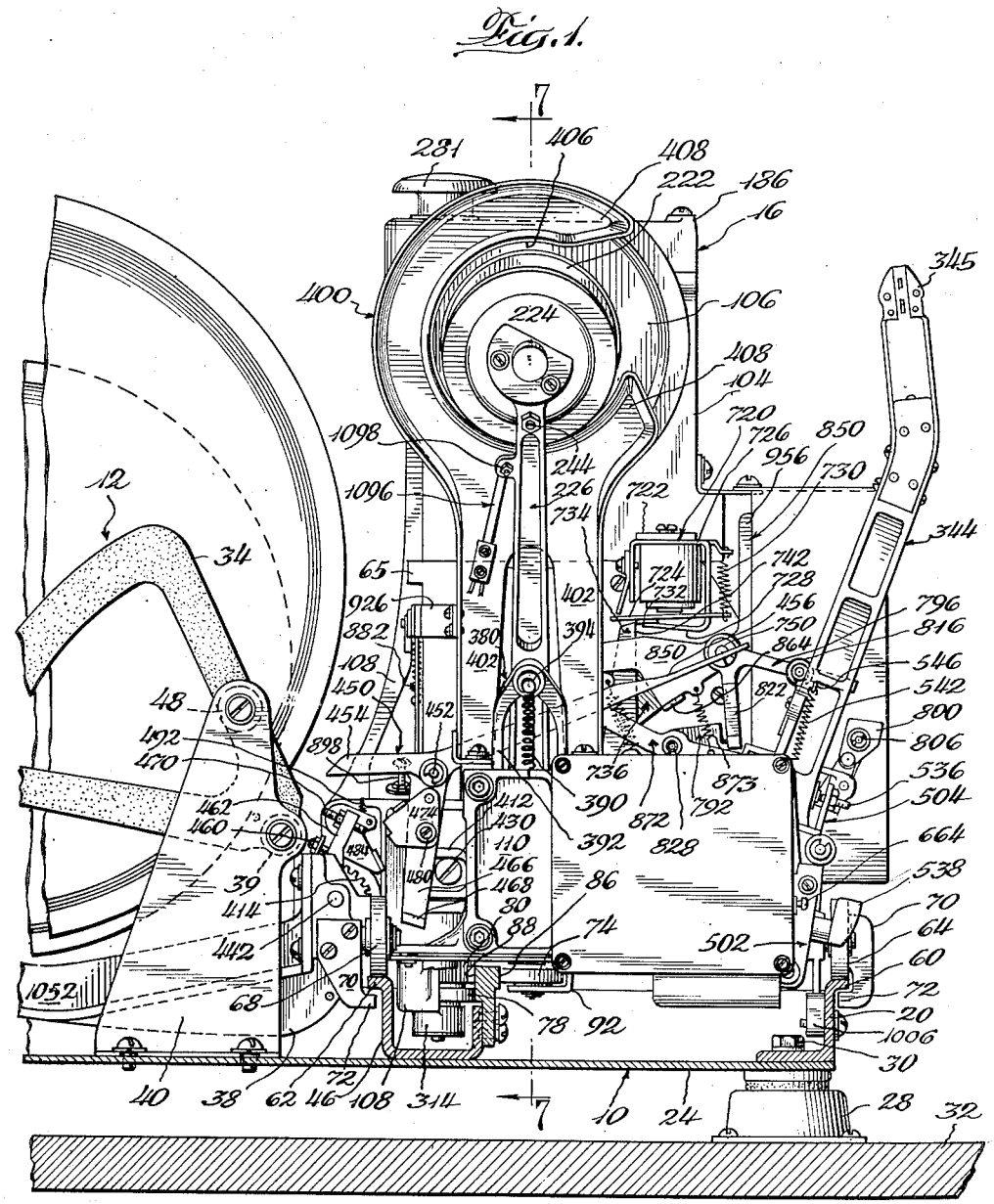
Fig. 1 is, accurately speaking, a cross-sectional view taken along the line 1—1 of Fig. 5, but is also substantially a side elevational view of a phonograph constructed in accordance with the present invention. The view is that of the right side of the phonograph, it being assumed that the front of the phonograph is that at which the records and selector mechanism are located.
Figure 2:
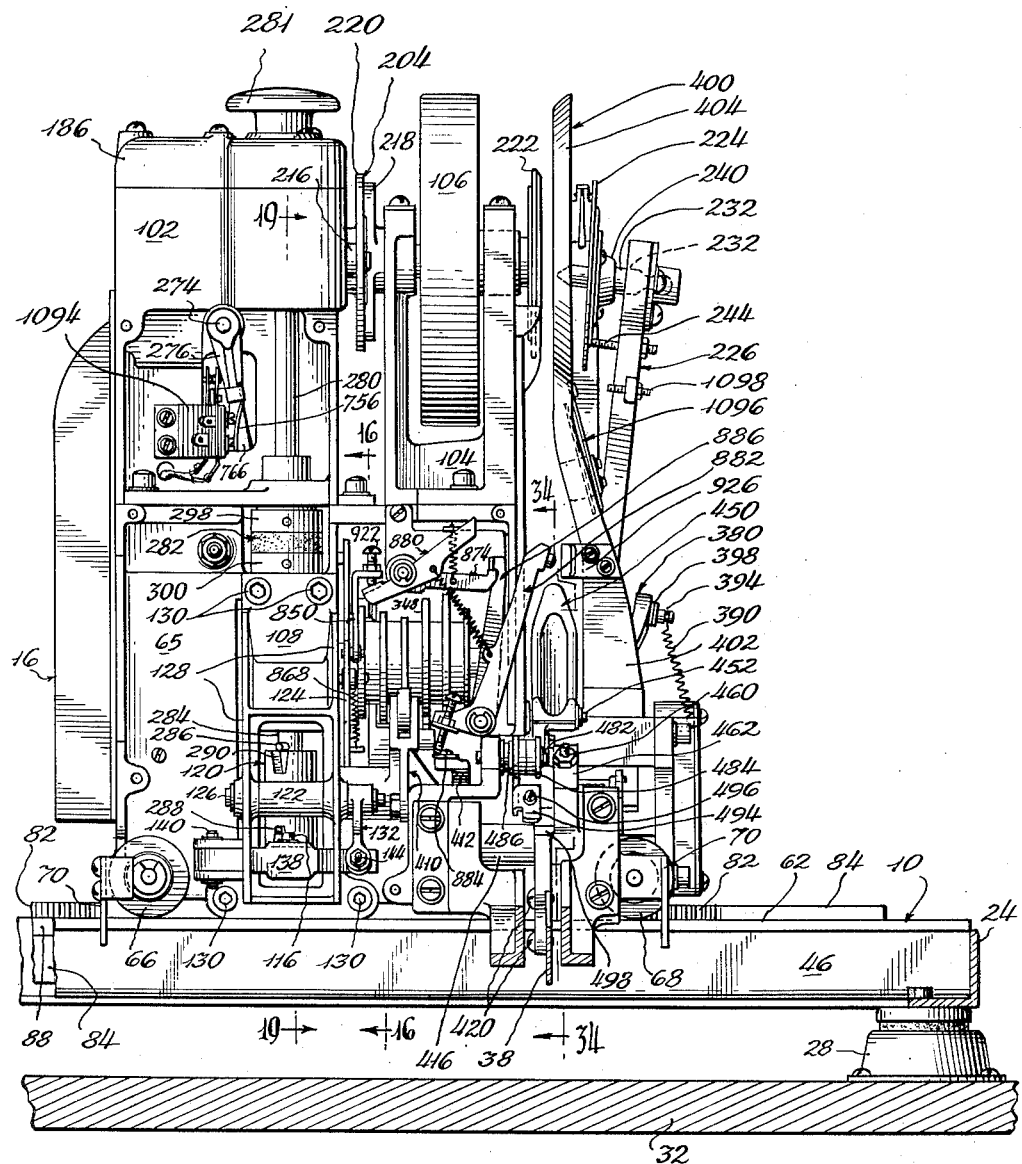
Fig. 2 is a fragmentary front elevational view of the movable carriage and its supporting means, the view being taken generally along the line 2—2 of Fig. 5, with the record magazine shown in the latter omitted.
Figure 7:
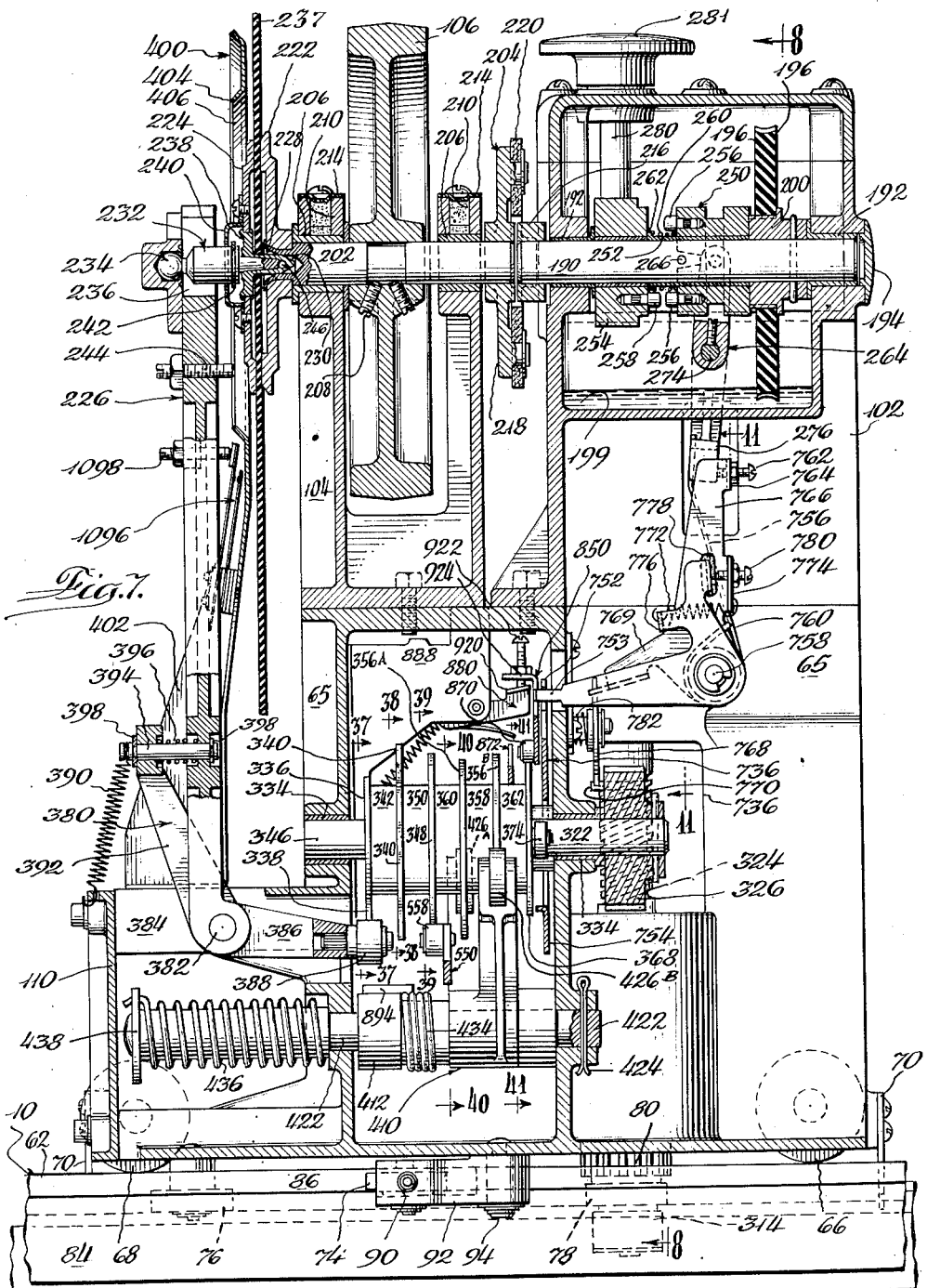

Fig. 7 is an enlarged vertical cross-sectional view taken along the line 7—7 of Fig. 1 (also Fig. 8) and illustrating particularly the turntable driving means, a selectively operable clutch (termed a cycling clutch) through which the carriage driving means and a control camshaft are driven and its associated control, the camshaft, and the record clamping means. The apparatus is illustrated with a record clamped in playing position and when the record is being played;

Fig. 8 is a vertical cross-sectional view taken along the broken line 8—8 of Fig. 7 but with the apparatus in a different condition, and illustrating particularly details of the reversible motor and associated driving connections of the control for the cycling clutch and for the record clamping means;

Fig. 9 is a fragmentary sectional view taken along the line 9—9 of Fig. 8 and illustrating details of the cycling clutch control mechanism;

Fig. 10 is a fragmentary cross-sectional view similar to Fig. 7 illustrating the cycling clutch control mechanism in what may be termed its normal position;

Fig. 11 is a cross-sectional view taken along the line 11—11 of Figs. 7 and 10 illustrating the cycling clutch control mechanism in a position corresponding to that in which it is illustrated in Fig. 7;

Fig. 12 is a fragmentary vertical cross-sectional view taken along the broken line 12—12 of Fig. 3 and illustrating details of construction of the means for shifting the playing arm from one side of the record to the other in response to the direction of rotation of the cam shaft and driving motor and illustrating also details of the player arm trip mechanism;

Fig. 13 is a fragmentary top plan view, with certain top covers removed, and partly broken away, illustrating particularly the construction of the cycling clutch and the turntable and other driving means;

Fig. 14 is a fragmentary vertical cross-sectional view taken along the line 14—14 of Fig. 13 and illustrating the construction of a flexible coupling interposed in the turntable drive;

Fig. 15 is a fragmentary vertical cross-sectional view taken along the line 15—15 of Fig. 13 illustrating details of the turntable shaft mounting and lubricating arrangement;

Fig. 16 is an enlarged fragmentary vertical cross-sectional view taken along the line 16—16 of Fig. 2 and illustrating particularly details of construction of a double clutch which is selectively movable to drive the carriage moving means or the cam shaft and which has associated with it the means for properly positioning the carriage relative to a selected record. The shiftable clutch member is illustrated in position to drive the carriage moving means, i. e., in its down position.

Figure 4:
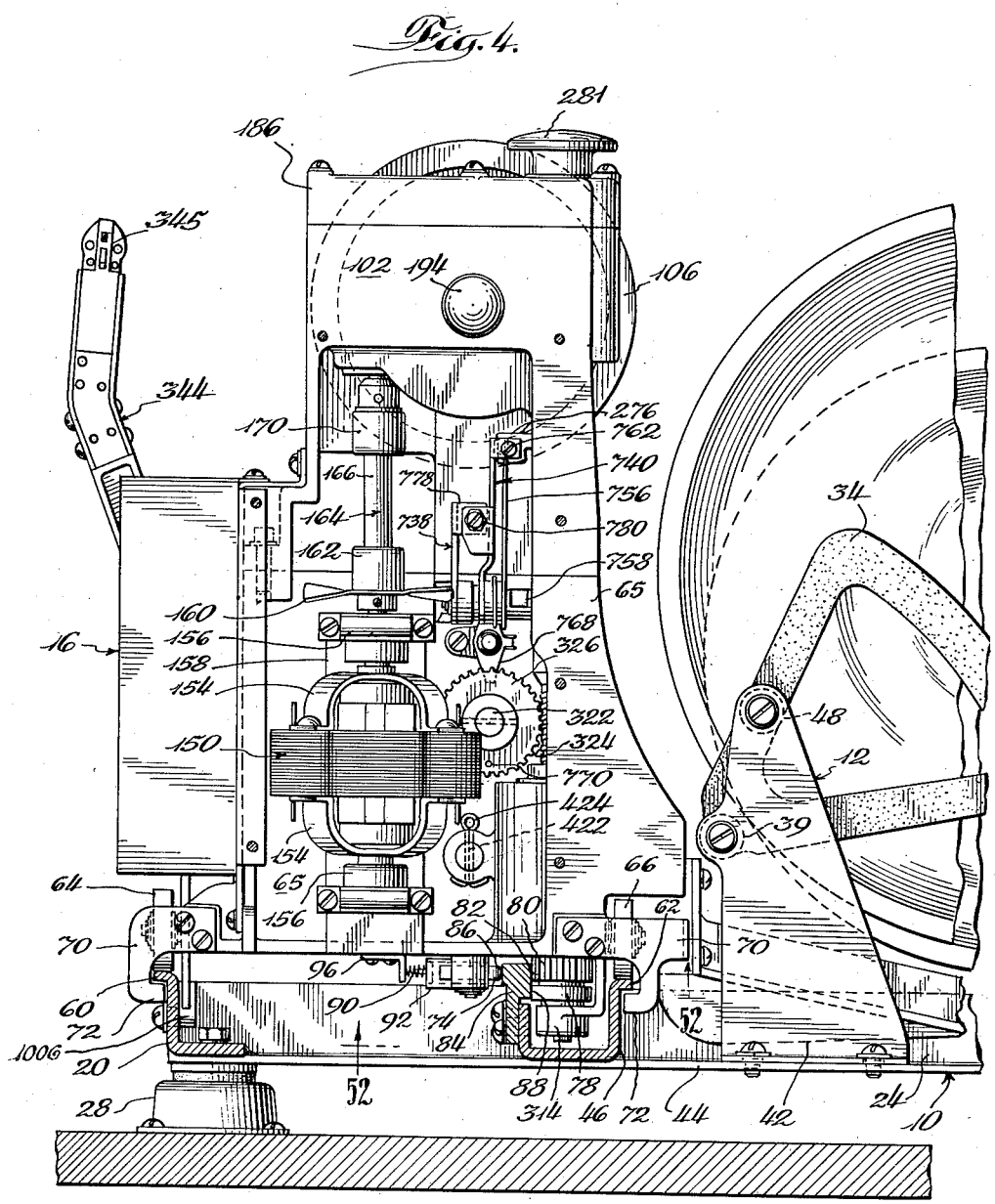
Fig. 4 is, accurately speaking, a sectional view taken along the line 4—4 of Fig. 5 but is in effect a fragmentary left-side elevational view.
Figure 5:
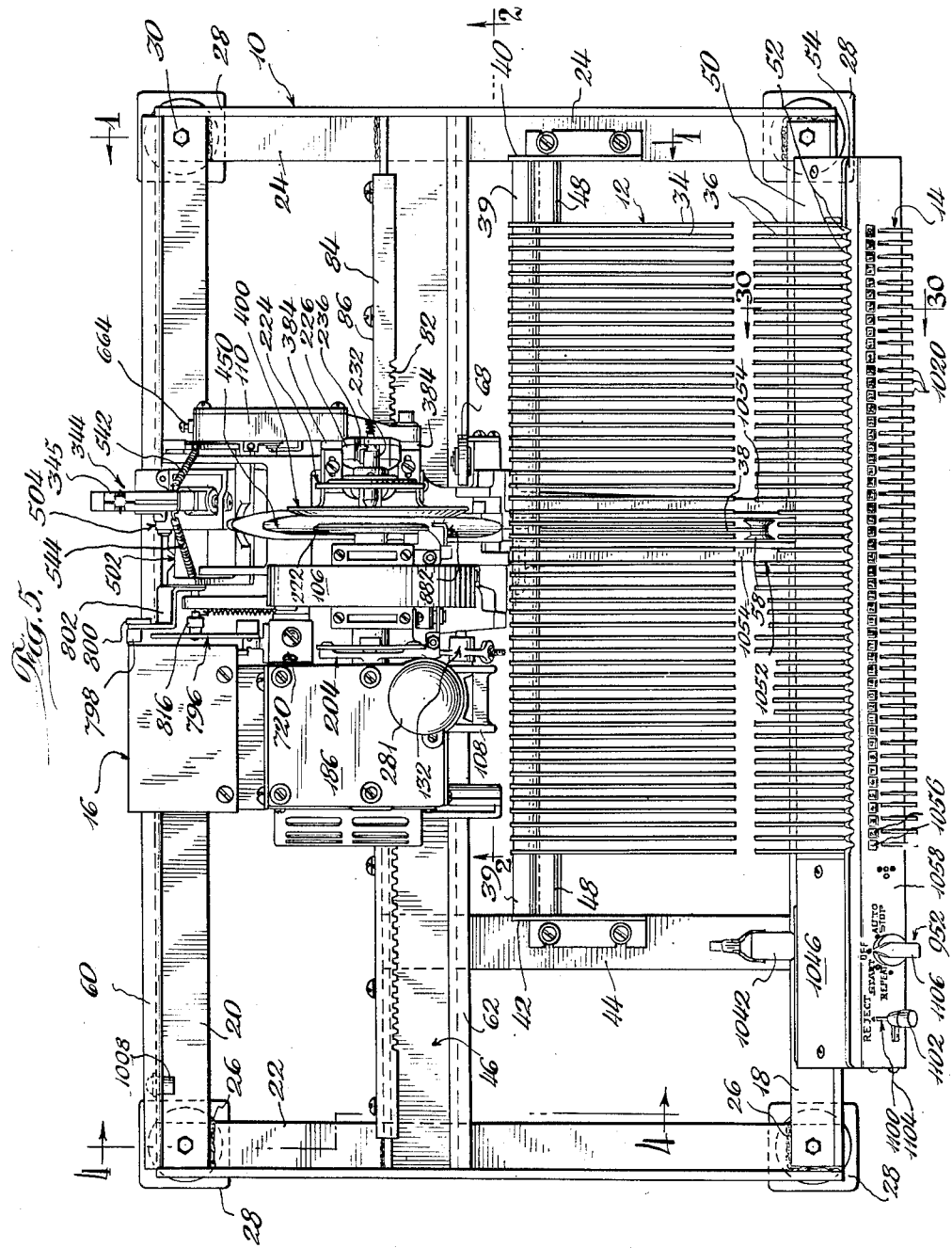
Fig. 5 is a top plan view of the phonograph.
Figure 50:
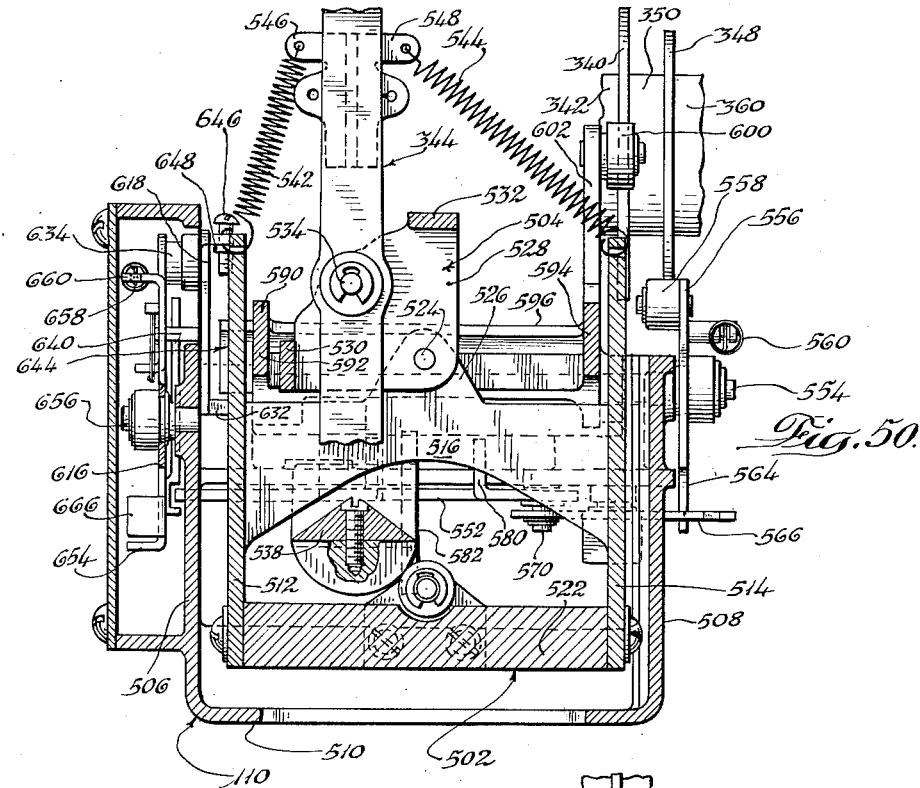
Figure 51:
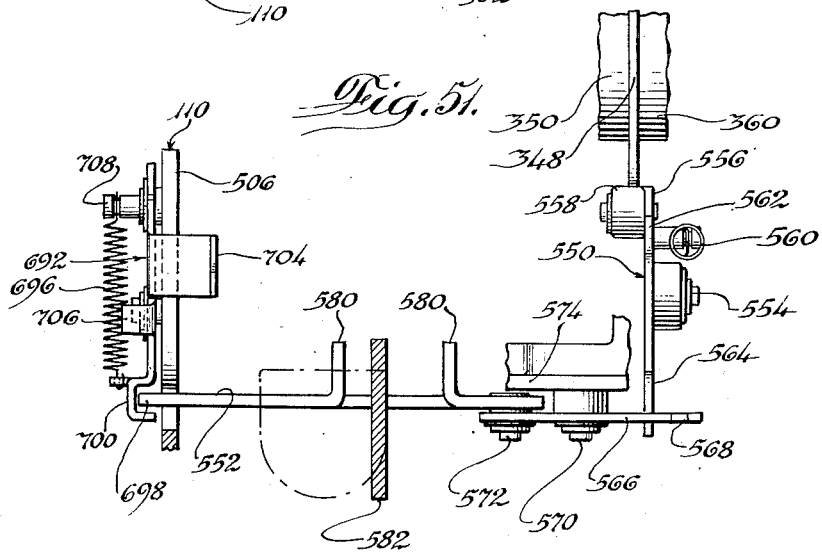
Figure 52:
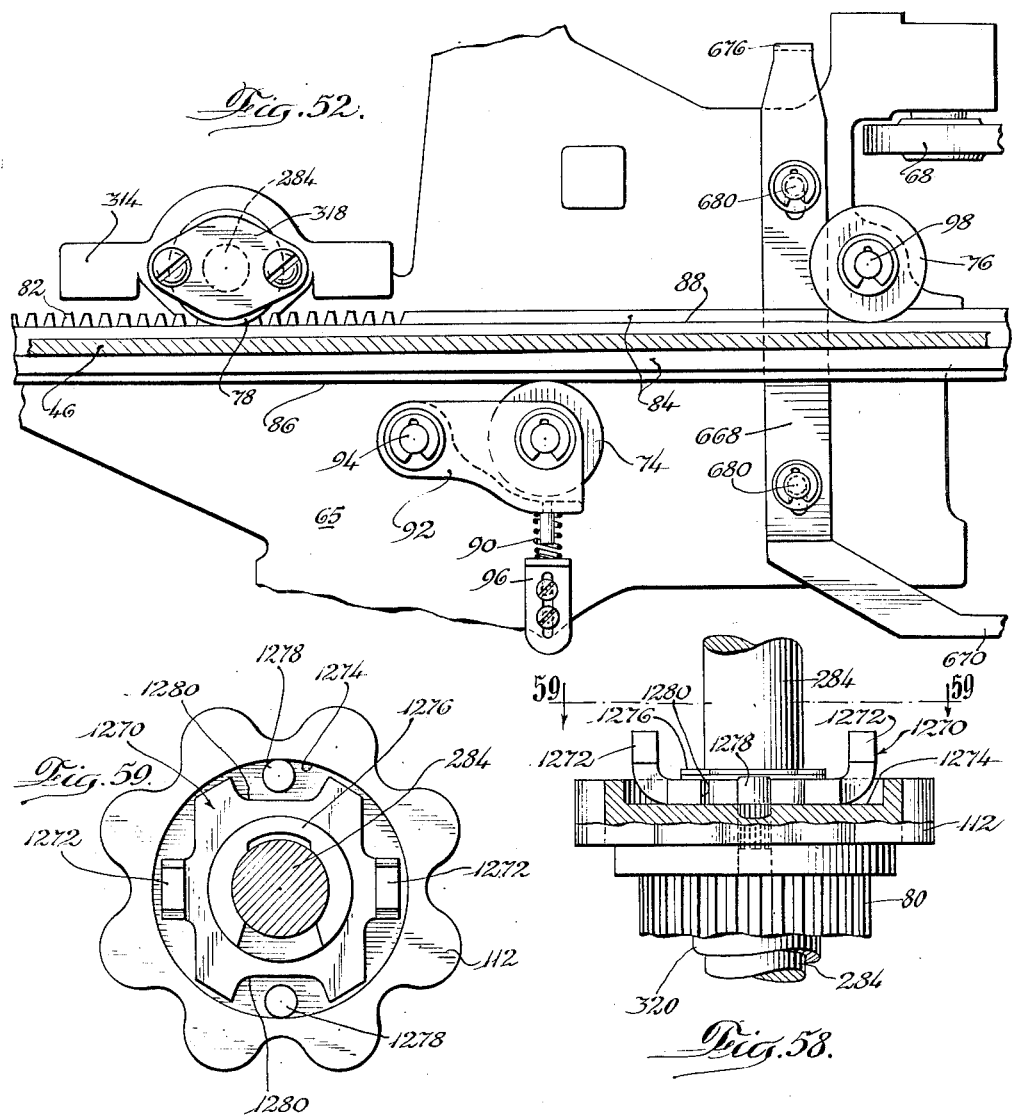
Figure 53:
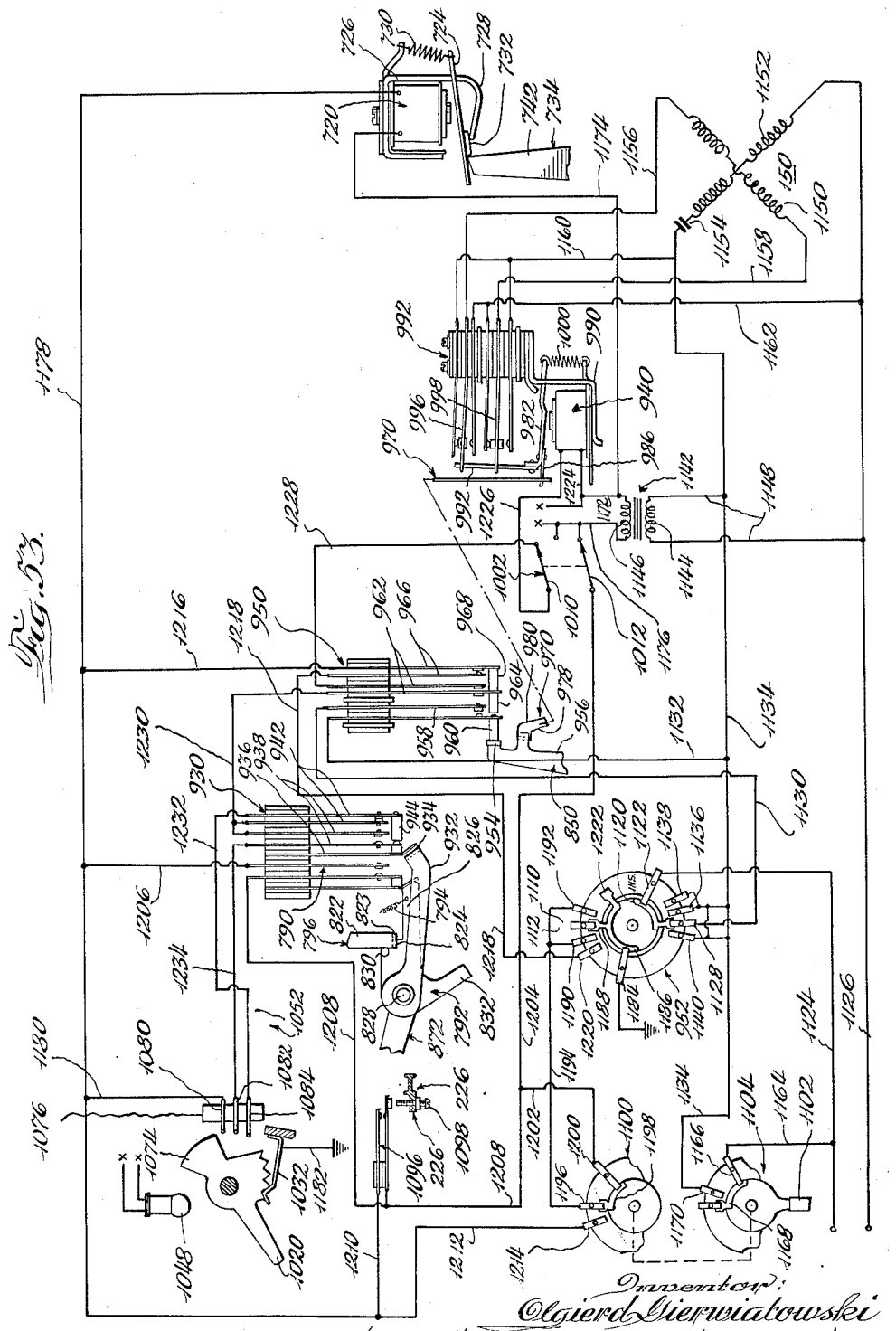

Fig. 17 is a horizontal cross-sectional view taken along the broken line 17—17 of Fig. 16 and illustrating additional details of construction of the double clutch and carriage positioning means;

Fig. 18 is a generally horizontal cross-sectional view taken along the broken line 18—18 of Fig. 16 illustrating additional details of the carriage positioning means;

Fig. 19 is an enlarged fragmentary vertical cross-sectional view taken along the line 19—19 of Fig. 2 (also 19—19 of Fig. 20) illustrating details of construction of the double clutch mechanism, the carriage and cam shaft driving mechanism and the carriage positioning and guiding means;

Fig. 20 is a view of the mechanism illustrated in Fig. 19 looking at it in the direction of line 20—20 of Fig. 19;

Fig. 21 is a horizontal cross-sectional view taken along the line 21—21 of Fig. 20 and illustrating details of construction of a flexible coupling interposed in the drive to the double clutch;

Fig. 22 is an enlarged fragmentary rear elevational view of the phonograph illustrating details of both the structures and controls, notably those of and associated with the clutch shifting and record transfer mechanism, and conditioned to drive the carriage;

Fig. 23 is a fragmentary perspective view of certain of the controls illustrated in Fig. 22, notably of the clutch shifting control;

Fig. 24 is a fragmentary vertical cross-sectional view taken along the line 24—24 of Fig. 22 and illustrating details of the record transfer mechanism;

Fig. 25 is an enlarged fragmentary right side elevational view, partly broken away, and illustrating in the main details of construction of the means for positioning and biasing the player arm for playing different sizes and sides of records;

Fig. 26 is a fragmentary vertical cross-sectional view taken along the line 26—26 of Fig. 22 and illustrating details of construction of a trip mechanism actuated to stop the carriage in position to play a selected record and also actuated at the end of the playing of a record to initiate certain operations. The trip mechanism is shown in the position occupied by it when the carriage is at its "home" position, whereat it is at rest, or in the position occupied by it when the carriage is moving alongside the magazine to the next selected record;

Fig. 27 is a view similar to Fig. 26 with the trip mechanism in the position occupied by it after it has been tripped in response to the selection of a record and more particularly for the playing of the left-side of the record;

Fig. 28 is a view similar to Figs. 26 and 27 illustrating the trip mechanism in still a different position, i. e., playing the left-side of a record;

Fig. 29 is an enlarged rear elevational view illustrating, among other things, a motor reversing relay, mechanism for operating the relay at the limits of carriage travel, and the details of a latch for mechanically latching the relay in its operated position during the playing of the right-side of a record;

Fig. 30 is an enlarged vertical cross-sectional view taken along the line 30—30 of Fig. 5 and illustrating details of construction of the selector mechanism and showing in phantom the three operative positions of a selector element;

Fig. 31 is a fragmentary horizontal cross-sectional view taken along the broken line 31—31 of Fig. 30;

Fig. 32 is a generally horizontal cross-sectional view taken along the line 32—32 of Fig. 30;

Fig. 33 is a generally vertical cross-sectional view taken along the line 33—33 of Fig. 30;

Fig. 34 is a fragmentary enlarged vertical cross-sectional view, partly broken away, taken along the staggered line 34—34 of Fig. 2 and illustrating details of the record transferring means;

Fig. 34a is a fragmentary enlarged cross-sectional view through the record trough latching mechanism;

Fig. 35 is a fragmentary vertical cross-sectional view, similar to Fig. 34, but on a smaller scale and illustrating more of the apparatus, with the parts in an intermediate position during the transfer of a 10" record to the playing position. The view illustrates the trough latched in its upper position for the transfer of the 10" record;

Fig. 36 is a view similar to the two preceding figures and illustrating a 12" record in playing position;

Fig. 37 is a fragmentary cross-sectional view taken along the line 37—37 of Fig. 7 and illustrating the cam and cam follower for actuating the record clamping means;

Fig. 38 is a similar view taken along the line 38—38 of Fig. 7 illustrating the cam and cam follower and a portion of the mechanism for moving the player arm into initial playing position and toward and away from the record;

Fig. 39 is a similar view taken along the line 39—39 of Fig. 7 of the cam and cam follower end portion of the mechanism for shifting the player arm from one side of the record to the other depending upon the direction of rotation of the cam shaft and motor. In this view the apparatus is shown in the position occupied by it after having played the right-side of a record and conditioned to play the right-side of the next record;

Fig. 40 is a similar view taken along the line 40—40 of Fig. 7 and illustrating the cams and associated mechanism for transferring records;

Fig. 41 is a further similar view taken along the line 41—41 of Fig. 7 and illustrating, among other things, the cams and associated control mechanisms of the trip and clutch shifting mechanisms;

Fig. 42 is a generally horizontal cross-sectional view, partly broken away, taken along the line 42—42 of Fig. 34 and illustrating details of the record transfer mechanism and mechanism for positioning the player arm at initial playing position for the playing of 10" or 12" records;

Fig. 43 is a fragmentary vertical cross-sectional view taken along the broken line 43—43 of Fig. 13 and illustrating details of an arrangement for lubricating a vertical shaft driven by the motor and driving the turntable shaft;

Fig. 44 is an enlarged fragmentary vertical cross-sectional view taken along the line 44—44 of Fig. 3 and illustrating details of the pickup means shifting mechanism, and the mechanism for moving the pickup means to its initial playing position and into and out of engagement with the record, the view illustrating the apparatus conditioned for playing the left-side of a record;

Fig. 45 is a top plan view of a portion of the apparatus illustrated in Fig. 44, the cams and player arm supporting cradle having been omitted;

Fig. 46 is a fragmentary elevational view taken along the lines 46—46 of Figs. 44, 45 and 48 illustrating further the player arm assembly and associated mechanisms;

Fig. 47 is a fragmentary cross-sectional view taken along the line 47—47 of Fig. 48 illustrating details of the mechanism for moving the pickup means into and out of contact with the record;

Fig. 48 is a generally vertical cross-sectional view taken along the line 48—48 of Fig. 46, the view illustrating the apparatus conditioned for playing the right-side of a record;

Fig. 49 is a generally horizontal cross-sectional view taken along the line 49—49 of Fig. 48, with various parts omitted better to illustrate the manner in which the pickup means is shifted from one side of the playing position to the other;

Fig. 50 is a fragmentary cross-sectional view of the player arm assembly, the view being taken along the line 50—50 of Fig. 44, but illustrating the pickup means in position to play the right-side of a record;

Fig. 51 is a view similar to Fig. 50 but illustrating only the mechanism for shifting the pickup means from one side of the playing position to the other and for latching a slidable plate associated with one of the pickup means biasing springs;

Fig. 52 is a fragmentary bottom elevational view taken along the line 52—52 of Fig. 4 and illustrating the carriage guiding means;

Fig. 53 is a schematic diagram illustrating the various electrical and mechanical controls embodied in the phonograph;

Fig. 54 is a fragmentary elevational view of a mechanism associated with the clutch means for preventing it from being moved downwardly into carriage drive position unless it is being rotated in the proper direction to drive the carriage in selecting direction, i. e., the arrangement prevents "back stepping" of the carriage;

Fig. 55 is an axial cross-sectional view through the mechanism illustrated in Fig. 54, the view being taken along the line 55—55 of Fig. 54;

Fig. 56 is a horizontal cross-sectional view taken along the line 56—56 of Fig. 54;

Fig. 57 is a perspective view of a fitting forming an element of the construction illustrated in the three preceding figures;

Fig. 58 is a view similar to Fig. 54, the shiftable clutch member having been omitted, of a modified arrangement for preventing back stepping;

Fig. 59 is a horizontal cross-sectional view taken along the line 59—59 of Fig. 58;

Fig. 60 is a side elevational view of a fitting embodied in the modification of the last two mentioned figures;

Fig. 61 is a fragmentary elevation view of an alternative clutch shifting mechanism;

Fig. 62 is an axial cross-sectional view through the mechanism illustrated in Fig. 61.

*General introduction*

Before describing in detail the phonograph illustrated in the drawings and embodying the present invention, it may be well briefly to describe the sequence of the main operations that take place in the selection and playing of the selected records.

The phonograph is controlled at the phonograph although it should be understood that some suitable remote control could be utilized, if desired. It includes a selector mechanism comprising a number of selector elements corresponding to the individual records and operable into a plurality of positions from a non-selective position. In a first position, only the right-side of the selected record is played, in a second position both the left and right sides of a record are played, and in the order mentioned, and in a third position only the right-side of a record is played. The selections may be made at any time but for convenience it will be assumed that the selections are made before the phonograph is placed into operation.

The phonograph is placed into operation by the operation of a manually controlled multi-position switch having (1) an "off" position, (2) a "start" position in which the apparatus is started and continues to run as long as the switch remains in that position, (3) an "automatic stop" position in which the phonograph continues to run to play all the selected records and returns to a "home" position, where it is stopped, and (4) a "repeat" position in which the selected recording is repeatedly played.

The phonograph includes also a two-position switch operable into (1) a "reject" position wherein a selected record being played will be returned to the magazine, and (2) a "scan" position wherein the motor is energized to move the carriage (provided no record is being played) until the switch is released. This last switch is biased to return to a neutral position.

When the phonograph is placed in operation, as by the movement of the main control switch, to its "start" position, assuming that the phonograph is in its "home" position, the motor is energized and drives the carriage through clutch means shown as including a pair of clutches, one of which is a cycling clutch and which is engaged at all times except when a record is being played, and the other of which is a double clutch occupying one (lower) position to drive the carriage and a second (upper) position to drive the cam shaft and associated mechanisms. It will be understood, therefore, that initially the cycling clutch is engaged and the double clutch is in its lower position. The carriage is moved by the motor until the carriage reaches a position corresponding to the selected record. At this point a circuit is closed through the selector mechanism, which includes the previously referred to selector elements and a bracket moving with the carriage upon which are mounted three contacts, one or more of which are engageable with the selector elements depending upon the position of the selector element. For present purposes, it is believed sufficient to say briefly that if only the left-side of a record is to be played, then a trip relay is energized and the double clutch shifted upwardly. The driving motor continues to rotate in the same direction and drives the cam shaft in a predetermined (counterclockwise) direction to effect the transfer, clamping, disengagement of the cycling clutch and playing the left-side of the record. It also resets the trip relay, which is again energized at the end of the playing of the record by a player arm trip mechanism, as a result of which the cycling clutch is again engaged and the record transferred back to the magazine and the double clutch shifted down to move the carriage.

In the event both the left and right sides of the selected record are to be played, the record is only partly returned to the magazine and the direction of rotation of the motor is reversed thereby to shift the pickup means to the other side of the playing position to play the right side of the record and the record is returned to the playing position where it is clamped and played as before. After playing, the cam shaft is again driven to return the record to the magazine. When the record is returned, the motor rotation is again reversed, whereby the motor drives the carriage in the proper or selecting direction.

When the right-side only of a record is to be played, the motor reverses immediately, the double clutch shifts upwardly to drive the cam shaft through the record playing cycle, and again when the record is returned to the magazine and the double clutch is shifted downwardly to move the carriage in selecting direction.

Provision is made for playing either 10" or 12" records and means are provided for properly locating the two sizes of records relative to the clamping means and provision is also made for properly locating the pickup means at initial playing position for both sizes of records.

*Main supporting structure*

Referring now more particularly to Figs. 1 to 5, inclusive, it may be noted that the phonograph of the present invention includes a generally rectangular base or chassis 10 supporting the relatively movable magazine and carriage. The record magazine 12 is stationary and located at the front, as is the record selecting means 14. The movable carriage 16 is mounted at the rear side of the base.

The base consists primarily of front and rear angle iron supports 18 and 20 interconnected by similar cross left and right pieces 22 and 24. These four frame defining members are suitably held together, as by welding 26 (see Fig. 5). The base is preferably mounted upon four rubber cushioned supports 28 secured to the base as by bolts 30. The supports are secured to a suitable mounting plate 32 (see Figs. 1 to 4, inclusive) which may form a part of a suitable cabinet which has not been illustrated in order that the construction of the phonograph itself may be observed more readily.

*The record magazine*

The record magazine is adapted to hold both 10" and 12" records, the records preferably being mounted between vertically disposed generally segment-shaped rear spacers 34 and aligned generally triangular front spacers 36 spaced from the former to enable a record transfer arm 38 to pass therebetween and from the front to the rear of the rear spacers 34 as will appear hereinafter. The spacers are preferably covered with some suitable soft covering to minimize damage to the records.

The rear spacers 34 are supported in spaced apart relation upon a rod 39 extending longitudinally of the machine and supported by a pair of upwardly extending brackets 40 and 42 secured to cross frame member 24 and a cross piece 44 extending across and secured to front frame member 18 and an intermediate chanel-shaped member 46 to which further reference will be had shortly. The end spacers 34 are additionally secured to the mounting brackets 40 and 42 by short rods 48. The front spacers 36 are secured to downwardly and rearwardly inclined plate 50 forming the top plate of the selector mechanism 14 (see Fig. 30).

The records are additionally positioned by generally triangular positioning teeth or projections 52 formed on the upper edge of a front closure plate 54 for the selector mechanism. To prevent damage to the records a resilient upper cord 56 is passed through the spacers 36 so as to extend above the lowermost points of the grooves defined by the teeth 52 so that the records will seat upon the rubber rather than upon the plate 54.

The record spacers 34 and 36 are aligned with each other and spaced apart a sufficient distance easily to receive a record therebetween. The dividing of the spacers into the two groups 34 and 36 enables the record transfer arm to be provided with a relatively wide record-engaging button 58 at its outer or front end, thereby to insure the record being readily received by the transfer arm either when the transfer arm is moved upwardly to take the record from the magazine or to receive the record when the record is returned to it from the playing position.

*Carriage supporting and guiding means*

The carriage is mounted for movement along the rear side of the record magazine upon a rail 60, preferably formed as an integral flange of the rear frame 20 and upon a rail 62 preferably formed as a flange integral with the intermediate cross piece 46, which also extends across the end frames 22 and 24 and is secured thereto as by welding. The carriage is provided with a three-point support constituted by a generally centrally located rear wheel 64 rotatably secured to a main carriage casting 65 and resting upon the rail 60 and a pair of wheels 66 and 68 secured near the opposite ends of the front side of the carriage and resting upon the front rail 62.

In order to prevent the carriage from being lifted off the rails or tipping thereon because of unusual movements, there are provided three brackets 70 having fingers 72 extending underneath the front and rear rails. The brackets, it may be noted, are located near the three supporting wheels.

The carriage is constrained for straight line movement in novel manner by a spring pressed roller adapted to engage one guide surface and to force two other rollers against an opposite guide surface. Further to prevent undesired movement, one of the two last mentioned rollers is formed as an integral part of a pinion through which the carriage is moved. Referring now more particularly to Figs. 4 and 52, the spring pressed guide roller is indicated by reference character 74 and two other rollers are indicated by reference characters 76 and 78, the latter being rotatably mounted below a carriage driving pinion 80. The latter is rotatably mounted on the carriage and meshes with a rack gear 82 formed at the upper front side of a rail 84 secured to the rear side of the intermediate channel support 46. The spring pressed roller 74 engages a vertical guide surface 86 at the upper rear side of the rail 84 while the rollers 76 and 78 engage a vertical guide surface 88 at the front of the rail and below the rack gear 82.

The roller 74 is adjustably biased against the guide surface 86 by a spring 90 acting against a pivotally mounted roller carrier 92 secured to the underside of the main carriage casting 65 as by a pin 94. The spring abuts against the carrier and an adjustable slide bracket 96 whereby the tension of the spring and the pressure applied to the guiding means may be adjusted. The roller 76 is supported by a pin 98 secured to the underside of the chassis 65.

The foregoing arrangement having one roller coaxial with the driving pinion and another on the same side of the rack and spaced from the first and with the spring pressed roller on the other side of the rack between the two first mentioned rollers reduces the angular movement of the carriage around the driving pinion, whereby the carriage is constructed to move along the rail without undue wabbling.

*The carriage assembly*

The movable carriage 16 is made up of a number of castings, of which the previously referred to main casting 65 is one. It includes also a casting 102 located at the upper left side of the carriage and housing the cycling clutch and associated driving mechanisms, a casting 104 supporting in the main a fly wheel 106 rotating with the turntable; a casting 108 for the double clutch assembly and a casting 110 forming part of the player arm and related mechanism support.

*Mechanism for positioning carriage with transfer arm properly aligned relatively to selected record*

The movable carriage is properly positioned with its transfer arm aligned relative to the selected records by a carriage positioning mechanism cooperatively associated with the clutch shifting means. The arrangement, which constitutes a feature of the present invention, is such that the clutch shifting means positively positions the carriage relative to the record magazine with the result that when the clutch is shifted upwardly to drive the cam shaft and associated mechanism, the carriage is properly positioned relative to a record.

The positioning mechanism includes a detent wheel 112 (referring now more particularly to Figs. 16 to 22, inclusive) preferably fixedly secured to the carriage driving pinion 80 and a movable detent engaging roller 114 adapted to be forced into the detent grooves by the clutch shifting mechanism. The roller is dimensioned to fit in the detent spaces and to move the detent wheel in the event the detent wheel is not properly positioned to align the transfer arm 38 with a record in the magazine. The detent wheel is so constructed and arranged that each of the inter-tooth spaces corresponds to a record position so that when the roller is forced into an inter-tooth space the transfer arm is properly located.

The positioning wheel is preferably located above the carriage driving pinion 80 and it is provided with an upwardly extending driving pin 116 engageable by the shiftable clutch member (indicated as a whole by reference character 120) when the latter is shifted to its lower carriage driving position. The clutch is shifted between its upper and lower positions by a yoke 122 and a clutch operating link 124 pivotally secured to one of the yoke arms and moved vertically positively to shift the clutch member 120 in a manner which will be described in detail hereinafter. The yoke 122 is pivotally mounted upon a shaft 126 fixedly secured to opposite side walls of the double clutch casting 108. The casting is secured to the main carriage casting 65 as by the four screws 130.

The clutch shifting means is connected to the positioning roller 114 by a crank arm 132 pivotally mounted upon the shaft 126. One end 134 of the crank is pivotally secured to one of the yoke arms immediately adjacent the clutch operating link 124 (see Figs. 16 and 17). The other end 136 is operably connected to a pivotally mounted positioning roller carrier 138 intermediate the ends of which the roller 114 is rotatably mounted. The carrier 138 is pivotally and loosely movable about a supporting pin 140 affixed to the casting 108 and the other end has affixed to it a small U-shaped hard surfaced element 142 engageable by an adjustably mounted screw 144 at the free end of the arm 136 of the crank 132.

When the movable clutch member 120 is in its lower carriage driving position, the positioning roller 114 is out of engagement with the positioning detent wheel, it and its carrier being moved to this position by rotation of the wheel and it is permitted so to be moved because the carrier engaging screw 144 at the free end of crank 132 is moved outwardly, or to the left as viewed in Fig. 16. When the double clutch member is shifted upwardly, the roller 114 is forced against the detent wheel 112 by the counterclockwise movement (as viewed in Fig. 16) of the crank 132, the screw 144 moving the carrier 138 and roller, thereby positively moving the carriage, if necessary, properly to align it.

*Motor and motor support*

The motive power for moving the carriage and operating the various mechanisms of the phonograph is supplied by a motor 150, which is preferably a synchronous reversible electric motor energizable from a suitable source of current such as the usual 110 volt mains. Referring now more particularly to Figs. 4 and 8, it may be noted that the motor is mounted with its shaft 152 in vertical position upon and at the left side of the main carriage casting 65. The motor and the operating structure at the left side of the same casting may be covered by a suitable cover plate, not shown.

The motor includes a pair of end plates 154 mounted in rubber cushioned supports 156 secured to generally U-shaped mounting brackets 158 affixed to the casting 65. The motor is preferably cooled by a suitable blower or fan 160 secured to a coupling 162 affixed to the upper end of the motor shaft 152.

*Turntable drive*

The motor 150 is permanently coupled to turntable defining means upon which the records to be played are supported. The connection is such that motor vibrations are not transmitted to the turntable, the arrangement including, as will be described in greater detail shortly, a pair of flexible couplings, one of which is interposed between the motor and the remaining parts of the mechanism and the second of which is interposed in the drive near the turnable itself.

The motor is coupled by the coupling member 162 to a novel flexible low interia coupling indicated generally by the reference character 164. This coupling includes a generally tubular resilient (rubber) shaft 166 having enlarged ends 168 fixedly secured as by a press fit within the cuplike opposed ends of the coupling member 162 and a coupling member 170 located at the upper end of the coupling. A rigid metallic shaft 172 is disposed within the rubber shaft to give the latter the desired rigidity and also in such manner that the shaft does not contact the coupling member. The fit between the two may be a close or bonded fit. The coupling members and shaft are preferably made of some light material such as aluminum or magnesium in order to cut down the motor inertia. The shafts have a length such that the coupling includes, in substance, a pair of universal joints, one at each end. The upper end of the resilient coupling 164 is attached to a short vertical shaft 174 located thereabove and journaled in a pair of spaced apart bearings 176 mounted in apertures in the casting 102, and in a cross piece 178 detachably secured to the upper end of the casting as best illustrated in Fig. 43. The lower end of shaft 174 is fixedly secured to the coupling 170, the upper end of which abuts against the lower bearing 176 to take the upward thrust of the shaft 174. A thrust collar 180, affixed to the upper end of shaft 174, bears against the upper bearing 176 and the cross piece 178.

The upper bearing 176 is lubricated by oil contained in an oil reservoir 182 formed integrally with the cross piece 178, also as best illustrated in Fig. 43, the reservoir being connected to the bearing through a port 184. The upper end of the casting 102 in which the shaft 174 and other apparatus to be mentioned shortly are located, is closed by a removable cover plate 186.

The turntable drive includes a main turntable shaft 190 horizontally disposed within the casting 102 and rotatably journaled therein upon a pair of spaced apart bearings 192, the opening for the outer bearing 192 being closed by a cover plate 194, as best illustrated in Fig. 7. The shaft 190 is directly connected to the previously referred to motor driven shaft 174 by a worm wheel 196 meshing with a worm 198 preferably formed integrally with the shaft 174 (see especially the Figs. 7, 8 and 13). The worm wheel is fixedly secured to a hub 200 pinned to the shaft immediately adjacent the outer bearing 192. The worm wheel is lubricated by oil contained in an oil reservoir 199 formed below the gear in the casting 102, as best illustrated in Fig. 7.

The main turntable shaft 190 is connected to a short independently supported auxiliary or extension shaft 202 through a flexible coupling indicated generally by the reference character 204. The shaft 202 is rotatably supported in a pair of spaced apart bearings 206 mounted at the upper ends of the two legs of the casting 104, between which the fly wheel 106 is secured to the shaft as by set screws 208.

The bearings 206 of the extension shaft are lubricated in a manner best illustrated in Fig. 15, to which reference is now had. The upper ends of the bearing supporting legs of casting 104 are provided with recesses 210 communicating with the bearings and filled with a felt or similar oil retainer 212. The recesses are closed by top caps 214.

The flexible coupling 204 includes a pair of double armed coupling members 216 and 218 secured at adjacent ends of the turntable shafts 190 and 202 at right angles to each other and interconnected by a generally annular piece of leather 220 to which they are suitably secured as by rivets.

*Turntable*

The turntable includes a pair of relatively movable record clamping elements 222 and 224, the first of which is fixedly secured to the free end of the auxiliary turntable shaft 202, as best illustrated in Fig. 7, and the latter of which is movably secured to the upper end of a movable clamping arm 226, the construction and operation of which will be described in greater detail hereinafter.

The turntable is so constructed and arranged that when the record is clamped in playing position, it is moved upwardly and rearwardly to free it for rotation from the record transfer means, as will also be described in detail hereinafter. The particular arrangement for effecting such movement of the record is disclosed and claimed in my copending application and consequently the arrangement will be described but briefly in this application. The turntable element 222 secured to the turntable shaft is provided with a generally conical centrally located opening 228 adapted to receive the rotatable pointed end 230 of a pin 232 universally mounted as by a ball and socket joint 234 at the upper end of the clamping arm 226. The pin 232 is constrained to move in a groove 236 inclined generally upwardly and rearwardly whereby, when the clamping arm moves the turntable element 224 toward element 222, the conical end 230 of the pin enters the opening 228. The pin thus moves generally upwardly and rearwardly to lift the record (indicated by reference character 237) into its ultimate playing position, where it is accurately centered relative to the turntable elements.

The turntable element 224 is rotatably mounted upon the movable pin 232, as by a central bearing 238 formed integral with the pointed end 230 and a retainer cup 240, prevented from moving off the pin by a retainer ring 242. It should be understood that the record is lifted by the clamping arm from a position whereat the conical end 230 of the pin enters the usual central hole in the record and is disposed against the lower inclined side of the conical opening 228. The pin is stopped in this position when a record is unclamped by an adjustable stop screw 244 mounted in the clamping arm. A ball thrust bearing 246 is mounted within the axial opening in the pin element 230.

*Clutch drive*

It will be remembered that the movable clutch member 120 is operable selectively to drive the carriage or the cam shaft. The present portion of the description deals with the drive of the movable clutch member 120 by the motor.

The movable clutch member 120 drives either the carriage or cam shaft except during the playing of a record, when, according to the illustrated embodiment of the invention, the clutch drive is disconnected from the motor by a clutch, termed a cycling clutch for convenience. This cycling clutch, which is indicated as a whole by reference character 250, is adapted in one of its two positions to connect the turntable shaft 190 to mechanism for rotating the movable clutch member. In its other position it effectively disconnects the clutch member drive from the turntable shaft, with the result that the motor 150 turns only the turntable shaft.

The cycling clutch 250 encircles the shaft 190 and is located near the worm wheel 196 in the casting 102, see particularly Figs. 7, 8 and 13 to which reference will now be had. The cycling clutch is mounted for sliding movement along the shaft 190 and, more particularly, along a sleeve 252 abutting against the hub 200 of the worm wheel 196 and against a worm wheel 254 which is driven by the cycling clutch when the latter is in its engaged position, and which is loosely mounted on the shaft 190. At this time one of a pair of diametrically oppositely located driving pins 256 secured to the clutch member 250 is in engagement with a single driving pin 258 secured to the adjacent side of the worm wheel 254.

In its disengaged position, the cycling clutch 250 is maintained in abutting relation with the hub 200 by a spring 260 encircling sleeve 252 and abutting against the cycling clutch member and a collar 262 on the sleeve. This arrangement insures that the spring will not cause wear of the worm wheel 254, which is stationary during the playing of a record. The spring also serves properly to locate the cycling clutch relative to its operating yoke 264 to prevent wear of the clutch and yoke.

The cycling clutch is drivingly connected to the shaft 190 by a pin 266 extending through the shaft and into a pair of oppositely disposed inclined axial slots 268 on the cycling clutch member 250.

The cycling clutch is operated between its two positions by the yoke 264 having opposed fingers 270 extending into an annular groove 272 in the shiftable cycling clutch member 250. The yoke is secured to a pivotally mounted shaft 274 movably mounted in one wall of the casting 102 (see Fig. 8). A downwardly extending lever 276 is secured to the projecting end of shaft 274 whereby the cycling clutch may be operated by means and in a manner to be described in greater detail hereinafter.

The cycling clutch is operatively connected to the double clutch member 120 by the worm wheel 254 and a worm 278 pinned to a vertical shaft 280 journaled in casting 102 and connected by a flexible coupling 282 (see particularly Figs. 16, 19 and 20) to a vertically disposed shaft 284 drivingly connected to the movable clutch member 120. The shaft 284 is connected to the clutch member by a pair of pins 286 and 288 passing through the shaft and extending into opposed inclined slots 290 and 292 at the upper and lower ends, respectively, of the movable clutch member, which is slidably supported on the shaft 284. A hard knob 281 is secured to the projecting end of shaft 280 so that the vertical shaft can be turned manually.

The upper vertical shaft 280 driven through the cycling clutch is rotatably journaled in the casting 102 in a pair of spaced apart bearings of which but the lower bearing 294 is shown (see Fig. 19). The upward thrust placed upon the shaft 280 by the drive is taken by a ball thrust bearing 296 disposed below the bearing 294 and located between the casting 102 and a coupling member 298 pinned to the lower end of the shaft. The thrust in the opposite direction is taken by a ball thrust bearing 316 to which further reference is had shortly.

The flexible coupling 282 connecting the shafts 280 and 284, includes the coupling member 298 secured to the lower end of shaft 280 and a second similiar but oppositely disposed coupling member 300 secured to the upper end of shaft 284. The coupling members have diametrically oppositely located opposed driving fingers 302 and 304, respectively. In order to take up any lost motion the fingers 302 are of considerable arcuate length and both sets are covered by rubber sleeves 306 and 308, respectively, to provide a flexible driving connection having practically no lost motion.

The lower vertical shaft 284 is rotatably journaled in the double clutch casting 108 in upper and lower bearings 310 and 312, (see particularly Fig. 19), the latter of which is mounted in an apertured horizontal supporting portion 314. The downward thrust of shaft 284, when the latter is rotated in one direction, is taken by a ball thrust bearing 316 fitting in a recess at the lower end of shaft 284, and abutting against a plate 318 at the bottom of supporting portion 314 of the casting 108. It may be noted that the portion 314 and the lower end of the shaft extend into the channel 46 and move longitudinally therein as the carriage is moved back and forth.

The carriage driving pinion 80 and the detent wheel 112 fixedly secured thereto are rotatably mounted near the lower end of the vertical shaft 284, a sleeve bearing 320 being secured to the pinion and detent wheel.

The cam shaft drive

The cam shaft, which has affixed to it a series of cams to be referred to later, is indicated by the reference character 322. It is driven when the cycling clutch 250 is engaged and the clutch member 120 is in its upper position. Under these conditions the cam shaft is driven through the vertical shafts 280 and 284, the clutch member in its upper position in driving engagement with a worm 324 loosely mounted upon and encircling the shaft 284 and meshing with a worm wheel 326 fixedly secured to the cam shaft.

The connection of the double clutch to the worm 324, when the clutch is in its upper position, is effected through the upper inclined slot 290 in the double clutch and a driving pin 328 extending downwardly from and secured to a collar 330 preferably integral with and below the worm 324. The worm, with its collar and driving pin, is retained upon the vertical shaft against vertical movement on the shaft by a pair of retaining spring washers 332 located at the opposite ends thereof.

The arrangement is thus of a character such that the cam shaft 322 is rotated in opposite directions corresponding to the opposite directions of rotation of the motor 150 when the clutch member 120 is up, except when a record is being played and the cycling clutch 250 is disengaged.

Cam assembly

A number of cams controlling operation of various elements of the phonograph are mounted upon and rotate in opposite directions with the cam shaft 322. The construction of the cam assembly will now be described with particular reference to Figs. 7, 22 and 37 to 41, inclusive. The cam shaft is mounted in a pair of spaced apart bearings 334 (see Fig. 7) secured in vertically extending wall portions of the main carriage casting 65 and the cams and cam spacers are mounted on the cam shaft between these two wall portions.

The various cams and their primary functions will now be described in the order in which the cams are placed on the cam shaft, reading from left to right in Fig. 7 and with particular reference to Figs. 37 to 41, inclusive. The record clamping arm 226 is moved between record unclamping and record clamping positions by the first cam 336 having a rise 338 of relatively short arcuate extent effective to control the movement of the clamping arm.

The second cam 340, separated from the first by a spacer 342, controls means controlling or effecting movement of a record player arm, indicated generally by reference character 344 having a double sided pickup means 345 at its upper end, and to be described in greater detail hereinafter. The cam 340 has a fall 346 controlling the player arm movements. The pickup means, it should be noted, may be a single pickup having a needle or needles extending in opposite directions or a pair of pickups arranged back to back.

The pickup means 345 is shifted from one side of the playing position to the other in response to the direction of rotation of the cam assembly (and, therefore, in response to the direction of rotation of the motor 150) by a third cam 348 separated from the second by a spacer 350. The cam is similar to a Geneva type gear and includes a pair of angularly spaced apart generally U-shaped recesses or falls 352 and 354.

The record transfer means and means for positioning the player arm for the playing of records are actuated by a cam 356 preferably comprising two separate generally elliptical cams 356A and 356B separated from each other by a spacer 358 and from cam 348 by a spacer 360.

A control circuit operating and clutch controlling cam 362 is mounted immediately adjacent cam 356B. It includes a small generally V-shaped fall 364 and a similar rise 366, the two being relatively close together angularly.

A clutch and trip mechanism controlling cam 368 is positioned immediately adjacent cam 362. It includes a fall 370 and carries a pair of diametrically oppositely located rollers 372 and 374 which are located 90° from the center of the fall 370.

The entire assembly of cams and spacers are secured together by a plurality of axially extending rods or pins 376 and the assembly is secured to the shaft by a pin 378 passing through spacer 360, as best illustrated in Fig. 40.

*The record clamping mechanism*

The record clamping mechanism includes the clamping arm 226 rotatably supporting the movable turntable element 224. The clamping arm 226 with its turntable element is moved between record unclamping and record clamping positions by the cam 338 illustrated best in Fig. 37 and through clamping arm actuating means illustrated best in Fig. 7, to which figures particular reference will now be had.

The clamping arm is preferably actuated through a double armed bell crank 380 resiliently connected to the clamping arm at one end so that the record is resiliently held in place in playing position, one end of the bell crank being operatively connected with the cam. The crank is pivotally supported for movement about a shaft 382, which also pivotally supports the clamping arm 226 which extends upwardly through the double armed crank arm. The shaft 382 is mounted in horizontally extending projections 384 of the main carriage casting 65.

One arm 386 of the bell crank is operatively connected to the cam 336 through a cam following roller 388 secured to the outer end of the arm and urged into engagement with the cam by a spring 390 acting on the other arm 392 of the bell crank. The spring, more specifically, is secured to the projecting end of a pin 394 passing freely through the outer end of the arm 392 and to the casing 110.

The resilient connection between the bell crank and clamping arm 226 is effected through a compression spring 396 encircling the pin 394 and held between the clamping arm and the arm 392 of the bell crank. The spring urges the bell crank and clamping arm apart a distance determined by restraining washers 398 secured at opposite ends of the pin 394, which also passes through the clamping arm.

In the normal or home position in which the apparatus is illustrated in Fig. 37, the cam follower is at the smaller diameter position of cam 336 and the bell crank 380 is at the limit of its movement in a counterclockwise direction, thereby moving the clamping arm with its turntable element 224 away from the turntable element 222 rotated by the turntable shaft.

When the cam shaft is rotated 180° in either direction from the position shown in Fig. 37, the cam follower 388 is forced up the rise 338, thereby moving the bell crank 380 in a clockwise direction and the latter urges the clamping arm toward clamping position resiliently through the spring 396. As the clamping arm approaches the record clamping position, the pointed end 230 of the centering pin at its upper end passes through the center hole of the record and lifts the record to the final playing position indicated in Fig. 7 and as heretofore described in some detail. After the record has been played, the cam shaft rotates a further 180° in the same direction with the result that the cam follower falls off the rise to move the various parts in the reverse direction back to their initial positions.

In order to prevent the record from following the movable turntable element 224 when the record is unclamped and in order to guide the record in its movement to and from the playing position, there is provided a combined record guide and stripper indicated as a whole by reference character 400, which is best illustrated in Figs. 1 and 7 to which reference is now had. The stripper is located at the left side of the playing position. It is secured to the upper sides of the projections 384 through which the bell crank and record clamping arm pivot shaft 382 extends, the stripper having a pair of spaced apart legs 402 on opposite sides of the bell crank and clamping arm. The upper end of the guide and stripper is generally rounded as indicated by reference character 404 and it has a central circular aperture 406 through which the turntable element 224 is adapted to pass. In order to enable the player arm 344 to approach the center of the record without striking the stripper, the stripper is not a complete annulus as its upper end, as best illustrated in Fig. 1, has a portion cut away to provide spaced apart ends 408 between which the player arm passes in the playing of a record.

*Record transfer mechanism*

The record transfer mechanism is so constructed and arranged that it requires a minimum of power from the motor and so that a more uniform load is placed upon the motor. The arrangement includes a spring which is tensioned in part by the motor when a record is returned from the playing position downwardly to the record magazine and in which the power thus stored in the spring is utilized to assist the motor in raising a record upwardly from the magazine toward the playing position. The arrangement includes, in addition, means for effecting movement of the record transfer arm 38 a greater distance in the transfer of 10″ records than it moves in the transfer of 12″ records.

The record transfer arm 38 is moved in opposite directions and under the control of the cams 356A and 356B. The former is utilized to effect the movement of the transfer arm upwardly to move a record from the magazine to the turntable and the latter is utilized to tension the power storing spring and to move the transfer arm downwardly in the return of a record in the playing position to the magazine.

The cams are operatively connected to the transfer arm through a double-armed and generally U-shaped cam follower (see particularly Fig. 40) indicated as a whole by reference character 410 operatively connected to a sector gear 412 meshing with a gear 414 on a hub 416 having an extension 418 to which the record transfer arm 38 is secured as by a plurality of screws or rivets 420.

The cam follower 410 and the sector gear 412 driven by it are both rotatably mounted upon a shaft 422 fixedly secured to the main carriage casting 65 as by a cotter pin 424 passed therethrough in the manner best illustrated in Figs. 7 and 42. The shaft 422, the cam follower 410, and sector gear 412 are located below the cam assembly. One end of the shaft 422 extends outwardly substantially below the clamping arm supporting and actuating mechanism, for a purpose which will appear shortly.

The cam follower 410 has a pair of upwardly extending arms supporting rollers 426A and 426B adapted to engage the cam surfaces of the cams 356A and 356B, respectively, the rollers being on opposite sides of a vertical plane passing through the cam shaft 322 as best illustrated in Fig. 40.

The sector gear, which is rotatably mounted upon the shaft 422, is connected to the cam follower through an adjustable lost motion connection to enable the sector gear position to be adjusted relative to the cam follower for fixing the retracted or low position of the transfer arm below the records in the magazine and for the purpose of providing an arrangement whereby the actuating mechanism may be moved independently of the transfer arm when the transfer arm is stopped, as will be described hereinafter, in the transfer of the records.

The lost motion connection includes a generally rectangular aperture 428 in the sector gear and an eccentric headed screw 430 adjustably mounted in a dependent portion 432 of the cam follower 410, as best illustrated in Fig. 40. The screw is adapted to be locked in an adjusted position by a lock nut 433 (see Fig. 42).

The sector gear and cam follower are biased in opposite directions, and specifically to the position in which they are shown in Fig. 40 by a spring 434 surrounding a portion of the sector gear hub extending toward the cam follower, see Figs. 7 and 42. The spring, it may be noted especially from Fig. 40, forces the sector gear downwardly so that the upper edge of the aperture 428 rests on the head of the eccentric headed screw 430. The transfer arm is at its lowermost position under these conditions, so that it is apparent that by turning the screw 430 the lowermost position of the transfer arm may be adjusted.

It should be mentioned that the spring 434 on the gear sector hub makes it possible to stop the transfer arm at either the 10" or 12" position while permitting the follower arm 410 to move the same distance. When the transfer arm is stopped, the adjustment screw 430 draws away from the top edge of the opening 428 in the gear sector, a small distance when a 10" record is played and a greater distance in the case of a 12" record.

The head of the eccentric headed screw 430 has a smaller diameter than the mouth of the aperture 428 thereby providing a degree of lost motion enabling the cam follower to move even though the transfer arm and sector gear be at rest, as they are in the transfer of the records, and to a greater extent in the transfer of 12" records.

The record transfer cams are effectively symmetrical so that the transfer mechanism operates the same for both directions of rotation of the cam shaft and driving motor. In either event the cam 356A, acting upon the roller 426A, rotates the sector gear in a counterclockwise direction when a record is transferred onto the turntable. This transfer requires the lifting of a record and in order to cut down the power required of the motor, power, previously stored up in a spring 436, is utilized to assist the motor in effecting the transfer. In returning a record to the magazine, during the course of which the record is lowered, the motor stores power in the spring 436. The spring is secured to the projecting end of shaft 422, as best illustrated in Figs. 7 and 42. One end of the spring is secured to a washer 438 (with openings 439 for a spanner wrench to facilitate adjustment) having a square central aperture and fixedly secured to the shaft 422. The opposite end of the spring is secured to a pin 440 secured to the segment gear. The spring is tensioned a desired amount by turning the shaft 422 before it is secured to the main casting by the cotter pin 424. The arrangment is thus such that a more uniform and smaller load is placed upon the motor.

The transfer arm supporting hub 416 and various parts associated therewith are pivotally movable about a shaft 442 secured to the main carriage casting 65 by a set screw 444 (see Figs. 22 and 42).

*Record transfer trough and associated mechanism*

The records are transferred to and from the playing position by the record transfer arm and along a record transfer track or trough, hereinafter called a trough and indicated as a whole by reference character 450. The construction and correlation of the trough with the operating and control mechanism forms another of the features of the present invention. The trough is gravity biased and while arranged initially to be lifted from a lower 12" record position, in which the trough is normally located, to a higher 10" record position by the record being transferred, it returns to the 12" record position except when a 10" record is being transferred. In this event the trough is latched in its upper position by an arrangement to be described shortly. Means are provided to prevent the trough from being unlatched unless the 10" record is returned a predetermined distance toward the magazine.

The record transfer trough 450, referring now more particularly to Figs. 25 and 34 to 36, is loosely and pivotally mounted upon a short shaft 452 secured to the main carriage casting 65. The trough extends in both directions from the pivot point, a shorter arm 454 extending forward toward the magazine and a longer arm 456 extending rearwardly and upwardly toward the playing position. The weight of the longer arm 456 tends to rotate the trough in a clockwise direction about its shaft and against a rubber sleeved stop 458 secured to the casting 65, as best illustrated in Fig. 34.

Before proceeding further with a description of the latching of the trough for 10" records, it may be advisable to consider the construction of the adjustable stops provided for determining the upper limit of movement of the transfer arm 33 in the transfer of both the 10" and 12" records along the trough. The transfer arm moves a greater angular distance in the transfer of 10" records than it does in the transfer of 12" records, because of the smaller diameter of the 10" records and this limit position of the transfer arm for the smaller records is determined by stop pin 460 adjustably mounted upon a radial extension 462 of the transfer arm carrying hub 416. The stop is adapted to strike a short upwardly extending wall 464 (see Figs. 25, 35 and 36) of the main casting at the limit of movement for 10" records.

According to another novel feature of the present invention, the movable trough 450 is utilized as a stop for determining the upper limit position of the transfer arm 38 in the transfer of the larger 12" records. To accomplish this, the trough is provided with a downwardly extending arm 466 located substantially below the pivot shaft 452 and having a horizontally extending stop 468 at its lower extremity. The latter is engageable by a stop pin 470 adjustably mounted upon the radial extension 462. The stop 468, it may be mentioned at this point, is maintained out of the path of the stop pin 470 during the transfer of 10" records, the trough being latched in a position such that the stop 468 does not obstruct movement of the transfer arm.

The record trough 450 is latched in an elevated position during the transfer of 10" records. The latching means includes a latch of novel construction associated with the trough and controlled by the transfer arm. The arrangement is such that for the latch to be effective, the trough has to be in an elevated position when the transfer arm is at a certain point in its cycle. Otherwise, and this is the case in the transfer of 12" records, the latch is not operable.

One of the trough latch members is constituted by a shoulder 472 on a latch plate 474 secured to the downwardly extending stop carrying arm 466 of the trough. The plate is adjustably mounted relative to a pin 476 and it has a short arcuate slot 478 (see Fig. 34) whereby it may be angularly moved and secured in adjusted position by a screw 480 passing through the slot. The normal position of the latch plate is illustrated in Figs. 1 and 34, in which the trough is shown in its lowermost position.

The transfer arm exerts its control by latch means cooperating with the latch plate 474 and comprising two parts which are pivotally movable relative to each other and are also pivotally mounted upon a pin 482 secured to the main carriage casting 65. Referring now more particularly to Figs. 1, 34, 34A and 35, the two parts of the latch are indicated by reference characters 484 and 486, the former of which is located at the right and carries a flange-like latch 488 adapted to engage the latch 472 on the latch plate 474 only during the transfer of 10" records. The two latch members 484 and 486 are biased toward each other by a small spring 490 and both latch members are biased in a counterclockwise direction by a second and somewhat larger spring 492 secured to the latch member 486 and to the casting 65. The spring 492 acts also on the right latch member 484 through a flange 494 on the left latch member 486 and more particularly through an adjustable screw 496 mounted in the flange 494.

In the retracted position of the transfer arm both latches 484 and 486 are located out of the path of movement of the record trough, the left latch member 486 being so located by a cam 498 on the transfer arm hub 416. The cam is so arranged relative to the latch member 486 that when the transfer arm is at a certain position the latch members are both moved counterclockwise by the larger spring 492. This movement occurs at a time when a 10" record is to the left of the magazine side of the pivot shaft 452 of the record transfer trough and the trough is in its elevated position. Consequently, when the record rolls further along the trough and to the right of the pivot, to a position where it tends to depress the trough, the trough is latched by the flange 488. In the transfer of the larger 12" records, the record rolls beyond the pivot shaft of the record trough before the latch members are released by the cam 498 with the result that the trough is not latched and is, therefore, depressed to its lower position by the weight of the record.

The two-part construction of the latch is an important feature of the present invention because it insures that the trough will not be depressed to its lower position with a record at the right (or rear) of the pivot point of the trough, thus insuring that the trough will not be unlatched with a 10" record to the rear of the pivot point. If such unlatching occurred, the trough could not be lifted, because it is lifted only by a record rolling up the front arm. The right member is not unlatched until the record returns to the front of the pivot point so that the trough cannot be unlatched when the record has been properly returned past the pivot point of the trough toward the magazine.

*The player arm assembly*

The player arm assembly will be described in conjunction with Figs. 25 and 44 to 50, inclusive. The assembly is supported in the player arm casting 110 which is secured to the main carriage casting 65 by four bolts 500, see particularly Fig. 25. It includes a cradle 502 pivotally mounted for movement about an axis parallel to the turntable axis so that the player arm 344 and pickup 345 may follow the record grooves in playing a record and be returned to initial playing position after the playing of a record. The assembly includes also a player arm support 504 pivotally mounted upon the cradle 502 for movement about an axis substantially in the plane of a record in playing position and shiftable between two positions to move the player arm from one side of playing position to the other.

The casting 110 includes a pair of side walls 506 and 508 (see particularly Fig. 50) interconnected by a bottom wall 510.

The player arm cradle 502 comprises a casting having a pair of side walls 512 and 514 interconnected by a pair of spaced apart generally arched cross members 516 and 518 between which the player arm support 504 is pivotally supported. The cradle is pivotally secured for movement about an axis parallel to the turntable axis by a pair of pins 520 (see Figs. 44 and 46) secured in the walls 506 and 508 of the casting 110.

The player arm assembly is balanced around the axis defined by the cradle pivot pins 520 by a counterweight 522 at the bottom of the cradle, as well illustrated in Figs. 46, 48 and 50.

The player arm support 504 is pivotally supported by a pair of spaced apart pivot pins 524 secured in upstanding generally triangular extensions 526 of the cradle cross pieces 516 and 518. The support comprises a pair of generally triangular ends 528 interconnected by narrow spaced apart cross pieces 530 and 532 which determine the two positions of the support by engaging the upper side of the rear cross piece 518, see Fig. 46. A pair of rubber buttons 533 secured to the support 504 are provided to cushion the engagement between the support and the cradle, as best illustrated in Fig. 46.

The player arm 344 is pivotally secured to the support 504 about an axis parallel to the plane of a record in playing position but displaced from this plane at the limit positions of the support 504. The player arm is thus pivotally supported by a rod 534 fixedly secured to and passing through the player arm and a pair of pivot pins 536 engaging the rod and secured to the end portions 528 of the support. The pins are located substantially centrally between the cross pieces 530 and 532 so that the lower end of the player arm extends downwardly below the support 504 and into the space between the side walls 512 and 514 of the cradle.

The player arm is balanced relative to the axis defined by the pins 536 by a counterweight 538 secured to the lower end of the player arm in suitable manner as by screws 540.

The player arm and pickup means are biased for movement about the pivot pins 536 toward the adjacent side of a record in playing position by a pair of springs 542 and 544 located at opposite sides of the player arm. The spring 542 extends between wall 512 of the cradle and a bracket 546 secured to the player arm. The spring 544 similarly extends between wall 514 of the cradle and a bracket 548 also secured to the player arm above the cradle. In the position shown in Fig. 50, wherein the player arm is conditioned for the playing of the right side of a record, the spring 544 is effective to bias the pickup means into engagement with a record. When the player arm is shifted to its other position, the spring 542 becomes effective to bias the pickup means into engagement with the left side of a record in playing position.

*Mechanisms for effecting cooperation of pickup means with opposite sides of records*

The cooperation of the pickup means with opposite sides of records is controlled in response to the direction of rotation of the driving motor 150 and thus in response to the direction or rotation of the turntable and also the cam shaft, both of which are rotated by the motor 150. This mechanism, which constitutes a further feature of this invention, includes the previously referred to cam 348 illustrated best in Fig. 39, a pivotally mounted lever 550 and a slide bar 552 operated by the lever and operatively connected to the player arm.

When the right side of a record is to be played, the parts of the mechanism occupy the positions in which they are indicated more particularly in Figs. 12, 39 and 48, and when conditioned to play the left side of a record, the mechanism occupies the position in which it is indicated in Fig. 44.

The lever 550 is pivotally mounted for movement about a shaft 554 mounted in the player arm casting 110. The upwardly extending arm 556 carries a roller 558 adapted to follow cam 348 and to enter the recesses 352 and 354. The lever 550, it should be noted, is centered by a spring 560 secured to a central arm 562 of the lever, and to wall 508 of the player arm casting 110. The spring tends to move the lever to a position wherein the roller 558 is on a line connecting cam shaft 322 and the shaft 554.

The slide bar 552 is operatively connected to the downwardly extending arm of lever 550 by a bell crank 566 (see Fig. 49) having a bifurcated end 568 through which the lower end of the arm 564 extends. The bell crank pivots about a pin 570. The slide bar 552 is pivotally secured by a pin 572 to the bell crank. The slide bar is located immediately below a ledge 574 extending crosswise of the cradle and it is guided in its movement by a pin 576 secured to the ledge and passing through a slot 578 on the slide bar.

The slide bar is operatively connected to the player arm by a pair of upstanding spaced apart lugs 580 preferably formed integrally with the slide bar and adapted to engage a plate 582 extending therebetween and secured to the lower end of the player arm and preferably to the counterweight 538, see, for example, Figs. 48 and 49.

The movement of the player arm by the shifting mechanism is facilitated by means preventing undue movement of the player arm and also to give it an upward component of movement, whereby the support 504 may be more readily moved from one of its two positions to the other. Referring now more particularly to Figs. 46 and 50, the means referred to includes a generally semicircular plate 584 secured to the underside of the player arm, preferably to the underside of the counterweight 538, and a roller 586 secured to the cradle. The roller is actually secured to the cradle counterweight 522 and it is located substantially in alignment with the pivotal axis of the player arm support 504 so that when the slide bar is moved in opposite directions in response to the rotation of the cam shaft in opposite directions, the roller is engaged by the semi-circular plate 584 whereby the player arm is both moved sidewise and lifted by the movement of the slide bar.

The plate and roller also act as an overcenter device for positioning the lower end of the player arm as the support 504 is moved beyond its center position. As a result the plate 582 is always spaced from the shifting lugs 580 to provide space for the required movements of the player arm.

The slide bar 552, it might be mentioned at this point, is also utilized to control the amount of bias urging the pickup means from its initial playing position into the playing grooves in response to the direction of rotation of the motor and the location of the pickup means. More bias is applied when the pickup means is on the right side, whereat the record grooves rotate in a direction tending to move the player arm away from the record grooves. On the left side, where the direction of rotation is such that the pickup means is urged toward the center of the record, less bias is placed upon it.

*Mechanism for moving the pickup means into and out of engagement with a record in playing position*

The player arm is movable in a plurality of directions. One of these is the movement of the player arm and pickup means toward and away from a record in playing position, the movement toward a record occurring when a record is to be played and a movement away from the record after the record has been played. These movements are controlled by means including the previously referred to cam 340, best illustrated in Fig. 38, and a lever 590 having a pair of spaced apart arms 592 and 594 connected by a cross piece 596 and adapted to cooperate with the player arm when the latter is in position to play the right and left hand sides of records, respectively. The lever is pivotally movable about the shaft 554 and it is urged in a counterclockwise direction by a spring 598 to maintain a cam follower roller 600 in continuous engagement with the cam 340. The roller is mounted at the upper end of an upwardly extending lever arm 602.

The lower front ends of arms 594, which project downwardly, are provided with opposed cam surfaces 604 adapted to engage rollers 606 secured to opposite sides of the player arm and thereby control the movement of the player arm toward and away from a record in playing position. Under nonplaying conditions, the cam 340 holds the lever 590 in its lowermost position whereat one or another of the arms 592 or 594 engages the roller 606 positively to maintain the player arm at its farthest position away from playing position. After a record has been transferred to the playing position, the roller moves inwardly down the fall 346 of cam 340 and the lever 590 is raised, whereby the player arm is released and one or the other of the biasing springs 542 or 544 resiliently urges the player arm to engage the record. After a record has been played, the lever 590 is depressed and the player arm is positively moved out of engagement with a record.

Mechanism for positioning pickup means at initial playing position

The mechanism for positioning the pickup means at the initial playing position forms another of the important features of the present invention. The mechanism includes means for latching the cradle supporting the pickup means to positioning means, which latching means is released to free the cradle and pickup means when a record is to be played so that the pickup means may readily follow the playing grooves of the record. After the record has been played the cradle is again latched to the positioning means whereby the pickup means is positively returned to and positioned at its initial playing position for 12" records. The pickup means is positioned at the initial playing position for 10" records by means controlled by the record transfer mechanism.

The pickup means is returned to the initial playing position for 12" records by the downward movement of the lever 590. The lever carries a roller 610 at its rear end, more particularly at the rear end of arm 592, adapted to engage a plate 612 fixedly secured to the cradle in adjusted position by a pair of screws 614, as best illustrated in Fig. 44. When the lever is depressed, the roller engages plate 612 and moves the cradle in a clockwise position a distance sufficient to insure that it will be latched to the positioning means after the playing of both the large and small sized records.

The positioning means includes a positioning plate 616 (see Fig. 25) pivotally secured to the carriage and pivotally supporting a movable latch plate 618 cooperatively associated with a latch plate 620 secured to the cradle in adjusted position. Referring now more particularly to Figs. 25 and 44, it may be noted that the latch plate 620 is secured to the outer side of the right cradle wall 512. The rear end of the plate is bifurcated and pivotally secured for movement about the pivotal axis defining means of the cradle. The forward end is provided with a slot 622 through which extends a screw 624 for holding the latch plate in its adjusted angular position. The latch plate is provided with a latch defining groove 626 facing the pivotal axis of the cradle. A transversely extending pin 628 is provided on the plate above the groove for cooperation with the means for biasing the pickup means into the initial record grooves, in a manner to be described in greater detail shortly.

The cradle is operatively connected to the positioning plate 616 by the latch plates 618 and 620. The former has a downwardly extending arm 630 with a transversely extending flange 632 constituting a latching finger adapted to enter the latch defining groove 626 thereby to latch the plates 616 and 618 together.

The movable latch plate 618 is pivotally secured to the positioning plate 616 as by a pin 634. It is biased in a clockwise direction by a spring 636 secured to a rearwardly extending arm 638 of the plate and to the positioning plate 616, the relative movement between the two being limited by a stop arm 640 extending to the right from the movable plate and adapted to engage a downwardly extending arm 642 comprising part of the positioning plate.

The latching and unlatching of the latch plates 618 and 620 is under the control of the cam operated lever 590. The lever is provided with a ledge 644 (see Fig. 49) extending to the right from arm 592 and located below and adapted to engage a screw 646 adjustably mounted upon a flange 648 extending transversely from the movable latch plate 618. The ledge and adjusting screw are so located relative to each other that the cradle is unlatched at a time when the lever 590 is near its uppermost limit of movement so that the player arm is free to follow the record grooves only after it has been properly positioned.

The positioning plate 616 determines the location of the player arm for both 10" and 12" records. The plate is normally latched into a first or 12" record position by a latch lever 650 (see Fig. 25) having a latch finger 652 at its rear end cooperating with a latch defining flange 654 at the lower end of the positioning plate. The positioning plate is mounted for pivotal movement about a pin 656 mounted in the casting 110 and it is urged in a counterclockwise direction by a spring 658 secured to a flange 660 at the upper end of the plate and to a stationary pin 662.

When a 10" record is to be played, the positioning plate is unlatched and moved in a counterclockwise direction by the spring 628 to a position whereat the pickup means is properly positioned at the initial playing position for a 10" record. This position is determined by an adjusting screw 664, engageable by a transverse flange 666 at the lower end of the positioning plate.

The positioning plate is unlatched from the latching lever 650 in response to the size of the record being transferred and more particularly in response to the greater angular movement of the record transfer arm occurring when a 10" record is transferred. When a 10" record is being transferred, the latch lever 650 is moved in a clockwise direction by a slide plate 668 having a finger 670 at its rear end engageable with a downwardly extending arm 672 of the lever 650.

The slide plate 668 is moved forward by a shoulder 674 on the transfer arm hub 416 engageable with an upwardly extending end 676 of the slide plate 668. When the slide plate is thus moved, the lever 650 is moved about its pivot shaft 678 and against the tension of the spring 680 connected between the latch lever and positioning plate.

When the record is returned to the magazine, the spring 680 returns both the slide plate and latch lever to their initial positions and when the pickup means is returned to its initial 12" position by the downward movement of the cam operated lever 590, the positioning plate 616 is again latched to the latch lever 650.

The slide plate 668 is mounted for sliding movement underneath the main carriage casting as best illustrated in Figs. 25 and 52, it being guided in its movement by a pair of pins 689.

It will thus be noted that the construction is such that the positioning plate does not move when 12" records are being played but does move when 10" records are played and that the cradle is always returned to its 12" position whereat it is latched by the positioning plate in conjunction with the latch plates 618 and 620, as previously described.

Mechanism for biasing pickup means from initial playing position to record grooves The mechanism for biasing the pickup means from its initial playing position on a record into the first grooves forms another of the important features of the present invention. It is characterized by the application of a greater biasing force when the pickup means is located at the right side of the playing position to play the right side of a record, and it is equally effective for both sizes of records. The biasing mechanism is controlled in response to the direction of rotation of the motor and cam shaft and preferably it is controlled by a portion of the player arm shifting mechanism, notably by the slide bar 552, which, it will be remembered, occupies two different positions when the player arm is shifted by it to its two positions on opposite sides of the playing position.

The biasing force is preferably obtained through the use of a pair of relatively light wire springs 682 and 684 (see Fig. 25), the former of which is operative to bias the pickup means into the record grooves when the player arm is on either side of the playing position, and the latter of which is effective only when the pickup means is at the right side of the playing position. The springs are both secured to the positioning plate 616 by a pair of lugs 686 and they project toward the front of the machine. Spring 682 is provided with a generally downwardly extending U-shaped portion 688 extending down into abutting relation with the previously referred to pin 628 secured to the latch plate 620. The U-shaped portion 688 is guided by an apertured flange 690 extending horizontally from the downwardly extending arm 642 of the positioning plate 616. This flange also serves to limit the downward movement of the springs and thereby the distance through which the cradle and player arm are moved by the biasing means.

The spring 684 is simply a straight wire projecting beyond the spring 682 and the flange 690 into the path of a vertically reciprocable plate 692 adapted to be moved upwardly under certain conditions to render the spring 684 ineffective. The spring 684 acts through the spring 682, the latter being provided with a double bend 694 to provide a seat for the outer end of spring 684.

The plate 692 controlling the effectiveness of spring 684 is urged upwardly by a spring 696 secured to the plate near the lower end thereof and to the pin 662 secured to casting 110. The plate is latched in its lowermost position by the right end 698 of the slide bar 552 when the pickup means is positioned to play the right side of a record, as indicated best in Figs. 25, 50 and 51. Under these conditions, it may be noted that the end 698 of the slide bar projects beyond the wall 506 of the player arm casting 110 and into a groove defined by a U-shaped flange 700 at the lower end of the vertically reciprocable plate 692.

The spring 684 is rendered ineffective to exert a biasing force upon the pickup means to move it from its initial playing position into the record grooves when the left side of a record is to be played. The plate 692, it will be remembered, is urged upwardly by the spring 696 but movement of the plate is prevented until after the pickup means has been placed in initial playing position on a record by a generally rounded projection 702 at the underside of the ledge 644 on the player arm controlling lever 590, which projection is best illustrated in Fig. 44. The projection acts upon a rearwardly extending finger 704 of plate 692, which is disposed underneath the ledge, i. e., to the left of the wall 506, as best illustrated in Fig. 51. This projection also moves the plate 692 downwardly when the pickup means is returned to its initial playing position.

When the ledge is lifted under the control of cam 340, the plate is moved upwardly by the spring and a flange 706 engages the outer end of spring 684 and lifts it so that it is ineffective to bias the cradle to its initial playing position. The plate is guided in its vertical movement by a pin 708 and the pin 662 passing through slots 710 in the plate, as best illustrated in Fig. 25.

Before passing from the biasing mechanism, it might be well to note that it does not become effective actually to move the pickup means until the latter has been unlatched from the positioning plate 616 by its engagement of the latch members 626 and 632 by the upward movement of the ledge 644, as previously described. Furthermore, it is equally effective on both sizes of records because the springs are mounted on the player arm positioning plate 616.

The cycling clutch control

As heretofore indicated, the cycling clutch is engaged at all times except when a record is being played. When a record is being played, the clutch is disengaged. The engagement of the cycling clutch is controlled by a relay which is also used to control the movement of the carriage into position to play selected records and the disengagement of the cycling clutch is controlled by the cam assembly. While the relay is operated a first time to initiate the playing of a record and a second time at the end of the playing of a record, only the latter operation of the relay has a controlling effect upon the cycling clutch. As already indicated, it then effects engagement of the cycling clutch. Inasmuch as the clutch is engaged when the playing of a record is initiated, the operation of the relay at this time does not affect the clutch.

The combined record selector and cycling clutch trip relay, which will hereinafter be referred to simply as the trip relay, is indicated by the reference character 720. It is located at the right side of the machine and to the rear and somewhat above the cam shaft assembly, as best illustrated in Fig. 1. It is secured to the carriage by a mounting bracket 722 and has associated with it an armature 724 pivotally mounted upon a generally U-shaped support 726 having a lower forward extension 728 serving to limit downward movement of the armature, in which direction the armature is biased by a spring 730. A trip latch 732 is secured to the underside of the armature.

The trip relay controls the operation of the cycling clutch through a linkage system including a main trip lever, indicated as a whole by reference character 734, performing a number of functions and having a number of arms or extensions, a second multiarmed lever indicated as a whole by reference character 736 and adapted to oscillate a lever 738 operably connected to the cycling clutch yoke 264 through a fourth lever indicated as a whole by reference character 740. These various levers are best illustrated in Figs. 8 to 11, inclusive, and 26, to which particular reference will now be had.

The main trip lever 734 has an arm 742 adapted to be latched by the latch 732 on the trip relay armature 724 and which is unlatched when the relay is energized. Each time the relay is energized, the lever 734 is released and moved in a clockwise direction, as viewed in Fig. 26, about a pivot shaft 744 fixedly secured to the carriage wall. In thus moving it effects clockwise movement of the multiarmed lever 736 through a pin and slot connection including a pin 746 at the lower end of trip lever 734 and a slot 748 at the lower end of the lever 736. The lever 736 pivots about its shaft 750, also fixedly secured to the carriage casting 65, whereby the bifurcated upper end 752 is moved to effect upward movement of the narrow end 753 of the cycling clutch lever 738 which projects through an opening in the casting wall. This upward movement of lever 738 is utilized to effect engagement of the clutch upon completion of the playing of a record when the trip relay is energized by a player arm trip mechanism to be described hereinafter.

The cycling clutch operating lever 738 is returned to its initial position by rotation of the cam shaft, an operation that also resets the trip mechanism as will be made apparent shortly. The return is effected by one or the other of the pins 372 of cam 368 acting upon a generally horizontally disposed flanged arm 754 on the multiarmed lever 736. The pins move the lever 736 in a counterclockwise direction thereby to return the cycling clutch lever 738 to its initial position, and likewise to return the main trip lever 734 to a position to be engaged by the trip relay operated latch 732, the return movement of the lever 734 being effected through the previously described pin and slot connection 736—748.

The cycling clutch is normally engaged and the cycling clutch levers 738 and 740 occupy the positions in which they are indicated in Fig. 10. The cycling clutch is biased toward and maintained in its engaged position by a wire spring 756, the free end of which engages the yoke shaft operating lever 276. The other end of the spring encircles a supporting shaft 758 about which the levers 738 and 740 are pivotally movable. The other end is also secured to the lever 740, as indicated by the reference character 760, thereby to bias that lever in a counterclockwise direction as viewed in Fig. 10. The lever 740 is operatively connected to the yoke shaft operating lever 276 by an adjustably mounted screw 762 mounted in a flange 764 at the upper end of an arm 766 of the lever 740.

The lever 740 is latched against movement in clutch disengaging direction by a generally diamond shaped latch 768 pivotally mounted upon a main casting wall above the cam shaft driving worm wheel 326 which engages the flanged generally horizontally disposed arm 769 of the lever 740. The latch is moved to unlatching position when the mechanism has been operated to start playing a record by a pin 770 mounted upon the worm wheel 326 secured to the cam shaft.

The cycling clutch is disengaged, when the lever 740 is unlatched, by a helical spring 772 secured to flanges 774 and 776 on the levers 740 and 738, respectively. It will be noted that when the lever 740 is unlatched, the spring 772 is effective to move lever 740 in a counterclockwise direction and thereby effect disengagement of the cycling clutch through operation of the yoke shaft 274 through the yoke shaft operating lever 276.

The cycling clutch is engaged by the upward movement of the bifurcated end 752 of the lever 736 which effects clockwise movement of the lever 738. The latter is operatively connected to lever 740 through a flanged rubber-covered arm 778 adapted to engage an adjustably mounted screw 780 on lever 740.

The latch 768 is biased to return to a normal or neutral generally vertical position by a spring 782, the intermediate portion of which encircles the latch supporting pin 784 and the free ends of which extend beyond a stationary projection 786 and a projection 788 constituted by a flange on the latch, as best illustrated in Fig. 11.

It is believed clear, especially from Fig. 10, that when the trip relay 720 is operated in response to a record selection that the cycling clutch is not operated by the upward movement of the bifurcated end 752 of the lever 736. All that happens is that lever 738 is moved clockwise but lever 740 is not moved because of the then separated parts 778 and 780 of the two levers. However, when the cycling clutch has been previously disengaged by release of the latch 768 during the playing of a record, then when the trip relay is energized by the player trip mechanism, the upward movement of the bifurcated end 752 effects engagement of the clutch through the clockwise movement of levers 738 and 740, which are in abutting engagement through the parts 778 and 780.

It should perhaps be noted further that the trip mechanism controlling the cycling clutch is so constructed and arranged relative to the latch 768 and its actuating pin 770 that the trip mechanism operated lever 736 is not returned to its lower position before the latch 768 is restored to latching position.

Player arm trip mechanism

The player arm trip mechanism of the present invention controls the trip relay 750 and, more specifically, it energizes the trip relay. The relay is energized ordinarily after the playing of a record, either when the player arm 344 moves toward the axis of record rotation to a predetermined position or moves in a reverse direction, as when it moves into an eccentric groove at the end of the playing of the record.

The player arm trip mechanism includes a latch operable in response to the player arm position and a lever controlled by the latch and adapted to close a switch controlling the trip relay, and the mechanism will be described with particular reference to Figs. 12, 26 to 28, and 46.

The trip relay 720 is energized by the closure of a switch 790 cooperatively associated with a pivotally mounted switch operating lever 792 biased by a spring 794 in a direction to close the switch and normally latched by a player arm operated latch 796. The latch is adapted to be moved in a counterclockwise direction, or lifted, in response to movement of the player arm in a reverse direction or up to a predetermined point, respectively, as viewed in the respective figures by a pawl 798, or a lift plate 800 moving with the player arm cradle. The lift plate, referring now more particularly to Figs. 12 and 46, is secured to a generally upwardly and rearwardly extending bracket 802 secured to the left side of the cradle, the plate being adjustable about a pivot pin 804 and adapted to be locked in adjusted positions by virtue of a pin and slot connection 806—808.

The pawl 798 is pivotally secured to the bracket by the pin connection 806 of the plate. It is biased by a spring 810 so as to occupy a position whereat its upper flanged end 812 is inclined upwardly with its pointed end 814 at the highest elevation, as best illustrated in Fig. 12.

The lift plate and pawl are cooperatively associated with a roller 816 and teeth 818, respectively, mounted upon and formed at the underside of a rearwardly projecting arm 820 of the latch lever 796. When the lift plate moves underneath the roller and lifts the arm 820 as a result of the inward movement of the player arm to a particular point, the latch lever is moved in a clockwise direction, as viewed in Fig. 12, or in a counterclockwise direction as viewed in Figs. 26, 27 and 28. It is moved in the same direction by reverse movement of the player arm when the pointed end 814 of the pawl is in engagement with the teeth 818. When the player arm moves toward the center of the record in playing position, the pawl ratchets over the teeth, but when the player arm moves in the reverse direction the pointed end 814 engages the teeth and moves the latch lever.

When the latch lever is moved, as described above, it releases the switch operating lever 792 with the result that the latter is moved by spring 794 in a counterclockwise direction, as viewed in Figs. 26 to 28, to close the switch 790. The latch lever has a downwardly extending arm 822 normally engageable with a latching shoulder 824 formed intermediate the ends of the horizontal arm 826 of the switch operating lever. The switch operating lever is pivotally movable upon a shaft 828, it being urged in a counterclockwise direction about the shaft by the spring 794. A relatively high projection 830 is provided on the lever 792 so that the lever will not be freed from arm 822 during cocking of the trip mechanism, as will be described shortly. The switch operating lever is also provided with a generally downwardly inclined arm 832 engageable by a pin 834 upon the main trip lever 734 during the cocking operation. The pin is mounted intermediate the ends of a generally horizontal arm 836 forming part of the main trip lever.

A dashpot 838, including relatively movable parts 840 and 842, secured to the arm 836 and the carriage casting 65, is provided to retard movement of the main trip lever 734 and thereby minimize the noise made by the apparatus.

The player arm trip mechanism is cocked upon the transfer of a record. The effective cocking operation occurs when the record is being transferred from the playing position to the magazine. A similar cocking operation occurs when the record is being transferred to the playing position, but this does not ordinarily have any effect on the trip mechanism because it has been previously cocked. However, the second cocking operation insures that the player arm trip mechanism will be cocked.

With the apparatus conditioned for carriage travel, the player arm trip mechanism is cocked as indicated in Fig. 26. The downwardly extending latch arm 822 of the latch lever 796 is on top of shoulder 824 in the switch operating lever 792 and against the shoulder 830. When the trip relay 720 is energized in response to a selected record, the main trip lever 734 is released as heretofore indicated. The pin 834 on the horizontal arm 836 of this lever moves the switch operating lever 792 in clockwise direction, the pin engaging the downwardly extending arm 832, as indicated in Fig. 27. The clockwise movement of the lever 792 serves no useful function at this time except in the event the trip arm mechanism had been uncocked for some reason or another. The end of the horizontal arm 826 of lever 792 moves away from the switch 790, which is a normally open switch. When the record is ready to be played, the player arm trip mechanism occupies the position in which it is shown in Fig. 28, which is the same as that of Fig. 26, the pin 834 being displaced from the arm 832 of the switch operating lever 792 to condition that lever for movement in a counterclockwise direction to close the trip relay controlling switch 790 when the latch lever 796 is moved in a counterclockwise direction either by the lift plate or the pawl. When this occurs, the arm 822 is moved off the shoulder 824 of the switch operating lever 792 and the latter is immediately moved in a counterclockwise direction by its spring 794, whereupon the switch 790 is closed and the trip relay energized.

When the trip relay is energized after the playing of a record, the cycling clutch is engaged in a manner heretofore described in detail. At the same time, the main trip lever 734 again moves in a clockwise direction to move the switch operating lever in the same direction, whereby the latch lever 796 is gravity biased back against the shoulder 830, to its initial position.

*The cam operated and safety trip mechanisms and double clutch control*

The cam operated or main trip mechanism, the safety trip mechanism and double clutch control will next be described with particular reference to Figs. 2, 22, 23, 24, 26, 27 and 28.

The cam operated trip mechanism is arranged to control and to effect the vertical movements of the double clutch member between its carriage driving and cam assembly driving positions. The control is such in the main that the clutch is shifted upwardly into cam driving position when the record transfer arm is in alignment with a selected record and is shifted downwardly when the record has been played and returned to the magazine and after the transfer arm has been properly returned below the magazine so that it can be moved longitudinally.

Means operable by the cam means is utilized to control the trip mechanism so that the movable clutch member cannot be shifted downwardly to move the carriage until the cam means has reached a certain point. This means, called a safety trip mechanism, is provided to prevent the shifting of the clutch into carriage driving position in the event a record is not properly returned to the magazine. For instance, if a record should be accidentally or otherwise left in an intermediate position where it would be struck by and perhaps broken by movement of the carriage, the clutch is prevented from being shifted downwardly and the cycling mechanism is operated through another playing cycle involving the return of the record to the playing position and a renewed effort to return the record to the magazine.

The movable double clutch member is moved vertically by a clutch operating lever indicated as a whole by reference character 850 pivotally mounted on the pivot shaft 750 alongside (to the right) of the multiarmed lever 736, with the main trip lever 734 disposed between the two, as best illustrated in Figs. 26 to 28, inclusive. The clutch operating lever includes a forwardly extending arm 852 which is pivotally connected to the upper end of the vertical clutch shifting lever 124, as by a pin 854.

The double clutch member is shifted upwardly through the lever 850 when the trip relay 720 is energized in response to the selection of a record. The lever 850 is moved upwardly by resilient means, and the motor, if need be, and is maintained in its upper position by the cam 368. The resilient means for moving the lever 850 upwardly includes a spring 856 secured to a rearwardly extending arm 836 of the main trip lever 734 and to a flange 858 formed integral with a trip mechanism mounting bracket 860. The spring urges the trip lever 734 in a clockwise direction but it will be remembered that movement in this direction is prevented by the latch 732 mounted on the trip relay armature 724. When the trip relay is operated in response to a record selection, the trip lever 734 is moved by the spring 856 clockwise from the position in which it is illustrated in Fig. 26 (the home or carriage traveling position in which the double clutch is at its lower position). In so moving, the top lever moves the clutch shifting lever 850 in a clockwise direction through the multiarmed lever 736 which has a generally upwardly and rearwardly extending arm 862 having a flange 864 disposed beneath an intermediate portion 866 of the lever 850. Thus, when the trip lever 734 is released, the lever 736 is moved in clockwise direction about its pivot shaft 750 through the pin and slot connection 746—748 and the flange 864 moves the clutch shifting lever 850 in a clockwise direction. The lever 850 is connected to the lower arm 754 of lever 736 by a spring 868 which is utilized to effect the downward movement of the clutch, it aiding gravity to do this.

Fig. 27 illustrates the positions of the various mechanisms immediately after the operation of the trip relay 720 in response to a record selection. The double clutch has been shifted to its upper or cam shaft driving position and it is maintained in this position after the cam assembly starts to rotate by the cam 368, the larger diameter portion of which engages a roller 870 mounted on the horizontal forwardly projecting arm 852 of the clutch shifting lever 850.

The cam and roller also insure, in accordance with another of the important features of the present invention, that in the event the spring does not position the carriage and shift the clutch, then the power of the motor is utilized positively to move the double clutch into complete engagement to drive the cam assembly and positively to locate the carriage with its record transfer arm directly below the selected record. The motor drives the cam assembly and cam 368 moves the double clutch shifting lever 850 upwardly, thereby simultaneously to effect further upward movement of the clutch, if necessary, and positively to move the bell crank 132 through which the positioning roller 114 is moved into the grooves in the detent wheel 112.

The cam 368 and roller 870 also prevent downward movement of the double clutch when the trip relay 720 is energized after the playing of a record, as will appear more fully shortly.

As the cam assembly continues to rotate (in a counterclockwise direction for the playing of the left side of a record) with the roller 870 on the rise of cam 386, the trip mechanism is recocked and the cycling clutch is disengaged when the cam shaft reaches the position shown in Fig. 28. In recocking, it should be noted that the flange 864 is displaced from the intermediate portion 866 of lever 850, as illustrated in Fig. 28.

Assuming for the purpose of the present description that only the left side of a record is to be played, then when the trip relay is operated upon completion of the playing of a record, the cam continues to rotate in counterclockwise direction back to its initial position of Fig. 26. Shortly before reaching this position and at that position, the roller is above the fall 370 in cam 368, thus conditioning the clutch lever 850 for downward movement by spring 868 to shift the double clutch to its lowermost or carriage driving position. Incidentally, if the right-hand side of the record is to be played after playing the left side of the same record, the driving motor and cam are reversed before the initial position is reached by the depression 364 on cam 362, in a manner which will be described hereinafter.

When the cam assembly reaches its initial position, the safety trip mechanism is unlatched, if the record has been properly returned to the magazine, by the upward movement of a cam operated trip lever 872 having a forwardly extending arm 873 adapted to lift a trip mechanism latch lever 874 located above the front end of the arm. The arm 873 is raised or moved in clockwise direction when the cam 362 returns to its initial position by the projection 366 on the cam, which engages a projection 878 extending downwardly from an intermediate portion of the arm 873. The lever 872, it may be noted, is pivotally mounted for movement on the shaft 828, and biased toward cam 362 by a spring 875 connected between it and lever 850.

Safety trip mechanism

The safety trip mechanism of the present invention is so constructed and arranged that the operation of the trip mechanism latch lever 874 by the cam 362 and lever 872 will not result in the downward shifting of the double clutch unless the record is properly returned to the magazine and the transfer arm 38 has been moved below the records in the magazine. In other words, the carriage cannot be moved unless it can be moved without damage to the records or to the apparatus.

The safety trip mechanism includes, in addition to the latch lever 874, a clutch latching lever 880 (see especially Figs. 22 and 23) adapted to prevent the downward movement of the clutch shifting lever unless it is released, a record safety trip lever 882, adapted to be moved into the plane of record transfer movement and which is prevented from moving a sufficient distance to permit unlatching of lever 880 unless the record is properly returned to the magazine, a resilient spring arm 884 secured to and movable with the record transfer mechanism and actuating the lever 882, and a lever 886 correlating the record safety trip lever with the cam operated trip lever 874 and the clutch latching lever 880.

The levers 874, 880, 882 and 886 are all mounted upon a bracket 888 secured to the backside of the main carriage casting, as best illustrated in Fig. 22. Levers 874 and 880 are pivotally mounted upon a shaft 890 mounted in the bracket and the levers 882 and 886 are pivotally secured to a shaft 892 also mounted on the bracket.

The various levers occupy the positions in which they are indicated best in Figs. 22 and 23 when the double clutch is in its down position conditioned to drive the carriage along the record magazine. At this time the record transfer arm 38 is below the record magazine, to which position it has been returned by movement of the transfer arm operating sector gear 412, which is then at the limit of its movement in a clockwise direction. At this limit its upper side, the side to which spring arm 884 is secured, is at its highest position.

The safety trip lever 882 is moved into the path of movement of a record in its transfer movement at a time when the record has been substantially returned to the magazine by the sector gear associated with the transfer mechanism; and conversely, to move the lever out of the path of movement of a record when a record is being transferred to the playing position. The sector gear is thus operatively connected to the safety trip lever 882 by the spring arm 884 which is secured to a projection 894 at the upper side of the sector gear. A spring is used so that the transfer mechanism may move to its limit position even though the safety trip lever is prevented from moving its normal distance, as by an improperly returned record. Under these conditions the spring 884 simply yields. The forward end of the spring is operatively connected to a short generally horizontally projecting arm 896 of the safety trip lever, and more particularly, by a screw 898 adjustably mounted in the arm 896 properly to correlate the parts.

The safety trip lever 882 includes a generally upwardly extending arm 900, the upper end of which is movable into the path of transfer movement of a record. A rubber button 902 is mounted at the upper end of the arm to prevent damage to records which may be engaged by the arm. The lever 882 is biased to move out of the path of record transfer movement by a spring 904 connected to the arm 900 and the clutch latching lever 880.

The correlating or intermediate lever 886 is adapted to be actuated by the safety trip lever 882, but only in the event the lever is permitted to move into the path of movement of a record. In the event a record is not properly moved, the lever 882 is not moved a sufficient distance to move lever 886. In this event, the latching lever 880 is not unlatched by the safety trip lever 882. The safety trip lever 882 is operatively connected to the intermediate lever 886 through the short arm 896 and a flange 906 formed at the upper side of a short arm 908 of lever 886. The short arm 896 and flange are so constructed that the flange is not engaged and moved in the event the safety trip lever 882 is prevented from moving by an improperly returned record.

The intermediate correlating lever 886 is latched by the cam operated latch lever 874 and it in turn latches the clutch latching lever 880. The lever 874 has an upwardly extending finger 910 adapted to engage a generally vertical flange 912 on lever 886 when a record is being played. When thus latched during the playing of a record, the adjacent straight end 914 of the clutch latching arm lever 880 is located below the flange 912, to which position it is biased by the spring 904. The trip mechanism latch lever 874, it may be mentioned, is biased into latching position by a spring 916 secured to it and to a flange 918 on the mounting bracket 888.

The clutch latching lever 880 has a flanged end 920 adapted to latch the clutch operating lever 850 in its upper position during the playing of a record, as best illustrated in Fig. 28. The flanged end engages a screw 922 adjustably mounted on a flange 924 located at the front end of the lever 850.

As already indicated, the cam operated and safety trip mechanisms occupy the positions in which they are shown in Fig. 23 when the double clutch is down in carriage driving position. When the clutch is shifted upwardly as a result of the operation of the trip relay 729, the lever 850 is moved up in a manner previously described. As a result the screw 922 at the end of the clutch shifting lever 850 is moved away from the flange end 920 of the clutch latching lever 880. The latter immediately is rotated in a clockwise direction about its pivot shaft 890 by the spring 904 to a position whereat the end 914 thereof is below the latching flange 912 at the upper end of the intermediate lever 886. When the record is transferred toward the playing position, the spring arm 884 moves downwardly and the spring 904 moves the safety trip lever arm 900 out of the path of movement of the record. The arm 900 engages the flange 912 of arm 886 and moves it counterclockwise to a position whereat the arm 886 is latched by the end 910 of lever 894 and the end 914 of the clutch latching lever 880 is latched below the flange 912 of arm 886.

After the playing of a record and when the return of a record to the magazine has been completed, the cam operated trip lever 872 is lifted by the projection 366 of cam 362. Assuming that the record has not been properly returned to the magazine, then the flange 912 of arm 886 retains lever 874 in its latched position underneath the flange 912. Consequently, the flanged end 920 of lever 874 which engages the screw 922 at the front end of the clutch shifting lever 850 prevents the latter from moving down to shift the double clutch into the carriage driving position. Assuming, however, that a record is properly returned to the magazine, then the safety trip lever 882 is moved to the position in which it is shown in Fig. 23 by the spring arm 884. The intermediate lever 886 is moved by the lever 882 until the backside of flange 912 strikes the finger 910 and, finally, when the lever 872 lifts the end of lever 874 thereabove to depress the finger 910, the lever 880 is unlatched to enable the clutch shifting lever 850 to shift down and to move the double clutch to its lowermost position.

Cam operated switch

A cam operated switch indicated as a whole by reference character 930, constructed as an assembly with the player arm trip switch 790, is provided for the purpose of controlling the motor to effect the playing of the right side of a record after the left side of the same record has been played. The cam operated switch also prevents the reversal of the motor when the left side of the record is being played. The manner in which this is accomplished will be described hereinafter in conjunction with the electrical circuits embodied in the machine but the physical construction of the switch and its operating means will be described at this point.

The cam operated switch is operated by a rearwardly extending arm 932 of the cam operated trip lever 872, see Figs. 26 to 28 and 53, which has a transverse flange 934 engaging a flexible switch actuating arm 936.

The playing of the right side of a record after the left side of that record has been played is effected through a circuit including a pair of switch blades 938, one of which is fixedly secured to the actuating arm 936. The switch is normally open and is closed only when the lever 872 moves to its limit in a counterclockwise direction, which it does when the projection 878 thereon falls into the recess 364 in the cam 362. The switch 938 is effective to exert a control function, namely, the energizing of a reversing relay 940, only when the left side of a record has been played and the cam shaft is rotating the second 180° of its movement in a counterclockwise direction. The lever 872 also moves into the depression 364 when the right side of a record is to be played, but such movement exerts no control function because the reversing relay 940 was previously operated and latched in operating position in a manner to appear shortly.

A record pair of cam operated switch blades 942 is utilized in the selection of the right sides of records for playing and for preventing the reversal of the motor when the left side of a record is being played. One of the switch blades is operatively connected to the lever 872 by a switch operating block 944 connected to the blade. The switch blades 942 are normally closed to condition a selector circuit for completion when the right side of a record is selected for playing. In other words, the switch blades 942 are in engagement when the lever 872 is at the limit of its movement in clockwise direction, i. e., when the projections 366 and 878 are in engagement. At all other times the switch is open.

Clutch controlled switch

A clutch controlled switch, indicated generally by reference character 950 is provided to perform a number of functions. One of the functions is to complete a holding circuit to maintain the motor energized long enough to complete a record playing and transfer cycle in the event a main manually operable control switch 952 is operated to its "off" position during the transfer or playing of a record. Another function is to complete a circuit to the reversing relay when the right side of a record has been selected for playing when the double clutch shifts up in response to the selection of the right side only or during the time the clutch is up when the right side is played after the left side. A third function is the completion of a circuit to enable the playing of a record to be repeated.

The switch 950 is operated by the upper flanged end 954 of an upwardly extending arm 956 of the clutch actuating lever 850. The switch includes three pairs of switch blades through which the three above specified functions are performed.

The holding circuit is completed when the clutch is in its upper position through the normally open switch blades 958, one of which is operatively connected to the flange by a switch operating abutment 960.

The right side selection circuit is controlled by the pair of normally open switch blades 962, which are adapted to be closed when the clutch is in its upper position. When the right side only of a record is selected, a circuit is completed to the reversing relay 940 upon the closure of the switch blades 962. When the right side is played after the left side, the switch blades 962 are already closed but the energizing circuit for the reversing relay 940 is completed through the cam operated switch blades 938. One of the switch blades 962 is operatively connected to the switch operating lever arm through an insulating block 964 secured to one of the switch blades 962.

When the playing of a record is to be repeated, the trip relay is operated when the clutch shifts down, thereby immediately returning the clutch to its up position. The relay is energized through a circuit including the two normally closed switch blades 966, one of which is operatively connected to the lever arm 956 through an insulating block 968.

Reversing relay latch

In order to prevent deleterious and undesired results from taking place because of power failures when the right side of a record is being played, i. e., when the reversing relay 940 is energized, the latter is mechanically latched in its operated position. It is preferred that the latch be controlled by the clutch and specifically by the upwardly extending arm 956 of the clutch operating lever 850.

The reversing relay latch is indicated as a whole by reference character 970. It is pivotally mounted between its ends upon a pivot shaft 972 and it is urged in a clockwise direction by a biasing spring 974 secured to it and a switch assembly mounting plate 976. The latch is held in unlatching position when the double clutch is down in its carriage driving position and against the force of the spring by a flanged arm 978 on the upper arm 956 of the lever 850, which engages the flanged upper arm 980 of the latching lever. When the clutch is moved up, the latching lever is urged in latching direction by the spring 974.

The reversing relay is latched when the clutch is in its upper position and the reversing relay is energized, even momentarily. When the relay is energized it operates and moves its armature 982 downwardly with the result that the armature is latched by the latching shoulder 984 which moves over a latch arm 986 projecting from the armature.

The reversing relay

The reversing relay 940 and its armature 982 are mounted as best illustrated in Figs. 26 to 29 upon the mounting plate 976 to the rear of the main carriage casting. The armature is pivotally mounted upon a supporting bracket 990 which also supports, above the armature, a double pole, double throw reversing switch 992. In one position of the reversing switch the motor 150 is rotated in one direction and in the other the motor is rotated in the opposite direction. It may be noted that the switch is actually constructed with the two parts alongside each other rather than above as in Fig. 53, the two parts being, however, shown above each other in the latter figure better to illustrate the circuit connections. The armature is operatively connected by a vertically extending switch operating arm 994 to the movable switch blades 996 and 998. The switch blades are biased into the positions in which they are illustrated in Figs. 26 to 29 and Fig. 53 by a spring 1000 secured to the relay mounting bracket and armature.

*Carriage reversing switch*

The carriage is moved in opposite directions by the motor. One of these directions, movement to the right, is the playing direction while the other direction, from right to left, is the return or nonplaying direction. The carriage reversing switch not only controls the direction of the motor but it also renders inoperative the record selector mechanism when the carriage is traveling in its nonplaying direction.

The direction of motor rotation is controlled by the reversing relay 940 which is in circuit with the carriage travel switch.

The motor is reversed at the limits of movement of the carriage by a motor reversing switch indicated generally by reference character 1002 mounted upon the plate 976 to one side of the reversing relay. The switch may take various forms and it is preferably of the snap action type operable by a downwardly extending arm 1004. The switch operating arm is moved between its two positions upon engagement with spaced apart arm engaging abutments 1006 and 1008 located at the right and left-hand ends of the rear horizontal support 20, as illustrated in Figs. 3 and 29, respectively. The switch includes a pair of movable switch blades 1010 and 1012, see Fig. 53, controlling the selector and reversing relay circuits.

*The record selecting mechanism*

The record selector mechanism will be described in connection with Figs. 6, 30 to 33, and 53. The selector mechanism and associated controls are so arranged so that either or both sides of a selected record or records can be played. If only one side of a record is selected for playing, that side is played; and if both sides of the same record are selected, then the two sides are played in sequence without any travel of the carriage, the left side being played first and then the right side.

The selector mechanism is characterized by the provision of a plurality of record selector elements 1020, preferably arranged immediately below the records to which they correspond, and each being operable into four positions. The selector elements are normally in a nonselecting or off position in which they are illustrated in the various figures. From the off position they are moved into a first selecting position indicated in phantom and by the reference character 1022 (see Fig. 30) for playing the left side of a record. In a second selecting position, indicated by reference character 1024, both sides of a record are selected for playing, and in a third selecting position indicated by reference character 1026, only the right side of a record is selected for playing.

The selector elements are mounted for angular movement upon a shaft 1028 in spaced apart relation. In order to facilitate the positioning and holding of the selector elements in their various positions, each of the elements is provided with four positioning grooves 1030 located at its lower side. The elements are resiliently held in their various angular positions by detent springs 1032 located below them. The selector elements are held in spaced apart relation upon the shaft 1028 and are also guided in their angular movements by a series of generally rectangular slots 1034 in the front plate 54 of the selector housing, and slots 1036 in the rear plate 1038 of the housings, respectively, as best illustrated in Figs. 30 and 31. The rear plate 1038 is a generally L-shaped plate secured to the front plate and to a rear plate 1040 constituting part of the housing for the main switch 952 and other control switches to be referred to shortly, as best illustrated in Fig. 31. The wiring to the switches is led through a fitting 1042 passing through and secured to the rear plate 1040 of the switch housing.

The combined selector and switch housing is secured to frame member 18 by the downwardly and rearwardly inclined portion 1044 of the front plate 54, as best illustrated in Fig. 30. The selector housing is covered by the plate 50 while the switch housing is covered by a detachable plate 1046, see Fig. 5.

The selection of records is facilitated by means for indicating the position of the record transfer arm relative to the records in the magazine and means for correlating the positions of the selector elements both with the record and the sides of records selected for playing.

The position of the record transfer arm 38 is indicated by a light, such as a small electric lamp 1048 detachably mounted within an apertured light shielding housing 1050 carried at the end of a double armed selector bracket 1052 secured to the movable carriage and moving with it. The selector arm 36 is mounted between the arms 1054 of the selector bracket. The lamp is preferably supplied with power from a low voltage source.

The position of the transfer arm is indicated by the illumination of small numbered windows 1056 located below the record spaces and corresponding to the selector elements individual to the record spaces and formed in a dial plate 1058 secured to the front wall 54 of the switch and selector mechanism housing.

The record and record side selection are facilitated by a numbering and coloring arrangement. The records are preferably numbered and the selections indicated upon an indicating plate 1060. In addition, the sides of the records of the selections on the two sides are indicated by differently colored circles. For instance, the left sides may be indicated by yellow circles 1062 and the right sides by red circles 1064. The selector element positions are similarly indicated, the left side only being indicated by a yellow line 1066 and the right side only by a red line 1068. The play-both-sides position of the selector elements are indicated by the yellow and red lines 1070 and 1072. It is thus a simple matter to select the desired record and side, and to operate the proper selector element into its proper position.

The movable carriage and the record transfer arm carried by it are stopped in position to transfer and play selected records by control circuits adapted to be completed through circuit controlling elements mounted at the end of the selector bracket 1052 and cooperatively associated with the arcuate inner ends 1074 of the selector elements. The circuit controlling elements are mounted upon a support 1076 secured to the forward end of the selector bracket 1052 and made of some suitable insulating material. In the illustrated embodiment of the invention there are as many circuit controlling elements as there are operative positions of the selector elements, namely, three, as indicated by the reference characters 1080, 1082 and 1084. The circuit controlling elements constitute, in effect, movable contact fingers. The element 1080 is engaged by the arcuate ends 1074 when either the left, right or both sides of a record are selected for playing. It, as will be described hereinafter, controls, in the main, the stopping of the carriage. It is engaged by the selector elements in advance of the other circuit controlling fingers and the circuit through it is made only momentarily.

The circuit controlling element 1082 is also engaged by the selector elements when both sides or the right side only is selected. However, the engagement occurring therewith when the right side only is to be played serves no useful control purpose, as will appear hereinafter.

The circuit controlling element 1084 is also engaged by selector elements in position to select the right side only of the record for playing.

The movable selector contact elements are preferably made of spring wire and are mounted upon a post 1086 in the support 1076. They are given a turn or two about the post in order to bias them in a forward direction. The outer ends of the contact fingers are provided with reverse bends to facilitate movement and engagement with the operated selector elements. The outer ends are guided by longitudinally extending grooves 1088 in a guide plate 1090 made of insulating material, having slots 1092 through which the selector elements project and are secured to the backside of the back plate 1038 of the selector mechanism housing. This construction is best illustrated in Fig. 32, which also indicates contact finger 1080 to be in advance of the other contact fingers. It is to be noted that when the carriage is stopped, no circuit is completed through the contact finger 1080.

Mute switch

The sound reproducing apparatus, which may be of any desirable or conventional construction and which has not been illustrated, may be muted except when a record is being played by a mute switch 1094 preferably adapted to be closed when the cycling clutch is disengaged. The switch is preferably operated, as indicated in Fig. 2, by the cycling clutch operating lever 276, the switch being located below and to one side of the lever.

No-record trip mechanism

The phonograph is also provided with means for operating the trip mechanism automatically in the event no record is transferred to the playing position. The arrangement avoids the necessity of manual operation to continue operation of the phonograph in the event something should happen to cause the movable carriage to stop at a position whereat there is no record.

The no-record trip mechanism includes a no-record trip switch 1096 (see particularly Figs. 2 and 7) controlling the trip relay 720. The switch is mounted upon the record stripper 400 below the central aperture therein and adapted to be closed by a screw 1098 adjustably secured to the clamping arm 226 in a position such that the switch is closed to operate the trip relay in the event the clamping arm moves farther than it would with a record between the turntable elements 222 and 224. The switch is not closed if a record is located between the turntable elements so that the clamping element does not move as far as it would otherwise, and as indicated in Fig. 7.

Record reject mechanism

The phonograph is also provided with means for rejecting a record being played or being transferred to the playing position, if, in the latter case, operated subsequent to the cocking of the trip mechanism. The mechanism includes a switch 1100 controlling the trip relay 720 in the manner hereinafter to be described in greater detail. The switch is operable by a handle 1102 projecting beyond the front and dial plates of the selector mechanism and switch housing. The switch is spring biased to return to a normal or off position.

Scanning mechanism

In order to enable the user of the phonograph to move the carriage to a desired position to select a desired record irrespective of whether or not selector elements corresponding to intermediate records have been operated, means are provided for rendering the selector means ineffective and for energizing the motor 150 independently of the other controls. This means includes a switch 1104 preferably operable by the same handle 1102 as the record reject switch. When the handle is moved in one direction, the record reject switch is rendered effective and when the handle is operated in the opposite direaction, the scanning switch is rendered effective.

Main control switch

Figure 6:
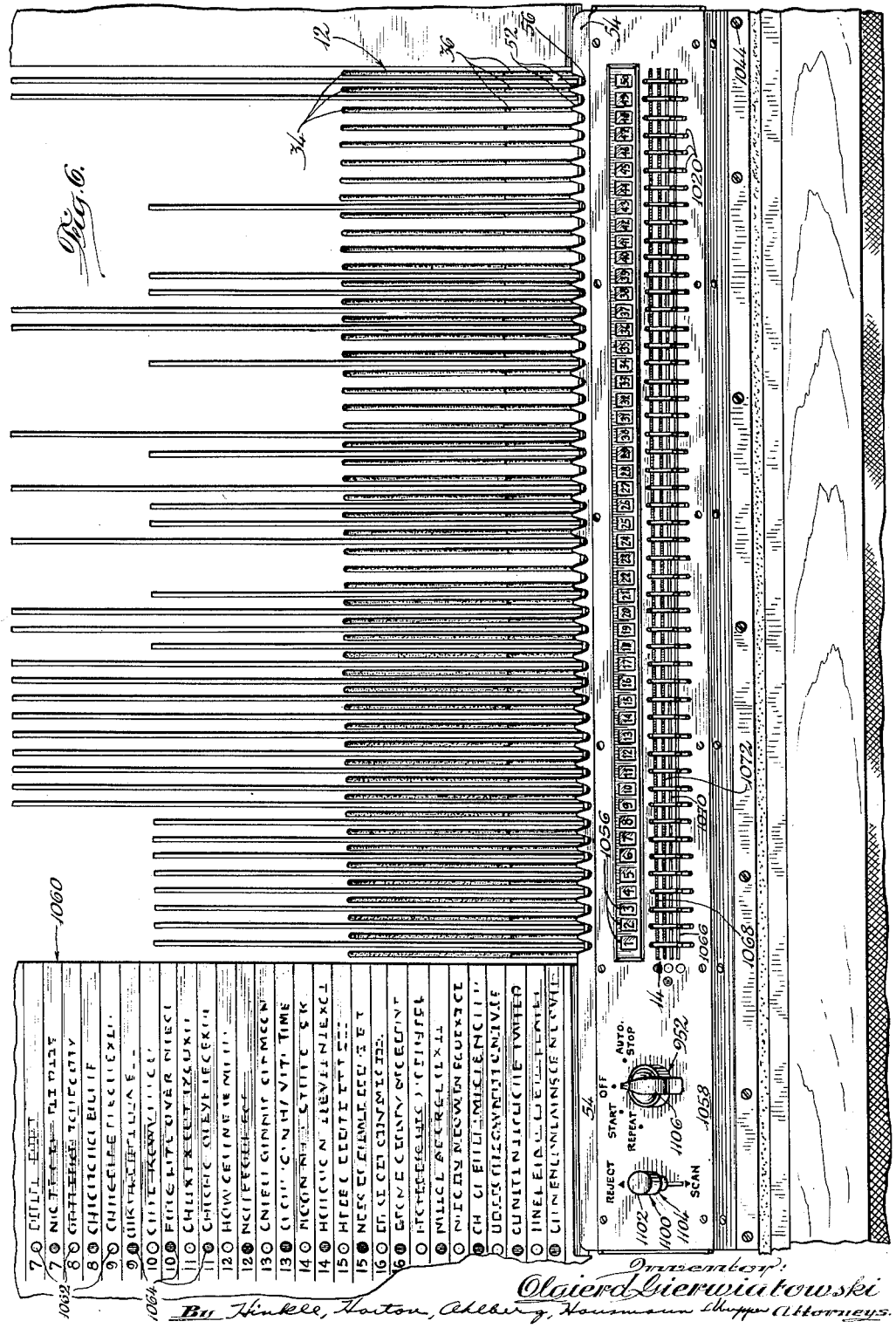
Fig. 6 is an enlarged front elevational view of the phonograph, illustrating particularly the selector mechanism and other controls utilized to place the phonograph into operation and to control it.

The main control switch 952 is operable into a plurality of positions from an off position. Referring particularly to Figs. 6 and 53, the switch may be noted to be of the rotatable type adapted to be rotated by an indicating knob 1106. To place the phonograph into operation, the switch is rotated to a first counterclockwise position, called a start position. In this position the phonograph plays the selected records continuously until some manual operation is effected.

In a second counterclockwise position, the record selected for playing is played again. This position is called a repeat position.

The remaining operative position of the switch, called an automatic stop, is the first clockwise position of the switch from its off position. In this position the selected records remaining unplayed between the then position of the carriage and the right end of the magazine are played, after which the carriage returns to its home position and the main control switch is automatically operated to its off position. This is preferably, but not necessarily, accomplished by a switch operating arm 1108 adjustably secured to the outer end of the selector bracket 1052 and engageable with a pin 1110, see Fig. 31, secured to an arm 1112 fixed to the operating shaft of the main control switch 952. When the control switch is operated to its automatic stop position, the return of the carriage to its home position automatically returns the control switch to its off position thereby to stop the operation of the phonograph. It should be understood that a separate switch or relay means could be controlled just as well as the main control switch.

The electrical circuits

The electrical circuits may be divided into high and low voltage circuits, the former of which supplies power to the motor 150 and the low voltage circuit, and the latter of which supplies power to the control.

High voltage circuits

The high voltage circuit is broken in the off position of the main control switch 952 with the result that no power is supplied to the low voltage circuit or to the motor. Power is supplied to the motor and low voltage circuit whenever the control switch is operated to any one of its three operative positions, namely, the start, repeat, and automatic stop positions. The switch includes a movable switch blade 1120 connected by a stationary switch blade 1122 to a high voltage power supply conductor 1124, which together with the other high voltage conductor 1126 may be connected to a suitable source of A. C. voltage, such as the usual 110 volt power supply lines.

In the off position of the main switch, the conductor 1124 is connected through a stationary contact 1128 and conductor 1130 to the previously referred to clutch position responsive switch 958 which, with the aforesaid circuit, constitutes a holding circuit to complete the record playing and return cycle when the main switch is operated to its off position after a playing cycle has been initiated. The other side of switch 958 is connected by conductor 1132 to a conductor 1134 leading to the low voltage supplying means and motor.

In the three operative positions, the motor and low voltage supplying means conductor 1134 is connected to the power supply conductor 1124 through other stationary switch blades. In the start position the connection is through a switch blade 1136; in the repeat position the connection is through switch blade 1138; and in the automatic stop position the connection is through the switch blade 1140.

The low voltage power supplying means and motor are energized whenever a circuit is completed by the conductors 1124 and 1134. The low voltage supplying means includes a transformer 1142 having a primary winding 1144 and a secondary winding 1146. The primary winding is connected across conductors 1134 and 1126 by the pair of conductors 1148.

The motor 150 is preferably a reversible synchronous motor of the capacitor type. Its reversal is accomplished by the reversing switch 992 which reverses the connections of motor winding 1150 to the power supplying lines 1126 and 1134. The other winding 1152 is permanently connected to the adjacent power conductors through the capacitor 1154 which is preferably mounted on the switch mounting plate 976, see Fig. 29. The terminals of winding 1150 are connected by conductors 1156 and 1158 to the movable blades 996 and 998, respectively, of the reversing switch 992, the stationary switch blades of which are connected in known manner by conductors 1160 and 1162 to conductors 1134 and 1126.

An energizing circuit for the motor 150 is completed by the scanning switch 1104 whenever the latter is operated. When it is operated, the selector circuit is opened by the reject switch 1100 in a manner to be made apparent shortly. Consequently, when the scanning switch is operated, the motor is energized through a circuit independent of the main control switch and the carriage is moved by the motor as long as the scanning switch remains operated. The scanning switch when operated closes a circuit between conductors 1124 and 1134. The circuit extends through conductor 1164, stationary switch blade 1166, movable switch blade 1168 and stationary switch blade 1170 which is connected to conductor 1134.

Low voltage control circuits

The low voltage control circuit includes but two relays, these being the trip relay 720 and the reversing relay 940. The trip relay and its various energizing and control circuits will be considered first.

The trip relay is energized by various control means as heretofore indicated.

The trip relay is energized to stop the carriage in position to effect the transfer and playing of a selected record. This energizing circuit is completed through selector elements corresponding to the record and the movable contact finger 1080, which contact finger is engaged by the selector element in all three of its operated positions, the circuit being completed only temporarily, as heretofore indicated. This energizing circuit for the trip relay extends from one side 1172 of the secondary winding to the trip relay through conductor 1174 and from the relay back to the other side 1176 of the transformer through a main trip relay conductor 1178, conductor 1180, the movable contact finger 1080, selector element 1074 in brief engagement with the contact finger in any of the three operative positions of the selector element, the detent spring 1032, ground connection 1182, the grounded stationary switch blade 1184 of the main control switch 952, movable switch blade 1186, radial arm 1188 of the movable switch blade in engagement with stationary contact 1190 in the start position or stationary contact 1192 in the automatic stop position, conductor 1194 leading to the reject switch stationary contact 1196, movable contact 1198, stationary contact 1200, and conductors 1202 and 1204 leading to the movable blade 1012 of the carriage reversing switch 1002 and thence to the transformer.

Thus whenever the main control switch is in either its automatic start or stop position, the trip relay is energized whenever an operated selector element is engaged by the movable contact finger 1080, whereupon the movable carriage is stopped with the transfer arm in position to effect the transfer of the selected record to and from playing position.

The trip relay is also operated by the player arm trip mechanism when the playing of a record has been completed, whereupon the cycling clutch is engaged to drive the cam shaft and effect the return of a record back toward the magazine. Whenever the player arm trip mechanism is operated, the trip relay is energized by closure of the switch 790 operated by the switch operating lever 792 controlled by the latch lever 796. The energizing circuit extends from the transformer through the relay and conductor 1178 as heretofore described. It then extends through conductor 1206 to the switch 790 and from the latter to the other side of the secondary winding through conductor 1208 and the previously referred to conductor 1204 and switch 1012. It should, perhaps, be noted that this energized circuit does not extend through the main control switch 952 so that the trip relay is energized upon the completion of the playing of the record even when the main switch is in its off position.

The trip relay is also energized by the no-record trip switch 1096 which is closed when the record clamping arm is moved through more than the usual distance as a result of there being no record in playing position. This energizing circuit extends from the secondary winding through the relay 720 and conductor 1178, as heretofore described, and thence through conductor 1210, the switch 1096, and conductors 1208 and 1204 as heretofore described. This circuit is also completed irrespective of the position of the main control switch.

The trip relay 720 is also energizable upon the manual operation of the reject switch 1100. When this switch is operated, from its indicated position in Fig. 53, in a counterclockwise direction, an energizing circuit is completed for the trip relay. The circuit extends through the relay to conductor 1178 as heretofore described. It is completed through conductor 1212, stationary switch blade 1214 of reject switch 1100, movable switch blade 1196, stationary switch blade 1200, and the heretofore described circuit including conductors 1202 and 1204 and the carriage reversing switch.

In order to repeat the playing of a record, the main switch 952 is placed into its repeat position. In this position an energizing circuit for the trip relay is conditioned for completion immediately the double clutch is shifted down. The result is that the double clutch is then shifted back to its uppermost position without any forward movement of the movable carriage. The energizing circuit for the trip relay is completed through the conductor 1178, a conductor 1216 leading to the repeat switch 968 forming part of the clutch control switch 950, and which is closed only when the double clutch is at its lowermost position, conductor 1218, the stationary contact 1220 of the main switch engageable by the radial arm 1188 of movable contact 1186, a second radial arm 1222, in engagement with stationary contact 1192, conductor 1194, switch elements 1196, 1198 and 1200 of the reject switch, conductors 1202 and 1204 and the carriage travel switch.

*Control of reversing relay by carriage operated switch*

The carriage operated switch 1002 either directly energizes the reversing relay 940 or places the latter under the control of the selector mechanism. In Fig. 53 the relay is shown under the control of the selector mechanism, which condition obtains when the carriage is moved in playing direction. In nonplaying direction, the carriage driven switch 1002 is operated to its other position in which it directly energizes the relay 940 and cuts out the selector circuit.

Referring to Fig. 53, one terminal of the relay winding is connected to the secondary conductor 1172 by conductor 1224. The other terminal is connected by conductor 1226 to the movable switch blade 1010 of the carriage switch. When the carriage switch is operated to energize the reversing relay, the conductor 1226 is connected to the other secondary conductor 1176 by the movable switch blade 1010. As a result, the relay is energized to operate the reversing switch 992 to reverse the motor and to drive the carriage in nonplaying direction.

*Selection of left side of record only*

When a selector element is operated to select the left side only of a record for playing, the actuated element is engaged only by the movable contact finger 1080 and this engagement, as heretofore described, is of but brief duration. It effects the momentary energization and operation of the trip relay 720, as heretofore described in considerable detail, with the result that the double clutch is shifted from its lower carriage driving to its upper cam shaft driving position. The movable carriage is thus stopped at the selected record position and the record is transferred to playing position, played and returned to the magazine.

When the double clutch shifts upwardly, switch blades 962 and 966 of the clutch control switch 950 are respectively closed and opened. The closing of the switch blades 962 exerts no control because switch blades 938 and 940 of the cam controlled switch 930 in series with it are in open circuits—no circuits being completed through conductors 1232 and 1234 leading to the unengaged contact fingers, so that the motor reversing relay cannot be operated. Should the actuated selector element be later moved to engage either finger 1082 or 1084, the reversing relay still would not be energized because switch blades 942 and 938 are open when the cam shaft starts to move. However, the later operation of the selector element to select the right or both sides of a record would result in the playing of the right side of the record after the left side was played, when the switch 938 is closed, as it is, during the return of the record toward the magazine after the playing of the left side.

The closing of switch blades 966 conditions a circuit for the previously described repeat operation.

*Selection of right side of record only*

Consideration will next be given to the control involved in the selection of the right side only of a record for playing. When a selector element is operated to select the right side only of a record for playing, the selector element engages all three movable contact fingers, but only fingers 1080 and 1084 are effective. Finger 1080 operates as before to energize the trip relay 720 to stop the carriage and to shift the double clutch to its uppermost position. When the double clutch shifts upward, an energizing circuit is completed for the reversing relay 940 through switches 942 and 962 of the cam operated switch and clutch control switch, respectively. The energizing circuit extends from one side of the secondary winding to the relay through conductors 1172 and 1224. From the other side of the relay it extends to the other side 1176 of the secondary winding through conductor 1226, switch blade 1010 of the carriage travel switch 1002, conductor 1228 to the clutch operated switch blades 962 adapted to be closed when the clutch is shifted to its upper position, conductor 1230, cam operated switch blades 942 which are closed at the time the double clutch is shifted upwardly, conductor 1232, the movable contact finger 1084, which remains in engagement with the engaged selector element 1020, spring detent 1032, ground conductor 1182, the grounded switch blade 1184 of the main control switch, the movable contact 1186 in engagement with either of stationary contacts 1190 and 1192 of the main control switch, conductor 1194, switch elements 1196, 1198 and 1200 of the reject switch and conductors 1202 and 1204, and switch blade 1012 of the carriage travel switch, which is connected to the secondary conductor 1176.

When the reversing relay is thus operated upon movement of the double clutch to its upper position, it is latched in operated position by mechanical latch 970. It is unlatched only when the double clutch is shifted down as a result of another energization of the trip relay. The energization of the reversing relay reverses the motor so that the turntable is rotated in the proper direction for playing the right side of a record and the cam shaft is driven in the proper direction (clockwise). Switch 966 is opened by upward movement of the clutch, thereby to condition the apparatus for the repeat operation. Shortly after the cam shaft starts to rotate, the cam operated switch 942 opens (as a result of projection 878 of lever 872 filling into depression 364 in cam 362) but this has no effect upon the reversing relay because it is mechanically latched in its operated position, as the double clutch is in its upper position. Switch 938 is also momentarily closed to maintain the relay energized. After the record has been played and returned to the magazine and the double clutch shifted downwardly, the circuit for the reversing relay is broken by switch 962 upon the shifting of the double clutch to its lower position and the relay armature is unlatched so that the switch blades 966 open the relay circuit.

*Playing both left and right sides of records*

When a selector element is operated to play both the right and left-hand sides of records, it is engaged first by the moving contact finger 1080 and then the moving contact finger 1082, the circuit through the former being made briefly but being maintained through the finger 1082. The circuit through the latter, however, is opened at this time because switch blades 938 of the cam operated switch are open. Consequently, the first thing that happens is that the trip relay 720 is energized just as though the left side only of a record was to be played. After the left side has been played and the trip relay is operated by the player arm trip mechanism, the cam is rotated in its initial direction (counterclockwise) until it has rotated nearly 360°. At this point the cam operated switch blades 938 are closed by the switch operating lever 872, the projection 878 of which falls into the depression 364 of cam 362. A circuit is immediately completed through the reversing relay with the result that the latter is energized to reverse the motor and to effect the return of the record back to playing position and the shifting of the player arm to play the right side of a record. The energizing circuit for the reversing relay is completed as heretofore described as far as conductor 1230 from which it extends through the switch blades 938 and conductor 1234 through the moving contact finger 1082. From this point on it extends through the selector element, the main control switch 952, the reject switch 1100, and the carriage travel switch 1002.

*Operation*

The operation of the phonograph for the selection and playing of different records, as well as different sides of different records, will now be described. It is assumed first that the movable carriage is at its extreme left or home position and that the main control switch 952 is in its off position. Under these conditions the various circuit elements and associated controls occupy the positions in which they are illustrated in Fig. 53. The motor and low voltage supplying means deenergized; the cycling clutch is engaged ready to drive the vertical shaft; and its operating lever 740 is latched by the cam shaft operated latch 768; the double clutch 120 is in its lower carriage driving position; the cam shaft 322 is in a position in which the cams occupy the positions in which they are illustrated in Figs. 37 to 40, inclusive, and the various elements controlled thereby are in the positions in which they are indicated in these figures. The pickup means controlling mechanism is in the position occupied by it for the playing of the right-hand side of a record, which signifies that the last side of a record played was the right side of a record. The record clamping arm 226 is in its retracted position; the transfer arm 38 is below the level of the records in the magazine and power has been stored in the spring 436 to assist the motor in raising the record to playing position; the player arm controlling lever 599 is at the limit of its movement in a clockwise direction (in its lowest position) so that the pickup means 345 is maintained away from the record playing position by the cam 694 and the pickup means and player arm held at the initial playing position for 12" records by the positioning plate 616, clutch members 626 and 632, and the latch lever 650, as indicated in Fig. 25. The clutch and safety trip mechanism occupy the positions in which they are indicated best in Figs. 22 and 23 and the carriage positioning roller 114 is out of contact with the positioning wheel 112.

Records to be played can be selected either before or after the phonograph has been placed in operation. It is assumed that the selections are made before the main control switch 952 is operated from its off position. It is assumed that the following selections are made: the right sides of records 10 and 11, this being accomplished by moving the corresponding selector elements 1020 into their third operative or uppermost positions into alignment with the red line 1068; the left sides of records 20 and 21, this being accomplished by the operation of the corresponding selector elements into their first operative positions or with their handles in alignment with the yellow line 1066; both the left and right sides of records 30 and 31—this is accomplished by movement of the selector elements into their second positions with the operative handles in alignment with both the yellow and red lines 1070 and 1072.

The selected records can now be played repeatedly by operating the control switch 952 to its start position, in which certain of the high and low voltage circuits controlled by it are closed. The high voltage conductors 1124 and 1134 are connected so that the primary winding of the transformer 1142 supplying the low voltage and motor 150 are energized. The motor rotates in a direction to move the carriage in its playing direction because the reversing relay 940 is not energized. This direction of rotation of the motor is the proper direction for playing the left sides of records. The low voltage portion of the main control switch (including movable contact 1180) connects conductor 1194 to ground.

Incidentally, it may be noted that the same circuits are closed by the main control switch when operated to its automatic stop position. However, the switch cannot be operated to this position until after the carriage has moved in playing direction, because the switch operating finger 1108 on the movable selector bracket is engaged by the switch operating pin 1110 so as to prevent rotation of the switch to the automatic stop position. However, when the carriage has moved a short distance, the switch can be operated to the automatic stop position wherein the same circuits are closed by it. The difference between the two positions is that in the automatic stop position the selected records are played once and the switch is automatically operated to its off position when the carriage returns to its home position, whereas in the start position of the switch, the selected recordings are played repeatedly until the switch is manually returned to its off position.

The energization of the motor 150 results in its rotation of the turntable (in the proper direction to play the left sides of records), which is permanently connected to the motor shaft, and in the rotation of the vertical shafts 280 and 284 through the cycling clutch 250 which is latched in engaged position by the cam shaft operated latch lever 768. The double clutch 120 rotates the carriage driving pinion 80 through the driving pin 116 thereby to move the carriage in playing direction, i. e., to the right as viewed from the front. The carriage is guided to move in a steady manner along the rail 84 by the cooperative action of the spring pressed guide roller 74 and the rollers 76 and 78 located on the opposite side of the rail, as heretofore described in detail. The movement is noiseless because the positioning roller 114 is out of contact with the detent wheel 112.

The carriage is driven in playing direction until the movable contact finger 1080 engages the arcuate end 1074 of the selector element 1020 corresponding to the first selected record 10. If no selections had been made, the motor would continue moving to the right until it reached the limit of its movement in that direction whereat the carriage operated reversing switch 1002 would be operated to energize the reversing relay 940. The latter would then operate the motor reversing switch 992 to reverse the direction of rotation of the motor with the result that the carriage would move to the left or nonplaying direction. When the carriage reached the limit of its movement to the left, the carriage reversing switch 1002 would be operated again, this time to deenergize the reversing relay, whereupon the motor would reverse and rotate in a direction to move the carriage in playing direction. During movement to the left or nonplaying direction the selector elements exert no control as the energizing circuits controlled thereby are opened by the switch 1002.

Inasmuch as selections had been made, the movable contact fingers travel with the carriage until finger 1080 engages the selector element corresponding to record 10, whereupon the trip relay 720 is momentarily energized through the previously described circuit including the contact finger. The relay operates the trip mechanism to stop the carriage and to initiate the record transfer and playing cycle. The momentum of the carriage and the positioning mechanism stop the carriage with the circuit through the movable contact finger 1080 broken but with the circuits completed through the movable contact fingers 1082 and 1084. However, only the circuit completed through contact finger 1084 is effective, as will be described more fully shortly.

The positions of the carriage and of the transfer arm are indicated by the light bulb 1048 which is preferably supplied with low voltage from the secondary winding of the transformer 1142. The light moves with the carriage and shines through the record number bearing glass covered apertures at the front of the phonograph. Consequently, it is an easy matter to determine the position of the carriage during movement and when it stops to play the record. This is of particular advantage when the scanning switch 1104 is operated to move the carriage to a desired position.

When the trip relay 720 is energized by the closure of the circuit through contact finger 1080, which closure might be considered as producing a selector impulse, the relay armature 724 is moved upwardly to release the main trip lever 734. The previously tensioned spring 856 immediately moves the lever in a clockwise direction from the position in which it is shown in Fig. 26 to the one in which it is shown in Fig. 27. The double clutch member is moved upwardly to its cam shaft driving position and accurately to position the carriage, the spring moving the clutch operating lever 850 in a clockwise direction through the multiarmed lever 736. The carriage is positioned by movement of the bell crank arm 132 actuated by the clutch shifting means, the crank arm moving the pivoted roller carrying arm 138 toward the positioning wheel 112 to move the roller 114 into an intertooth space of the positioning wheel.

Should it happen that the double clutch is not moved upwardly the full extent by spring 856, then, when the cam shaft 322 rotates a short distance, cam 368 lifts the clutch shifting lever 850 through the roller 870 on the lever. Inasmuch as the right side of a record is to be played, the cam 368 is rotated in a clockwise direction as viewed from the right end of the machine, the reversing relay having been energized, as will be described shortly.

The operation of the trip relay 720 also results in the movement of the player arm trip switch operating lever 792 in a clockwise direction to insure that the latching shoulder 824 will catch the lower end 822 of the latch lever 796. The lever 792, it will be remembered, is moved by the pin 834 on the main trip lever 734.

The shifting of the clutch to its uppermost position also releases the clutch latching lever 880 of the safety trip mechanism, it being moved in a clockwise direction as viewed in Figs. 22 and 23 by the spring 904.

The release of the trip lever 734 also effects movement of the cycling clutch operating lever 738 but this movement performs no function at this time because lever 738 is spaced from lever 740, the latter being latched by the cam operated latch 768, as indicated in Fig. 10.

When the movable carriage has been stopped and positioned, as described above, an energized circuit for the reversing relay is completed through record 10 selector element 1020, and the contact finger 1084. The circuit includes the normally closed switch blades 942 of the cam operated switch 930 and the switch blades 962 of the clutch controlled switch 950, which are closed when the clutch is shifted upwardly. The reversing relay operates the reversing switch 992 to reverse the direction of the motor so that it rotates the cams in a clockwise direction as viewed from the right. The reversing relay armature and the reversing switch are mechanically latched by the clutch controlled latch 970 so that the motor will continue to rotate in the proper direction even though the power should fail and the cam starts to rotate, when the energizing circuit for the relay 940 is broken by the opening of the switch blades 942, which are open at all times except when the cam is in its initial position and the lever 872 is at the limit of its movement in a clockwise direction.

It having been assumed that the right side of a record had been played last, then the rotation of the cam shaft is in the same direction as when the last record was played. As a result, the player arm shifting mechanism is not operated to shift the player arm, the lever 550 remaining in the position in which it is indicated in Fig. 39. Accordingly, the player arm shifting slide bar 552 is at its extreme right position (viewed from the front) or at its extreme left as illustrated in Figs. 50 and 51. In this position the vertically reciprocable biasing spring control plate 692 is prevented from moving upwardly by the slide plate so that both biasing springs 682 and 684 will be effective to bias the player arm and pickup means toward the playing grooves.

As the cam shaft is rotated in a clockwise direction, the various cams are rotated to perform their respective functions. The cam 356A is effective with the previously tensioned spring 436 to move the transfer arm 38 upwardly to move a record from the magazine to the playing position. As the transfer arm is moved, the resilient safety trip mechanism spring arm 884 moving with the transfer arm is moved downwardly whereby the record safety trip lever 882 is moved by the spring 904 out of the path of the record and to move the intermediate lever 886 into latching position with the levers 874 and 880 of the clutch control safety trip mechanism.

It is assumed further that record 10 is a 12" record. Accordingly, the record transfer trough is not latched in its upper position as it is for the smaller 10" records. The transfer mechanism moves only to a point where further movement is prevented by the stop 468 on the arm 466 extending downwardly from the trough 450. This limitation of the movement of the transfer arm leaves the player arm and pickup means in their initial playing position for 12" records because the slide plate 668 and player arm positioning plate latch lever 650 are not moved.

The record is clamped in playing position by the clamping arm which is actuated by the cam 338 and associated mechanism heretofore described in detail. This mechanism, it will be remembered, lifts the record from the track 450, it moving the record rearward and upward to free it from the track.

The pickup means is moved toward the record and into contact with it through the previously described lever 590 and cam 340 and associated mechanism. The mechanism also frees the player arm from the player arm positioning plate 616, this being accomplished by the upper side of the ledge 644 which engages the adjustable screw 646 of the movable latch plate 618 and disengages it from the latch plate 620 on the player arm supporting cradle.

When the player arm and pickup means are released from the positioning plate 616, both the biasing springs 682 and 684 are effective to bias them toward the record grooves. The springs depress the pin 628 a distance limited by the flange 690 on the positioning plate 616. Thus the pickup means is free to follow the record grooves during the playing of a record.

The rotation of the cam shaft also resets the main trip lever 734, it being reset by roller 374 on the cam 368 which moves the lever 736 in a counterclockwise direction to return the trip lever to a position whereat it is latched by the latch 732 on the trip relay armature 724. The resetting returns the cycling clutch operated lever 738 back to its initial position, frees the clutch shifting lever 850 from the flange 864 on lever 736, and frees the player arm trip latch lever 796, all as indicated in Fig. 28.

When the cam shaft has been rotated approximately 180° from its initial position, the record is clamped in playing position and ready to be reproduced by means including the pickup 345 mounted at the upper end of the player arm. When the cam shaft has rotated this distance, the cycling clutch is disengaged to terminate rotation of the cam shaft with the result that only the turntable and record are rotated. The cycling clutch is disengaged by the unlatching of lever 740, the lever being unlatched by movement of the latch plate 768 by the pin 770 on the gear wheel 326 through which the cam shaft is rotated. It is moved in a counterclockwise direction, as viewed in Fig. 10, by the spring 772 so that the screw 764 at the upper end of the lever moves the clutch operating yoke 276 to disengage the clutch. When disengaged the shiftable clutch member 250 is centered with respect to the yoke by the spring 260 to avoid undue wear and extraneous noise during playing of the record.

When the cycling clutch is disengaged and only the record rotated, then the reproducing means is rendered effective by the opening of the mute switch 1094.

The pickup needle follows the record grooves as the record is rotated and the sound is reproduced by suitable means including an amplifier and loud speaker. Inasmuch as the reproducing means may be of various forms and of conventional construction, it has not been shown.

When the record has been reproduced and the pickup needle has traveled close to the center of the record or is moved in a reverse direction as by an eccentric groove at the center of the record, the player arm trip mechanism is operated to reengage the cycling clutch and effect the unclamping of the record and return thereof to the magazine. The player arm trip mechanism is operated either by the plate 800 or pawl 814 engaging with either the roller 816 or ratchet teeth 818 of the player arm trip mechanism latch lever 796. The latch lever is thus rotated a short distance in a counterclockwise direction to free the switch operating arm 792. The latter is moved by its biasing spring 794 to close the player arm trip switch 790 whereupon the trip relay 720 is again energized. This time the operation of the trip relay results in the engagement of the cycling clutch to connect the motor to the double clutch to drive the cam shaft through the remainder of its cycle in a clockwise direction. The cycling clutch is engaged by the clockwise movement of the lever 736 by the spring 856, the lever moving the cycling clutch operating lever 738 in a clockwise direction, thereby to move the lever 740 in a clockwise direction away from the clutch yoke so that the clutch yoke is then moved by spring 756 to effect engagement of the clutch, which biases it towards its engaged position. The engagement of the cycling clutch effects closure of the mute switch, thereby rendering the reproducing apparatus ineffective during the record unclamping and returning operation.

The cam shaft is rotated through the remaining 180° of one revolution through the now engaged cycling clutch and the double clutch in its upper position. The pickup means is moved away from the record by the player arm control lever 590 which is lowered by the cam 340, one of the cams 604 on the lever engaging one of the rollers 606 to move the player arm. Shortly thereafter, the pickup means is moved back toward its initial playing position for 12" records by the roller 610 at the rear end of arm 590 which engages the plate 612 secured to the player arm cradle. Near the end of the return movement, the cradle is latched to the player arm positioning plate, when the ledge 644 moves away from the movable plate 618. The biasing spring control plate 692 is likewise moved down. The positioning plate 616 remains latched in its 12" position so that the player arm is latched to it, the player arm and pickup means are again properly located in the initial playing position for a 12" record. The rotation of the cam shaft also operates the clamping arm and moves it away from the record to release the record. The record is prevented from following the clamping arm in its outward movement by the record stripper 400 and the record is placed upon the trough 450 which remains in its lowermost position.

The rotation of the cam shaft also actuates the record transfer arm 38, moving the latter downwardly with the result that this record is slowly rolled down the trough and back toward the magazine. Power is stored in the spring 436 during the return of the record to the magazine so that a more uniform load is placed upon the motor, some of the stored power being unitilized as heretofore indicated to assist the motor in raising the record to the playing position.

The trip mechanism is reset during the return movement of the record, the resetting being done this time by the roller 372 which engages the flanged arm 754 of the lever 735. The resetting also tensions spring 868 by means of which the double clutch is moved to its lower or carriage driving position.

Assuming that the record is properly returned to the magazine, then when the cam shaft has completed a full revolution and returns to its initial position, the clutch and safety mechanism is tripped by the upward movement of lever 872, thereby enabling the spring 868 to move the clutch down into its carriage driving position. The lever 872 is moved upwardly when the projection 366 on cam 362 engages the projection 876 at the underside of lever 872. When the lever 872 is moved upwardly, it raises the overlying end of lever 874, thereby releasing lever 886 for movement by the spring arm 884 of the record transfer mechanism which had engaged the adjustable screw 898 of lever 882 during the final movement of the record to the magazine. The movement of lever 886 releases the lever 888 thereby unlatching the clutch operating mechanism so that it may move downwardly.

It may be noted that the clutch cannot be shifted downwardly until the cam has made substantially a full revolution because it is maintained in its uppermost position by the peripheral surface of cam 368, which engages the roller 870 on the lever 850. When the lever 872 is moved up by the cam, the cam operated switch blades 942 are again closed, and when the clutch shifts downwardly the reversing relay armature 982 is unlatched. Also, the clutch control switch blades 962 are opened and the switch blades 966 closed. The unlatching of the reversing relay armature results in the operation of the reversing switch to its original position energizing the motor to move the carriage in playing direction.

The carriage is now moved by the motor until the contact finger 1080 engages the next actuated selector element 1020, which is the element corresponding to record 11 in this case. When the element is engaged, the trip relay is energized and the record is moved into playing position, reproduced and returned to the magazine in the same manner as record 10, so that further description of the playing of this record is not deemed necessary at this point.

When the record has been played and returned to the magazine, the double clutch is shifted to its lower carriage driving position to move the carriage further toward the right until the next actuated selector element is engaged by the moving contact finger.

The selector element corresponding to record 20 is next engaged by the moving contact finger 1080 as it is moved toward the right by the carriage. This selector element, it will be remembered, was operated to select only the left side of the record for playing. It will be assumed record 20 is a 10" record. The contact between moving contact finger 1080 and the selector element is for a brief period only but for a sufficient time to energize the trip relay 720. Immediately it is energized, the trip mechanism operates as previously described to effect the upward movement of the double clutch into cam shaft driving position. The record is transferred to the playing position, clamped and reproduced in the same manner as heretofore described with two exceptions. The first is that the reversing relay is not energized, no energizing circuit being completed through it. The second exception is one resulting from the fact that record 20 is a 10" record.

When the left side of a record is to be played the reversing relay is not energized, as already indicated, with the result that the cam shaft is rotated in a counterclockwise direction, as viewed from the right. The record is thus rotated in the opposite direction and the player arm and pickup means are moved to the left side of the record playing position as a consequence of the reversal of the motor 150 and the cam shaft 342. When the cam shaft is rotated in a counterclockwise direction, and now referring particularly to Fig. 39, the player arm shifting lever 550 is moved from its indicated position in a clockwise direction by engagement between the slot 352 in cam 348 and the roller 558 on the lever. The lever 550 moves the player arm shifting slide bar 552 to the left as viewed from the front of the machine or to the right as viewed from the rear and as indicated in Fig. 50. This movement results in engagement between one of the flanges 580 on the slide bar and the plate 582 secured to the lower end of the player arm, with the result that the player arm is moved to the left and lifted over the roller 586 at the bottom of the cradle. The roller and plate constitute an over-center device which facilitates shifting of the player arm and results in freeing the player arm from the shifting mechanism after the shift has been completed. The shifting of the player arm to the left side of the playing position also frees the bias spring controlling vertically movable plate 692, whereby one of the biasing springs is rendered ineffective to bias the pickup means into the record grooves.

The movement of the pickup means into contact with the record and into the first record grooves is the same as heretofore described except that it is biased into the record grooves only by spring 682 when the arm is freed from the positioning plate. Spring 684 is rendered ineffective by the upward movement of the plate 692, which upward movement is effected by spring 696 when the plate 692 is freed as a result of the upward movement of the player arm control lever 590. This upward movement of the lever results in the lifting of the underside of the ledge, particularly the projection 702, from the flange 704 of the plate, so that the spring can move the plate upwardly.

When a 10" record is transferred to the playing position, the record trough 450 is latched in its upper position and the pickup means is located at an initial playing position corresponding to 10" records. The record trough is latched in its uppermost position by the trough latch comprising the latch plate 474 on the trough and the pivotally mounted spring biased latch members 484 and 486, the actual latching being between the shoulder 472 on plate 474 and the flange 488 on latch member 484. The operation of the latching mechanism has been described in detail hereinbefore and it will not be repeated at this time. It might be well, however, to note that the trough is latched for 10" records but not for 12", because of the position of the 10" record to the left of the pivot shaft 452 of the trough when the transfer arm is in a position to free the latching plates 484 and 486.

The pickup means is positioned at initial playing position for 10" records as a result of the greater movement of the transfer arm. This greater movement is such as to move the sliding plate 668 a distance sufficient to move the positioning plate latching lever 650 to unlatch the positioning plate. When the positioning plate is unlatched, the spring 658 moves it in a counterclockwise direction until the flange 666 engages the 10" positioning screw 664. The player arm, being latched to the positioning plate, is moved with the positioning plate toward the axis of rotation of the record, whereby it is positioned properly in the 10" initial playing position. It should perhaps be mentioned at this point that the unlatching of the positioning plate occurs previous to the time that the player arm is unlatched from the position plate.

The 10" record is clamped in playing position and its left side reproduced in the same manner as described heretofore in connection with the right sides of the 12" records. When the record has been reproduced, the player arm trip mechanism operates as previously described to initiate rotation of the cam shaft in a counterclockwise direction for the second 180° of its rotation. The record is returned to the magazine in the same manner as heretofore. During the return movement, the player arm is again returned to its initial 12" position by the downward movement of the player arm controlling lever 590, the player arm being latched to the positioning plate and the latter being latched to its latch lever 650 by reason of the return of the slide lever 668 back to its initial position by the spring 680, which acts upon it through the lever 650. The biasing spring controlling slide plate 692 is returned to its initial position by the ledge 644, on the lever 590 which engages the flanged arm 704 of the plate.

The record trough is unlatched when the 10" record returns toward the magazine to a point forward of the pivot of the trough. When the record returns to this point, the movable latch plate 484 and the latch plate 474 on the trough are moved apart and the former is returned to its initial position by its biasing spring 490, the plate 486 having been previously returned to its initial position by the cam 498 on the transfer arm hub.

During the end of the second 180° of rotation of the cam shaft, the lever 872 controlling the cam operated switch moves to its limit position in a counterclockwise direction when the projection 878 falls into the recess 364 of cam 362. This movement results in the closure of switch blades 938, but this effects no control function because the circuit through the switch blades is open at the selector element, the selector element not being turned enough to engage the movable contact finger 1082.

After record 20 has been returned to the magazine and the double clutch operated to its lower position, the movable carriage moves on until the movable contact finger 1080 engages the selector element 1020 corresponding to record 21, also a 10" record. When this occurs the left side of record 21 is played in the same manner as the left side of record 20.

When the record 21 has been returned to the magazine, the carriage moves further toward the left until the moving contact finger 1080 engages the selector element for record 30, which, it will be remembered, was assumed to have been operated in a position to select both the left and right sides of record 30. Under the assumed conditions, the left side of record 30 is first played and then the right side. The left side is played first because no energizing circuit is completed for the reversing relay when the carriage is stopped. The energizing circuit would be completed through the contact finger 1082 but it is not because the switch blades 938 of the cam operated switch are open in the initial position of the cam. The left side of the record is played, as heretofore described.

After the left side of record 30 has been played, the record is returned toward the magazine but the motor is reversed before the return is completed and before the clutch is shifted down. As a result, the cam shaft does not rotate in a counterclockwise direction the full 360°, the reversing relay being energized near the end of a full rotation of the cam shaft when the projection 878 on the cam switch controlling lever 872 falls into the depression 364 in the cam 362. The cam rotates in a counterclockwise direction for playing the left side of a record and glancing at Fig. 41, it will be noted that the lever 872 is shifted as described above before the cam shaft has turned a full revolution.

When the lever 872 shifts to its limit position in a counterclockwise direction during the return of a record having had its left side played, the reversing relay is energized through a circuit including the then closed switch blades 962 of the clutch controlled switch and the previously closed circuit through movable contact finger 1082 and the selector element, this circuit being completed by the closure of switch blades 938 by the aforesaid movement of lever 872. Immediately the circuit is completed, the reversing relay 940 is energized and its armature operates the reversing switch and the switch is latched in a position to operate the motor in its reverse direction, i. e., the proper direction for playing the right side of a record. The record is rotated in this direction and the cam shaft reverses with the result that the record is returned back to the playing position and clamped there and reproduced. The return movement, it should be noted, is not started until after the various other elements operated by the cam shaft have been moved through their resetting cycles.

The pickup means is shifted from position to play the left side to a position to play the right side when the motor is reversed and this reverse movement occurs prior to the time that the record is in playing position, this being necessary because the pickup means is shifted through the space occupied by a record in playing position.

After the right side of record 30 has been played, the apparatus operates as heretofore described to return the record to the magazine and to shift the double clutch down into its carriage driving position. Thereafter the carriage moves to the right until the moving contact finger 1080 engages the next actuated selector element, which was assumed to be that for record 31.

The selector element for record 31 was assumed to have been operated into a position to select both sides for playing. Both sides of record 31 are played in the same manner as record 30, so that further description is not deemed to be necessary.

After both sides of record 31 have been played and it has been returned to the magazine, the carriage is moved further toward the right. However, as no records numbered above 31 were selected for playing, the carriage moves to the limit of its movement to the right. At this limit the reversing switch 1002 is operated by movement of the switch operating lever 1094, which engages the right switch operating abutment 1006. The operation of switch 1002 to its other position results in the disconnection of the selector circuits, thereby rendering the latter ineffective, and in the connection of the reversing relay direction across the secondary of the transformer. The reversing relay is energized to reverse the motor and the motor moves the carriage to the left in the nonplaying direction. This movement continues until the carriage reaches its limit of movement to the left, at which time the switch operating arm 1094 engages abutment 1008 to return the reversing switch to its initial position. The motor then drives the carriage in playing direction and the selected recordings are played in the manner as previously described.

The selected recordings are thus played over and over in the same sequence as long as the main switch 952 is left in its starting position.

The phonograph may be stopped at any time simply by manipulation of the main control switch to its off position. If this is done while the carriage is moving toward the left, i. e., in nonplaying direction, the motor stops immediately because the holding circuit, which includes switch 958 is open, as the clutch is in its down position. The same result obtains if switch 952 is operated to its off position during carriage travel. However, if the switch is so operated during the record playing cycle, the motor continues to operate the phonograph through the playing cycle and until the record is returned to the magazine and the double clutch is shifted to its lowermost position. This result obtains because the holding circuit is completed by the clutch control switch blades 958 which are closed to complete a high voltage circuit to the transformer and motor as long as the clutch remains in its uppermost position.

If it is desired to have the phonograph stop after playing the last selected recording, then the switch 952 is operated to its automatic stop position. This does not affect the control circuits but it does place the switch 952 in such a position that it is automatically returned to its off position when the carriage returns to its limit of movement to the left. Under these conditions the arm 1108 on the selector bracket 1052 engages the switch operating arm 1110—1112 to rotate the switch to its off position, as indicated in Fig. 31.

If it is desired to make or change selections while the phonograph is playing, this may be accomplished simply by operation of the selector elements. It is believed unnecessary to describe the selection of records other than the one being played and it is possible to select for playing the right side of a record of which the left side is being played. This can be done by moving the selector element corresponding to the record from its left side only position to either the both sides or right side only positions. In either event, a circuit is conditioned for completion through the selector element and the movable contact finger 1082. The circuit is completed when the record is being returned to the magazine after the playing of the left side of the record at the time the switch blades 938 of the cam controlled switch are closed near the end of the full revolution of the cam shaft in its counterclockwise direction as heretofore described in connection with the playing of both the left and right sides of records.

If it is desired to repeat any selection, this can be accomplished by operation of the main control switch 952 to its repeat position, in which the switch blades 966 of the clutch control switch are connected to ground to condition an energizing circuit for the trip relay for completion when the clutch is shifted down upon the completion of the playing of a record and the return thereof to the magazine. It will be remembered that the switch blades 966 are open during the playing of a record and are closed when the clutch member shifts down. Consequently, if the main control switch is in its repeat position, the trip relay is immediately energized when the clutch shifts down, with the result that the clutch is immediately returned to its upper or cam shaft driving position.

A record being played or being transferred to the playing position may be rejected, i. e., returned to the magazine without reproduction by operation of the reject switch 1100. If the record is being played or if the transfer operation has been carried out to the point where the trip mechanism has been reset, then the record may be rejected by operation of the reject switch to energize the trip relay. When thus energized, the trip relay sets the mechanism in operation just as though it had been energized by the player arm trip mechanism. As a result, the record selected for playing is returned to the magazine without being reproduced, or the reproduction is interrupted.

If it is desired to scan, i. e., to move the carriage past selected records without stopping and reproducing the selected records, it is necessary only to operate the scanning switch 1104 whereby the motor 150 is energized as long as the switch is closed. When the switch is opened, the motor is no longer energized through the scanning switch and operates in the usual manner. It should be noted that should the scanning switch be operated while the motor is energized, its operation has no immediate effect.

In the event a record is not properly returned to the magazine after it has been reproduced, the record is moved to the playing position and reproduced the same as when it was originally selected and a further effort is then made to return it to the magazine. This mode of operation results from the fact that the safety trip mechanism and clutch control prevents the clutch from moving downward, so that instead of the carriage being moved, the cam shaft continues to be rotated.

When the record is not properly returned to the magazine then, when the cam means and record transfer arm are moved to predetermined positions, the safety trip lever 882 is not moved through its full range of movement by the spring arm 884 associated with the transfer means. The upper end of lever 882 engages the record so that the lever cannot be moved through a sufficient distance for it to move the intermediate lever 886, which has to be moved in order to unlatch the clutch controlling mechanism so that the clutch can be moved down. As a result of the fact that the clutch cannot be shifted down, the cam shaft does not stop at its initial or original position but is rotated through the first 180° of its movement to effect the operation of the various mechanisms including the transfer mechanism which returns the record back to playing position where it is played and again returned toward the magazine. If the record is properly returned this time, the phonograph continues to operate in the usual way; if not, then further efforts are automatically made to return the record.

In the event the moving carriage should stop at a position where there is no record in the magazine, the apparatus is prevented from remaining stopped in this position by the no-record switch 1096. This switch is closed to operate the trip relay 720 when the record clamping arm 226 moves farther than it ordinarily does. When it moves this farther distance, the switch is closed by the adjustable screw 1098 to complete an energizing circuit for the trip relay and the latter functions just as it does after the playing of a record to initiate the return of the record back to the magazine.

*Mechanism for prevening shifting of the double clutch to its carriage driving position unless motor is rotating in a direction to move the carriage in its playing direction*

In order to avoid back stepping or driving of the movable carriage in the return or nonplaying direction after the playing of the right side of a record, which might occur because of the fact that the motor would not immediately reverse because of its inertia, the carriage drive may be provided with means for preventing the driving of the carriage until the motor has reversed so as to rotate in the proper direction to drive the carriage to the right. Alternative arrangements of this character are illustrated in Figs. 54 to 57 and Figs. 59 to 60, inclusive.

In the embodiment of Figs. 54 to 57, the arrangement is so constructed and arranged so that the motor actually has to reverse after playing the right side of a record before it can drive the carriage. In other words, the double clutch cannot be shifted to its lower carriage driving position until the motor has been reversed and this is true irrespective of the time it takes for the motor to reverse.

The arrangement includes the addition of a sleeve, indicated as a whole by reference character 1250 (see especially Fig. 57) below the lower end of the double clutch member 120. The sleeve prevents the double clutch from moving downwardly to engage the pin 116 through which the carriage is driven unless the motor is rotating in a predetermined direction. This direction is the counterclockwise direction when looking down upon the structure shown in Figs. 54 and 56. Fig. 54 illustrates the apparatus conditioned for shifting of the double clutch downwardly so that the pin 116 may enter one of the recesses 292 at the lower end of the double clutch member.

The sleeve 1250 is loosely mounted upon the vertical shaft 284 and it is constructed and arranged to have limited angular movement with respect to the shaft. This movement is provided by a pair of axial and diametrically opposite located slots 1252 receiving the opposite ends of the driving pin 288 extending through the shaft 284. The movement of the sleeve is constrained by a spring 1254 encircling and engaging an annular collar-like portion 1256 of the sleeve and also encircling the pin 116. The construction is thus such that the spring frictionally constrains the movement of the sleeve so that it does not immediately follow the shaft 284 when the latter reverses.

The reduced diameter upper portion 1258 of the sleeve is adapted to enter a recess 1260 at the lower end of the double clutch member when the latter shifts downwardly.

The sleeve is provided with a pair of truncated upwardly extending projections 1262 which prevent the double clutch member 120 from being shifted downwardly to engage the driving pin 116 unless the projections are in alignment with the recesses 292 at the lower end of the clutch. The projections have a height equal to that of the driving pin so that unless they are in alignment with the recesses, the double clutch member cannot be shifted down drivingly to engage the pin.

When the right side of a record is to be played, i. e., when the reversing relay has been operated to operate the motor in a reverse direction, the shaft 284 rotates in a clockwise direction as viewed from above in Fig. 54. Under these conditions the projections 1262 are not in alignment with the recesses 292. This is because the pin 288 is in engagement with ends 1264 of the slot 1252. When the motor reverses, after the playing of the right side of a record and the return of a record to the magazine, upon the shifting of the double clutch member toward its lower position, the direction of rotation of shaft 284 is reversed so that it rotates in a counterclockwise direction. The sleeve, however, is prevented from moving by the spring 1254 with the result that the pin 288 moves into engagement with the other opposite ends 1266, as illustrated in Fig. 54. Under these conditions the clutch shifts the remaining distance when one of the two recesses 292 is aligned with the pin 116.

It perhaps should be noted that the spacing between the lower end of the double clutch member and the upper ends of the pin 116 and projections 1262 is such that the downward shifting of the clutch this distance results in the de-energizing of the reversing relay by the opening of switch blades 962 and also the unlatching of the relay armature by movement of the latch 970, both of which functions are, it will be remembered, accomplished by the clutch shifting lever 850.

When the left side of a record is being played the motor and shaft 284 rotate in such a direction that the sleeve 1250 is so located that the double clutch member will shift down immediately to drive the carriage, as illustrated in Fig. 54.

Modified mechanism for preventing shifting of double clutch to carriage driving position In the modification illustrated in Figs. 58 to 60, a lost motion drive is interposed between the double clutch member and the pinion 80 to provide a time interval in which the motor is enabled to reverse so that the carriage will not be driven in a backward direction after playing of the right side of a record.

The lost motion connection is provided by a pinion driving member 1270 loosely surrounding the shaft 284 and having a pair of upwardly extending projections 1272 adapted to enter the recesses 292 at the lower end of the double clutch member when the latter is shifted downwardly. The pinion driving member 1270 is movable a limited distance angularly with respect to the positioning wheel 112 which rotates as a unit with the driving pinion 80. The positioning wheel is provided with a recess 1274 receiving the driving member 1270 which is held in place by suitable means such as a "C" washer 1276. The lost motion between the driving member and the positioning wheel is provided by a pin and slot connection including a pair of diametrically opposite pins 1278 affixed to the positioning wheel and a pair of diametrically opposite slots 1280 in the driving member 1270.

The arrangement is thus such that the carriage is not driven for a time interval after motor reversal, the time interval being equal to the time it takes for the pinion driving member 1270 to move a distance provided by the slot.

Alternative clutch shifting mechanism

An alternative and improved clutch shifting mechanism may be used with the phonograph described above and such a mechanism is illustrated in Figs. 61 and 62, to which reference will be had shortly. This construction is characterized by the provision of means, preferably resilient means, in the clutch shifting mechanism to prevent jamming if the clutch member 120 should drive the cam shaft without proper mating between the cam shaft driving pin 328 and one of the slots 290 at the upper end of the clutch member, as by abutting engagement between the adjacent ends of the pin and clutch. While this condition is not very likely to occur because of the coefficients of friction of the pin and clutch member, yet it may occur and, if it does, the alternative improved construction avoids any possibility of jamming.

Referring now to Figs. 61 and 62, the construction here illustrated is substantially the same as that heretofore shown and including the back stepping preventing means of Figs. 54 to 57, inclusive. The primary distinction between the present arrangement and that heretofore described is that when the clutch member 120 is shifted upwardly from carriage driving to cam shaft driving position, the clutch member is shifted through resilient means such as the spring 1300, while the positioning mechanism, which includes the crank arm 132, is positively actuated through the operating link 1302 which corresponds in general to the previously referred to clutch operating link 124.

When the clutch member 120 is shifted from its lower carriage driving position to its upper cam shaft driving position, it is so moved through the spring 1300, the upper end of which is secured by a projection end of pin 1304 (corresponding in general to the previously referred to pin 854) which also serves to connect the link 1302 to the clutch operating lever 850. The lower end of the spring is connected to a projecting end 1306 of a pin 1308 forming part of the clutch shifting yoke 122. Thus, when the clutch operating lever 850 is moved upwardly as a result of the operation of the trip mechanism, the clutch is shifted upwardly through the spring 1300. Should it happen that the cam shaft driving pin 328 is aligned with one of the slots 290 at the upper end of the clutch, then the clutch member 120 is positioned to move to its uppermost position. However, should the two not be aligned and the upper end of the clutch engage the pin, then the spring 1300 will yield and it is thus conditioned to move the clutch member the remaining distance upwardly when the pin and the slot are aligned. Should the cam shaft be driven as a result of the abutting engagement between the driving pin and clutch and the cam positively move the lever 850 (in the event its associated spring 856 did not move it all the way), the mechanism will not be jammed because of the yielding connection of the clutch member and its yoke to the lever 850 through the spring 1300.

The carriage, however, is positively connected to the shifting mechanism during the upward shift of the clutch, the connection including the link 1302 and a horizontal flange 1310 at its lower end adapted to engage the underside of the enlarged end 1312 of arm 1314 of the bell crank 132. Thus when the lever 850 is moved upwardly, the flange 1310 moves the bell crank counterclockwise as viewed in Fig. 61 positively to move the detent engaging roller 114 into an intertoothed space on the positioning detent wheel 112.

In order to provide the necessary relative movement between the bell crank of the positioning mechanism and the clutch, end 1312 of the bell crank arm is provided with a slot 1316 and the lower end of the link 1302 is provided with a slot 1318 through which the pin 1308 extends.

The clutch is shifted downwardly to its carriage driving position by the downward movement of lever 850 and link 1302 which depresses the pin 1308 and the clutch shifting yoke. The bell crank is thus freed from the link and it is moved in a clockwise direction, when the carriage is driven, by the engagement of a detent wheel tooth with the roller 114.

It is believed evident from the foregoing that the yielding connection 1300 prevents undesired jamming of the clutch when it is shifted up and that the arrangement not only provides this additional safeguard but effects positive positioning of the carriage through the operation of the flange 1310 which positively actuates the bell crank 132 when the clutch is shifted up.

While the present invention has been described in connection with the particular details of preferred embodiments thereof, it should be understood that such details are not intended to be limitative of the invention except in so far as they are set forth in the accompanying claims.

Having thus described my invention, what I claim as new and desire to secure by Letters Patent of the United States is:

1. An automatic phonograph for playing disc records of different diameter including means for transferring a record from a storage position to a playing position, a record runway along which said record is transferred from said storage position to said playing position, means for supporting said member for pivotal movement about a point located nearer one end of said runway than the other so that one end occupies a position from which it is moved downwardly to a changed position when engaged by a record at that side of the pivot point thereby to raise the other end of said runway, and means for latching said runway in its said changed position, said last mentioned means including a latch member movable with said runway, an associated latch member, and means operable by said record transferring means for controlling said last mentioned latch member.

2. An automatic phonograph for playing disc records of different diameter including means for transferring a record from a storage position to a playing position, a record runway along which said record is transferred from said storage position to said playing position, means for supporting said member for pivotal movement about a point located nearer one end of said runway than the other so that said one end occupies a position from which it is moved downwardly to a changed position when engaged by a record at that side of the pivot point, thereby to raise the other end of said runway, and means for latching said runway in its said changed position, said last mentioned means including a latch member movable with said runway, an associated latch member, a spring biasing associated latch member toward a position where the runway is latched, and means operable by said record transferring means for releasing the associated latch member for movement by said spring when the transferring means has reached a predetermined point.

3. An automatic phonograph for playing disc records of different diameter including means for transferring a record from a storage position to a playing position, a record runway along which said record is transferred from said storage position to said playing position, means for supporting said member for pivotal movement about a point located nearer one end of said runway than the other so that said one end occupies a position from which it is moved downwardly to a changed position when engaged by a record at that side of the pivot point, thereby to raise the other end of said runway, and means for latching said runway in its said changed position, said last mentioned means including a latch member movable with said runway, an associated latch member comprising two parts, one of which parts is engageable by said first mentioned latch member, a spring biasing said two parts toward each other, another spring biasing both said parts toward a position where the runway is latched, and means operable by said record transferring means engageable with the other part of said associated latch member for releasing the associated latch member for movement by said other spring when the transferring means has reached a predetermined point in the transfer of a record to the playing position and for returning said other part in the transfer of the record to the storage position without unlatching said runway, whereby said runway is unlatched by the return of a record and pivotal movement of the runway.

4. In an automatic phonograph, movable record transfer means, clutch shifting means for terminating the drive of said record transfer means, cam means whose drive is also terminated by said clutch shifting means, a record position responsive means resiliently movable by said cam means into a record transfer position and means controlled conjointly by said cam controlled and record position responsive means, when moved into said position for operating said clutch shifting means only when the cam controlled means moves into a predetermined position and a record is transferred clear of said position.

5. In an automatic phonograph, movable record transfer means, clutch shifting means for terminating the drive of said record transfer means, means for latching said clutch shifting means against movement, cam controlled means whose drive is also terminated by said clutch shifting means, a record position responsive means resiliently movable by said cam means into a record transfer position, and means responsive to the position of the record position responsive means in said record transfer position and of said transfer means for releasing said latching means only when the cam controlled means and transfer means move into predetermined positions and a record is transferred clear of said position.

6. In an automatic phonograph, movable record transfer means, clutch shifting means for terminating the drive of said record transfer means, means for latching said clutch shifting means against movement, and means including cam controlled means whose drive is also terminated by said clutch shifting means and record position responsive means resiliently actuated by said cam means into a record transfer position for releasing said latching means only when the cam controlled means moves into a predetermined position and a record is transferred clear of said position.

7. In an automatic phonograph, a clutch shiftable from a first position to a second position, means for shifting said clutch from said first to said second position, means for latching said clutch shifting means against such movement, record transfer means, cam means for operating said record transfer means driven by said clutch in its first position, and means for releasing said latching means only when the cam means and transfer means move to predetermined positions and a record being transferred by the transfer means moves to a predetermined position, said last mentioned means including a lever movable to release said latching means, means latching said last mentioned lever, means operable by said cam means when the latter moves to a predetermined position for releasing said latching means, and means for moving said lever in the event the transfer means is operated to a predetermined position and a record has been moved to a predetermined position, said last mentioned means including an element resiliently and operatively connected to said lever and movable by the transfer means into the path of movement of a record being transferred by said transfer means, whereby the clutch is retained in its first position in the event that the last said element engages a record being transferred.

8. In an automatic phonograph for playing disc records of different sizes, in combination, a movable runway, a movable element arranged to move a record over said runway, said runway being arranged to be depressed by the weight of a record passing over a later portion thereof, a latch arranged to engage said runway and hold it against such depression, and means operatively associated with said element for latching said runway when the element is moved to a definite position, said definite position being predetermined so that a larger record has depressed the runway and a smaller record, owing to its smaller size, has not depressed the runway when the element has reached said definite position, whereby the runway is latched against depression when a smaller record is being moved over said runway by said element.

9. In an automatic phonograph for playing disc records of different sizes, in combination, a movable runway, a movable element arranged to move a record over said runway, said runway being arranged to be generally elevated by the weight of a record passing over its initial portion and generally depressed by the weight of a record passing over a later portion thereof, a latch arranged to engage said runway and hold it against such depression, and means operatively associated with said element for latching said runway when the element is moved to a definite position and the runway is elevated, said definite position being predetermined so that a larger record has depressed the runway and a smaller record, owing to its smaller size, has elevated and not depressed the runway when the element has reached said definite position, whereby the runway is latched in elevated condition when a smaller record is being moved over said runway by said element.

10. In an automatic phonograph for playing disc records of different sizes, in combination, a pivotally mounted runway, a movable element arranged to move a record over said runway, said runway being arranged to be swung downwardly by the weight of a record passing over a later portion thereof, a latch arranged to engage said runway and hold it against such downward swinging, and means operatively associated with said element for latching said runway when the element is moved to a definite position and the runway is not swung downwardly, said definite position being predetermined so that a larger record has swung the runway downward and a smaller record, owing to its smaller size, has not swung the runway downwardly when the element has reached said definite position, whereby the runway is latched against downward swing when a smaller record is being moved over said runway by said element.

11. In an automatic phonograph for playing disc records of different sizes, in combination, a runway pivotally mounted at an intermediate point, a movable element arranged to move a record over said runway, said runway being arranged to be generally elevated by the weight of a record passing over its initial portion and generally depressed by the weight of a record passing over a later portion thereof, a latch arranged to engage said runway and hold it against such depression, and means operatively associated with said element for latching said runway when the element is moved to a definite position and the runway is elevated, said definite position being predetermined so that a larger record has depressed the runway and a smaller record has elevated the runway and, owing to its smaller size, has not depressed the runway when the element has reached said definite position, whereby the runway is latched in elevated condition when a smaller record is being moved over said runway by said element.

12. In an automatic phonograph for playing disc records of different sizes, in combination, a runway pivotally mounted at an intermediate point, a movable element arranged to move a record over said runway, said runway being arranged to be generally elevated by the weight of a record passing over its initial portion and generally depressed by the weight of a record passing over a later portion thereof, a latch arranged to engage said runway and hold it against such depression, and means operatively associated with said element for latching said runway when the element is moved to a definite position and the runway is elevated, said definite position being predetermined so that a larger record has depressed the runway and a smaller record has elevated and, owing to its smaller size, has not depressed the runway when the element has reached said definite position, whereby the runway is latched in elevated condition when a smaller record is being moved over said runway by said element, said latch being constructed and arranged so that it requires the small record to return over said initial portion to release said latch.

OLGIERD GIERWIATOWSKI.

References Cited in the file of this patent

UNITED STATES PATENTS

| Number | Name | Date |
|---|---|---|
| 826,483 | Donning | July 17, 1906 |
| 862,536 | Brown | Aug. 6, 1907 |
| 1,182,551 | Gabel | May 9, 1916 |
| 1,192,401 | Elliott | July 25, 1916 |
| 1,500,539 | Adams | July 8, 1924 |
| 1,868,846 | Oyston | July 26, 1932 |
| 2,012,350 | Pym | Aug. 27, 1935 |
| 2,047,749 | Small | July 14, 1936 |
| 2,053,580 | Racklyeft | Sept. 8, 1936 |
| 2,109,322 | Small | Feb. 22, 1938 |
| 2,211,221 | Wilkerson | Aug. 13, 1940 |
| 2,217,332 | Criley | Oct. 8, 1940 |
| 2,251,342 | Rauen | Aug. 5, 1941 |
| 2,263,643 | Offen | Nov. 25, 1941 |
| 2,281,547 | Andrews | May 5, 1942 |
| 2,297,997 | Behan | Oct. 6, 1942 |
| 2,298,147 | Wright | Oct. 13, 1942 |
| 2,318,654 | Wissner | May 11, 1943 |
| 2,320,877 | Mansen et al. | June 1, 1943 |
| 2,323,365 | Andrews | July 6, 1943 |
| 2,340,418 | Gabel | Feb. 1, 1944 |
| 2,349,239 | Clements | May 23, 1944 |
| 2,357,520 | Kahl | Sept. 5, 1944 |
| 2,368,086 | Becwar | Jan. 30, 1945 |
| 2,376,741 | Weaver | May 22, 1945 |
| 2,386,166 | Lissiansky | Oct. 2, 1945 |
| 2,387,916 | Knox | Oct. 30, 1945 |
| 2,458,496 | Andrews | Jan. 11, 1949 |

FOREIGN PATENTS

| Number | Country | Date |
|---|---|---|
| 2,482,659 | Davis et al. | Sept. 20, 1949 |